United States Patent
Tong et al.

(10) Patent No.: US 9,628,153 B2
(45) Date of Patent: *Apr. 18, 2017

(54) CLOSED LOOP MIMO SYSTEMS AND METHODS

(71) Applicant: APPLE INC., Cupertino, CA (US)

(72) Inventors: Wen Tong, Ottawa (CA); Ming Jia, Ottawa (CA); Jianglei Ma, Kanata (CA); Peiying Zhu, Kanata (CA); Hua Xu, Nepean (CA); Dong-Sheng Yu, Ottawa (CA); Hang Zhang, Nepean (CA); Mo-Han Fong, L'Original (CA)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/000,542

(22) Filed: Jan. 19, 2016

(65) Prior Publication Data

US 2016/0134339 A1    May 12, 2016

Related U.S. Application Data

(63) Continuation of application No. 11/630,391, filed as application No. PCT/CA2005/000958 on Jun. 22, 2005, now Pat. No. 9,271,221.

(Continued)

(51) Int. Cl.
*H04M 1/00* (2006.01)
*H04B 7/0413* (2017.01)
(Continued)

(52) U.S. Cl.
CPC ......... *H04B 7/0413* (2013.01); *H04B 7/0617* (2013.01); *H04B 7/0619* (2013.01);
(Continued)

(58) Field of Classification Search
CPC .. H04B 7/0626; H04B 7/0456; H04B 7/0639; H04B 7/0417; H04B 7/0617;
(Continued)

(56) References Cited

U.S. PATENT DOCUMENTS

2001/0019592 A1    9/2001  Solondz
2002/0102950 A1*   8/2002  Gore .................... H04B 7/0874
                                                    455/101

(Continued)

OTHER PUBLICATIONS

Ye (Geoffrey) Li et al: "Transmitter Diversity for OFDM Systems and Its Impact on High-Rate Data Wireless Networks", IEEE Journal on Selected Areas in Communications, IEEE Service Center, Piscataway, US, vol. 17, No. 7, Jul. 1, 1999 (Jul. 1, 1999 ), XP011054988, ISSN: 0733-8716.

(Continued)

*Primary Examiner* — Fred Casca
(74) *Attorney, Agent, or Firm* — Fay Kaplun & Marcin, LLP

(57) ABSTRACT

Systems and methods for closed loop MIMO (multiple input and multiple output) wireless communication are provided. Various transmit formats including spatial multiplexing and STTD are defined in which vector or matrix weighting is employed using information fed back from receivers. The feedback information may include channel matrix or SVD-based feedback.

17 Claims, 42 Drawing Sheets

Related U.S. Application Data

(60) Provisional application No. 60/642,697, filed on Jan. 10, 2005, provisional application No. 60/619,461, filed on Oct. 15, 2004, provisional application No. 60/614,621, filed on Sep. 30, 2004, provisional application No. 60/601,178, filed on Aug. 13, 2004, provisional application No. 60/582,298, filed on Jun. 24, 2004, provisional application No. 60/581,356, filed on Jun. 22, 2004.

(51) Int. Cl.
| | | |
|---|---|---|
| *H04B 7/06* | (2006.01) | |
| *H04W 48/08* | (2009.01) | |
| *H04W 72/08* | (2009.01) | |
| *H04W 74/06* | (2009.01) | |
| *H04L 5/00* | (2006.01) | |
| *H04W 72/04* | (2009.01) | |

(52) U.S. Cl.
CPC ......... *H04B 7/0671* (2013.01); *H04B 7/0673* (2013.01); *H04B 7/0691* (2013.01); *H04L 5/0028* (2013.01); *H04W 48/08* (2013.01); *H04W 72/042* (2013.01); *H04W 72/08* (2013.01); *H04W 74/06* (2013.01); *H04L 5/006* (2013.01); *H04L 5/0007* (2013.01); *H04L 5/0023* (2013.01); *H04W 72/044* (2013.01)

(58) Field of Classification Search
CPC .... H04B 7/063; H04B 7/0632; H04B 7/0634; H04B 7/0486; H04B 7/0478; H04B 7/0413; H04B 7/024; H04B 7/0452; H04B 7/0469

USPC ........ 375/267, 295, 219, 260, 316; 455/450, 455/550.1, 552.1, 553.1, 115.3, 115.2, 455/13.3, 500

See application file for complete search history.

(56) References Cited

U.S. PATENT DOCUMENTS

| | | | |
|---|---|---|---|
| 2003/0181170 A1* | 9/2003 | Sim .................. | H04B 7/0408 455/101 |
| 2004/0095907 A1* | 5/2004 | Agee ................. | H04B 7/0417 370/334 |
| 2004/0146018 A1* | 7/2004 | Walton .............. | H04B 7/0417 370/329 |

OTHER PUBLICATIONS

Al-Dhahir N et al: "Algebraic properties of space-time block codes in intersymbol interference multiple-access channels", IEEE Transactions on Information Theory, IEEE Press, USA, vol. 49, No. 10, Oct. 1, 2003 (Oct. 1, 2003 ), pp. 2403-2414, XP011102230, ISSN: 0018-9448, DOI: 10.1109/TIT.2003.817833.

Kawamoto J et al: "Comparison of space division multiplexing schemes employing multiple antennas in OFDM forward link", Vehicular Technology Conference, 2003. VTC 2003-Fall. 2003 IEEE 58th Orlando, FL, USA Oct. 6-9, 2003;[IEEE Vehicular Technology Conference], Piscataway, NJ, USA, IEEE, US, Oct. 6, 2003 (Oct. 6, 2003), pp. 452-457 vol. 1, XP010701016, DOI: 10.1109/VETECF.2003.1285058 ISBN: 978-0-7803-7954-1.

* cited by examiner

Antenna Grouping $$A_1 = \begin{bmatrix} \tilde{S}_1 & -\tilde{S}_2^* & \tilde{S}_3 & -\tilde{S}_4^* \\ \tilde{S}_2 & \tilde{S}_1^* & 0 & 0 \\ 0 & 0 & \tilde{S}_4 & \tilde{S}_2^* \end{bmatrix} \quad A_2 = \begin{bmatrix} \tilde{S}_1 & -\tilde{S}_2^* & 0 & 0 \\ \tilde{S}_2 & \tilde{S}_1^* & \tilde{S}_3 & -\tilde{S}_4^* \\ 0 & 0 & \tilde{S}_4 & \tilde{S}_2^* \end{bmatrix} \quad A_3 = \begin{bmatrix} \tilde{S}_1 & -\tilde{S}_2^* & 0 & 0 \\ 0 & 0 & \tilde{S}_3 & -\tilde{S}_4^* \\ \tilde{S}_2 & \tilde{S}_1^* & \tilde{S}_4 & \tilde{S}_2^* \end{bmatrix}$$

$$B_1 = \begin{bmatrix} \tilde{S}_7 & -\tilde{S}_8^* & \tilde{S}_3 & -\tilde{S}_4^* \\ \tilde{S}_1 & -\tilde{S}_2^* & \tilde{S}_5 & -\tilde{S}_6^* \\ \tilde{S}_2 & \tilde{S}_1^* & \tilde{S}_6 & \tilde{S}_5^* \end{bmatrix} \quad B_2 = \begin{bmatrix} \tilde{S}_1 & -\tilde{S}_2^* & \tilde{S}_5 & -\tilde{S}_6^* \\ \tilde{S}_7 & -\tilde{S}_8^* & \tilde{S}_3 & -\tilde{S}_4^* \\ \tilde{S}_2 & \tilde{S}_1^* & \tilde{S}_6 & \tilde{S}_5^* \end{bmatrix} \quad B_3 = \begin{bmatrix} \tilde{S}_1 & -\tilde{S}_2^* & \tilde{S}_5 & -\tilde{S}_6^* \\ \tilde{S}_2 & \tilde{S}_1^* & \tilde{S}_6 & \tilde{S}_5^* \\ \tilde{S}_7 & -\tilde{S}_8^* & \tilde{S}_3 & -\tilde{S}_4^* \end{bmatrix}$$

FIG. 11

Antenna Selection

| Streams, k | CQJCH | | | Power Boosting |
|---|---|---|---|---|
| | 0b110000 | 0b110001 | 0b110010 | |
| 1 | $C_1 = c \begin{bmatrix} s_1 \\ 0 \\ 0 \end{bmatrix}$ | $C_2 = c \begin{bmatrix} 0 \\ s_1 \\ 0 \end{bmatrix}$ | $C_3 = c \begin{bmatrix} 0 \\ 0 \\ s_1 \end{bmatrix}$ | $c = 1$ |
| 2 | $C_1 = c \begin{bmatrix} s_1 \\ s_2 \\ 0 \end{bmatrix}$ | $C_2 = c \begin{bmatrix} s_1 \\ 0 \\ s_2 \end{bmatrix}$ | $C_3 = c \begin{bmatrix} 0 \\ s_1 \\ s_2 \end{bmatrix}$ | $c = 1/\sqrt{2}$ |

FIG. 12

Antenna Grouping $$A_1 = \begin{bmatrix} \tilde{S}_1 & -\tilde{S}_2^* & 0 & 0 \\ \tilde{S}_2 & \tilde{S}_1^* & 0 & 0 \\ 0 & 0 & \tilde{S}_3 & -\tilde{S}_4^* \\ 0 & 0 & \tilde{S}_4 & \tilde{S}_3^* \end{bmatrix} \quad A_2 = \begin{bmatrix} \tilde{S}_1 & -\tilde{S}_2^* & 0 & 0 \\ 0 & 0 & \tilde{S}_3 & -\tilde{S}_4^* \\ \tilde{S}_2 & \tilde{S}_1^* & 0 & 0 \\ 0 & 0 & \tilde{S}_4 & \tilde{S}_3^* \end{bmatrix} \quad A_3 = \begin{bmatrix} \tilde{S}_1 & -\tilde{S}_2^* & 0 & 0 \\ 0 & 0 & \tilde{S}_3 & -\tilde{S}_4^* \\ 0 & 0 & \tilde{S}_4 & \tilde{S}_3^* \\ \tilde{S}_2 & \tilde{S}_1^* & 0 & 0 \end{bmatrix}$$

$$B_1 = \begin{bmatrix} S_1 & -S_2^* & S_5 & -S_7^* \\ S_2 & S_1^* & S_7 & S_5^* \\ S_3 & -S_4^* & S_6 & -S_8^* \\ S_4 & S_3^* & S_8 & S_6^* \end{bmatrix} \quad B_2 = \begin{bmatrix} S_1 & -S_2^* & S_5 & -S_7^* \\ S_2 & S_1^* & S_7 & S_5^* \\ S_4 & S_3^* & S_8 & S_6^* \\ S_3 & -S_4^* & S_6 & -S_8^* \end{bmatrix} \quad B_3 = \begin{bmatrix} S_1 & -S_2^* & S_5 & -S_7^* \\ S_3 & -S_4^* & S_6 & -S_8^* \\ S_2 & S_1^* & S_7 & S_5^* \\ S_4 & S_3^* & S_8 & S_6^* \end{bmatrix}$$

$$B_4 = \begin{bmatrix} S_1 & -S_2^* & S_5 & -S_7^* \\ S_4 & S_3^* & S_8 & S_6^* \\ S_2 & S_1^* & S_7 & S_5^* \\ S_3 & -S_4^* & S_6 & -S_8^* \end{bmatrix} \quad B_5 = \begin{bmatrix} S_1 & -S_2^* & S_5 & -S_7^* \\ S_3 & -S_4^* & S_6 & -S_8^* \\ S_4 & S_3^* & S_8 & S_6^* \\ S_2 & S_1^* & S_7 & S_5^* \end{bmatrix} \quad B_6 = \begin{bmatrix} S_1 & -S_2^* & S_5 & -S_7^* \\ S_4 & S_3^* & S_8 & S_6^* \\ S_3 & -S_4^* & S_6 & -S_8^* \\ S_2 & S_1^* & S_7 & S_5^* \end{bmatrix}$$

FIG. 13

| Streams, k | Antenna Selection / CQICH | | | | | | Power Boosting |
|---|---|---|---|---|---|---|---|
| | 0b110000 | 0b110001 | 0b110010 | 0b110011 | 0b110100 | 0b110101 | |
| 1 | $C_3 = c\begin{bmatrix} s_1 & 0 & 0 & 0 \end{bmatrix}$ | $C_2 = c\begin{bmatrix} 0 & s_1 & 0 & 0 \end{bmatrix}$ | $C_3 = c\begin{bmatrix} 0 & 0 & s_1 & 0 \end{bmatrix}$ | $C_4 = c\begin{bmatrix} 0 & 0 & 0 & s_1 \end{bmatrix}$ | | | $c = 1$ |
| 2 | $C_3 = c\begin{bmatrix} s_1 & 0 & 0 & s_2 \end{bmatrix}$ | $C_1 = c\begin{bmatrix} s_1 & s_2 & 0 & 0 \end{bmatrix}$ | $C_2 = c\begin{bmatrix} s_1 & 0 & s_2 & 0 \end{bmatrix}$ | $C_4 = c\begin{bmatrix} 0 & s_1 & s_2 & 0 \end{bmatrix}$ | $C_5 = c\begin{bmatrix} 0 & s_1 & 0 & s_2 \end{bmatrix}$ | $C_6 = c\begin{bmatrix} 0 & 0 & s_1 & s_2 \end{bmatrix}$ | $c = 1/\sqrt{2}$ |
| 3 | $C_1 = c\begin{bmatrix} s_1 & s_2 & s_3 & 0 \end{bmatrix}$ | $C_2 = c\begin{bmatrix} s_1 & s_2 & 0 & s_3 \end{bmatrix}$ | $C_3 = c\begin{bmatrix} s_1 & 0 & s_2 & s_3 \end{bmatrix}$ | $C_4 = c\begin{bmatrix} 0 & s_1 & s_2 & s_3 \end{bmatrix}$ | | | $c = 1/\sqrt{3}$ |

FIG. 14

| Matrix | Streams, k | Antenna Selection CQJCH | | | Power Boosting |
|---|---|---|---|---|---|
| | | 0b110000 | 0b110001 | 0b110010 | |
| C | 1 | $W_1 = c \begin{bmatrix} 1 & 0 \\ 0 & 0 \end{bmatrix}$ | $W_2 = c \begin{bmatrix} 0 & 0 \\ 1 & 0 \end{bmatrix}$ | $W_3 = c \begin{bmatrix} 0 & 0 \\ 0 & 1 \end{bmatrix}$ | $c = 1$ |
| | 2 | $W_1 = c \begin{bmatrix} 1 & 0 \\ 0 & 1 \\ 0 & 0 \end{bmatrix}$ | $W_2 = c \begin{bmatrix} 1 & 0 \\ 0 & 0 \\ 0 & 1 \end{bmatrix}$ | $W_3 = c \begin{bmatrix} 0 & 0 \\ 1 & 0 \\ 0 & 1 \end{bmatrix}$ | $c = 1/\sqrt{2}$ |

FIG. 15

| Matrix | Streams, K | Antenna Selection CQJCH ||||||| Power Boosting |
| --- | --- | --- | --- | --- | --- | --- | --- | --- |
| | | 0b110000 | 0b110001 | 0b110010 | 0b110011 | 0b110100 | 0b110101 | |
| C | 1 | $W_1 = c \begin{bmatrix} 1 \\ 0 \\ 0 \\ 0 \end{bmatrix}$ | $W_2 = c \begin{bmatrix} 0 \\ 1 \\ 0 \\ 0 \end{bmatrix}$ | $W_3 = c \begin{bmatrix} 0 \\ 0 \\ 1 \\ 0 \end{bmatrix}$ | $W_4 = c \begin{bmatrix} 0 \\ 0 \\ 0 \\ 1 \end{bmatrix}$ | | | $c = 1$ |
| | 2 | $W_1 = c \begin{bmatrix} 1 & 0 \\ 0 & 1 \\ 0 & 0 \\ 0 & 0 \end{bmatrix}$ | $W_2 = c \begin{bmatrix} 1 & 0 \\ 0 & 0 \\ 0 & 1 \\ 0 & 0 \end{bmatrix}$ | $W_3 = c \begin{bmatrix} 1 & 0 \\ 0 & 0 \\ 0 & 0 \\ 0 & 1 \end{bmatrix}$ | $W_4 = c \begin{bmatrix} 0 & 0 \\ 1 & 0 \\ 0 & 1 \\ 0 & 0 \end{bmatrix}$ | $W_5 = c \begin{bmatrix} 0 & 0 \\ 1 & 0 \\ 0 & 0 \\ 0 & 1 \end{bmatrix}$ | $W_6 = c \begin{bmatrix} 0 & 0 \\ 0 & 0 \\ 1 & 0 \\ 0 & 1 \end{bmatrix}$ | $c = 1/\sqrt{2}$ |
| | 3 | $W_1 = c \begin{bmatrix} 1 & 0 & 0 \\ 0 & 1 & 0 \\ 0 & 0 & 1 \\ 0 & 0 & 0 \end{bmatrix}$ | $W_2 = c \begin{bmatrix} 1 & 0 & 0 \\ 0 & 1 & 0 \\ 0 & 0 & 0 \\ 0 & 0 & 1 \end{bmatrix}$ | $W_3 = c \begin{bmatrix} 1 & 0 & 0 \\ 0 & 0 & 0 \\ 0 & 1 & 0 \\ 0 & 0 & 1 \end{bmatrix}$ | $W_4 = c \begin{bmatrix} 0 & 0 & 0 \\ 1 & 0 & 0 \\ 0 & 1 & 0 \\ 0 & 0 & 1 \end{bmatrix}$ | | | $c = 1/\sqrt{3}$ |

FIG. 16

| Feedback Requirement (NxN MIMO) | | | |
|---|---|---|---|
| # of Tx | Unitary Matrix | Direct H Matrix | Complexity |
| 2 | 12 | 8 | 150.00% |
| 3 | 24 | 18 | 133.33% |
| 4 | 40 | 32 | 125.00% |
| 5 | 60 | 50 | 120.00% |
| 6 | 84 | 72 | 116.67% |
| 7 | 112 | 98 | 114.29% |
| 8 | 144 | 128 | 112.50% |

FIG. 42

Space Time Coding Matrix Set

| # MIMO Output | STC Matrix | | | | | | |
|---|---|---|---|---|---|---|---|
| 2 | A | | | | | | |
|   | B | | | | | | |
|   | C | | | | | | |
| 3 | A | A1 | A2 | A3 | | | |
|   | B | B1 | B2 | B3 | | | |
|   | C | C1 | C2 | C3 | | | |
| 4 | A | A1 | A2 | A3 | | | |
|   | B | B1 | B2 | B3 | B4 | B5 | B6 |
|   | C | C1 | C2 | C3 | C4 | C5 | C6 |

FIG. 49

Space Time Coding Matrix Set

| Single Stream Index | Unitary Beam-Forming Vector | Two Stream Index | Unitary Beam-Forming Vector |
|---|---|---|---|
| 1 | V1 | 1 | V1 |
| 2 | V2 |   | V2 |
| 3 | V3 | 2 | V3 |
| 4 | V4 |   | V4 |
| 5 | V5 | 3 | V5 |
| 6 | V6 |   | V6 |
| 7 | V7 | 4 | V7 |
| 8 | V8 |   | V8 |

FIG. 50

CLOSED LOOP MIMO SYSTEMS AND METHODS

RELATED APPLICATIONS

This application claims the benefit of U.S. Provisional Patent Application No. 60/581,356 filed on Jun. 22, 2004, U.S. Provisional Patent Application No. 60/582,298 filed on Jun. 24, 2004, U.S. Provisional Patent Application No. 60/601,178 filed on Aug. 13, 2004, Provisional Patent Application No. 60/614,621 filed on Sep. 30, 2004, Provisional Patent Application No. 60/619,461 filed on Oct. 15, 2004 and Provisional Patent Application No. 60/642,697 filed on Jan. 10, 2005, all of which are hereby incorporated by reference in their entirety.

FIELD OF THE INVENTION

The invention relates to MIMO (multiple input, multiple output) systems and methods.

BACKGROUND OF THE INVENTION

In MIMO (multiple input multiple output) OFDM (orthogonal frequency division multiplexing) systems, there are multiple transmit antennas and multiple receive antennas and a plurality of sub-carriers that are available for transmission between the transmit antennas and the receive antennas for either one or multiple users. New advances in MIMO OFDM systems are taught in Applicant's co-pending application <application Ser. No. 10/593,053> entitled "Pilot Design For OFDM Systems With Four Transmit Antennas" filed Mar. 15, 2005, and in Applicant's co-pending application <intentional application no. PCT/CA2005/000507> entitled "Wireless Communication Methods, Systems, And Signal Structures" filed Apr. 4, 2005, both hereby incorporated by reference in their entirety. With open loop implementations, the transmitter transmits on the multiple transmitter antennas and sub-carriers without the benefit of channel information fed back from the receivers.

Efforts have been made to facilitate wireless closed-loop MIMO communications including broadband closed-loop MIMO, which might for example be based on OFDM modulation schemes, and narrowband closed-loop MIMO. Broadband closed-loop MIMO includes many sub-bands. Each of these sub-bands requires MIMO channel feedback for a closed-loop implementation. As a result the feedback resources required for broadband closed-loop MIMO can become quite large. Narrowband closed-loop MIMO, by comparison, includes one or a few sub-bands and requires a relatively smaller amount of feedback resources. Broadband and narrowband MIMO, therefore, have different applications.

SUMMARY OF THE INVENTION

According to one broad aspect, the invention provides a MIMO system comprising: a transmitter having multiple transmit antennas; at least one receiver, each receiver having at least one receive antenna; each receiver being adapted to transmit at least one type of feedback information selected from a group consisting of: information for use in performing beam-forming; antenna selection/grouping information.

In some embodiments, a transmission format to each receiver is selected from a group of transmission formats consisting of: spatial multiplexing; vector weighted spatial multiplexing; matrix weighted spatial multiplexing; K-stream spatial multiplexing employing more than K transmit antennas; single stream STTD, single stream STTD with proportional weighting and antenna selection) multi-stream STTD; multi-stream STTD with layer weighting; multi-stream STTD with a combination of layer weighting and proportional weighting; and hybrid beam-forming and spatial multiplexing.

In some embodiments, a defined sub-set of available formats is made available for a given receiver, and wherein the given receiver feeds back a selection of one of the defined sub-set of available formats.

In some embodiments, each receiver performs respective channel measurements and feeds back information for use in performing beam-forming based on the respective channel measurements.

In some embodiments, the information for use in performing beam-forming is selected from a group consisting of: a) elements of a measured channel matrix; b) elements of a V matrix of a SVD decomposed channel matrix; p) parameters of a Givens decomposition of a V matrix of a SVD decomposed channel matrix; d) parameters of a truncated Givens decomposition of a V matrix of a SVD decomposed channel matrix, where one or more eigenvectors are discarded; e) differentially encoded elements of a measured channel matrix; f) differentially encoded elements of a V matrix of a SVD decomposed channel matrix; g) differentially encoded parameters of a Givens decomposition or truncated Givens decomposition of a V matrix of a SVD decomposed channel matrix; h) Householder decomposition; i) full scalar quantization of any of the information types of a) through h); j) partial scalar quantization of any of the information types a) through g); k) scalar quantization of any one of the information types a) through h) where varying resolution is used to quantize parameters; l) vector quantization of any of the information types of a) through h); m) a combination of scalar quantization and differential quantization for any of the information types a) through h); n) using a Delta Sigma quantizer for any of the information types a) through h); o) binary beam-forming weights; p) a differential index into a set of vector quantizations; and q) pre-defined codebook.

In some embodiments, beam-forming feedback is performed by each receiver as a function of receiver specific criteria.

In some embodiments, the receiver specific criteria is selected from a group consisting of: Max SNR; b) Max Shannon capacity; and c) True receiver operational process.

In some embodiments, antenna selection/grouping information is at least one information type selected from a group consisting of: a) selection between SM (spatial multiplexing) and STTD (space time transmit diversity) transmission format; b) selection of particular antennas for SM transmission; c) selection and grouping of particular antennas for STTD transmission; and d) eigen-mode selection information.

In some embodiments, the system further comprises the receiver determining the antenna selection/grouping information by performing a step selected from a group of steps consisting of: performing SVD decomposition and discarding weak eigen-modes; selecting antennas using determinants of sub-MIMO channel matrices.

In some embodiments, feed back and beam-forming and/or antenna selection/grouping is performed for sub-carriers of a multi-carrier system to a resolution selected from a group consisting of: a) for every sub-carrier individually; b) for groups of consecutive sub-carriers; c) for an entire set of sub-carriers; d) for sets of groups of sub-carriers.

In some embodiments, transmission matrices and feedback are in accordance with one of FIGS. 11 to 14.

In some embodiments, the transmitter transmits pilots on each transmit antenna for use in performing channel estimation.

In some embodiments, at least some of the pilots are punctured pilots.

In some embodiments, at least some of the pilots comprise un-coded pilots for use by multiple receivers.

In some embodiments, the pilots comprise user specific pre-coded pilots for use by particular receivers.

In some embodiments, the pilots comprise user specific pre-coded pilots for use by particular receivers and un-coded pilots for use by multiple receivers.

In some embodiments, the pilot patterns are as shown in any one of FIGS. 17-23 with generalizations as described.

In some embodiments, the pilot patterns are as shown in one of FIGS. 26-31 with generalizations as described.

In some embodiments, feedback information is transmitted using a feedback channel having the structure of one of FIGS. 46 to 48 with generalizations as described.

In some embodiments, at least one receiver has a plurality of receive antennas.

In some embodiments, the at least one receiver comprises a plurality of receivers.

In some embodiments, sub-channels are defined using at least one of: AMC sub-channels, where respective adaptive modulation and coding is defined for each AMC sub-channel; PUSC sub-channels.

In another embodiment, a receiver is provided that is adapted to implement receiver functionality as summarized above.

In another embodiment, a transmitter is provided that is adapted to implement transmitter functionality as summarized above.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which:

FIG. 11 is a closed loop STC/MIMO 3-transmit antenna grouping arrangement in accordance with, an embodiment of the invention;

FIG. 12 is a closed loop STC/MIMO 3-transmit antenna selection arrangement in accordance with an embodiment of the invention;

FIG. 13 is a closed loop STC/MIMO 4-transmit antenna arrangement in accordance with an embodiment of the invention;

FIG. 14 is a closed loop STC/MIMO 4-transmit antenna arrangement in accordance with an embodiment of the invention;

FIGS. 15 and 16 show binary unitary beam-forming matrices in accordance with embodiments of the invention;

FIG. 42 contains a table of various direct differential encoding feedback in accordance with embodiments of the invention;

FIGS. 49 and 50 are a set of tables for concatenation of STC (space-time coding)/MIMO with a beam-former in accordance with an embodiment of the invention.

DETAILED DESCRIPTION OF THE PREFERRED EMBODIMENTS

General Background and Example System Overview

Figure 1:
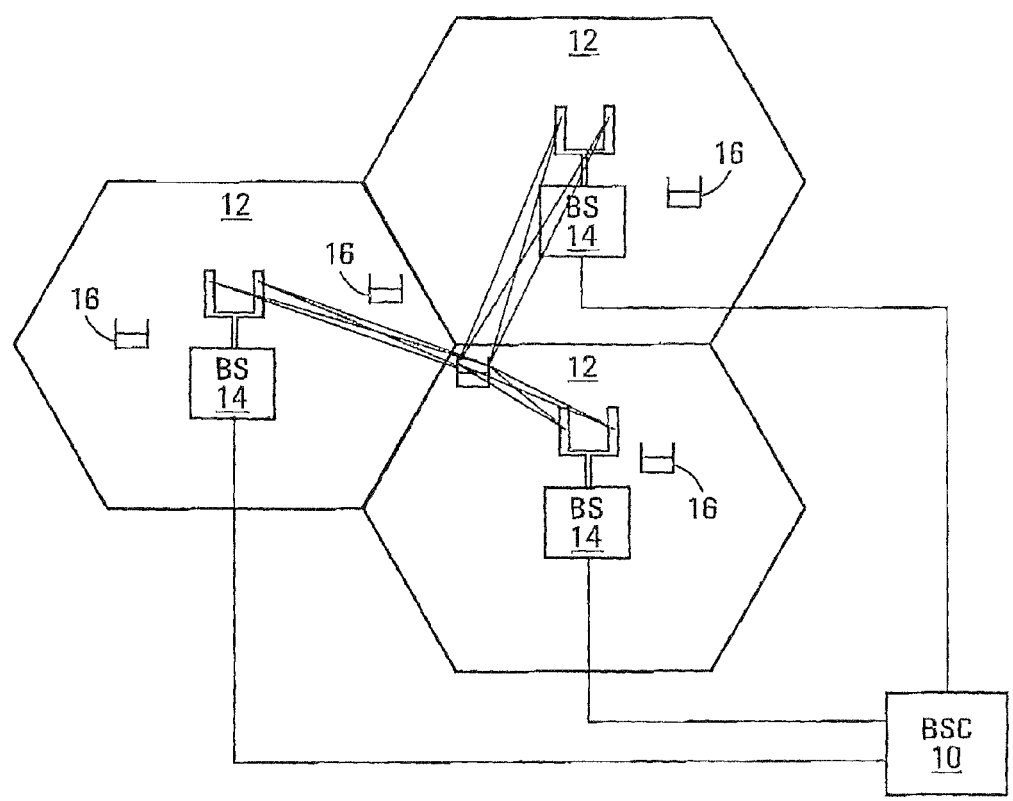
FIG. 1 is a schematic diagram representation of a cellular communication system according to one embodiment of the present invention.

The following provides a glossary of some of the terms used in this application:
AMC—Adaptive Coding and Modulation
BS or STS—Base Station
CL MIMO—Closed Loop MIMO
CQI—Channel Quality Indicator
CQICH—CQI channel
DFT—Discrete Fourier Transform
FB—Feedback
FDD—Frequency Duplex
FFT—Fast Fourier Transform
MIMO—Multiple Input Multiple Output
MLD—Maximum Likelihood Detector
MSE—Minimum square error
MSS—Mobile Subscriber Station
PUSC—Partially Utilized Sub-Channel
QoS—Quality of service
SISO—Single Input Single Output
SVD—Singular Value Decomposition
STTD—Space Time Transmit Diversity
SM—Spatial Multiplexing
SQ—Scalar Quantize
TDD—Time Duplex
VQ—Vector Quantize For purposes of providing context for the embodiments described below, an example OFDM system will now be described with reference to FIGS. 1 to 5. FIG. 1 shows a base station controller (BSC) 10 which controls wireless communications within multiple cells 12, which cells are served by corresponding base stations (BS) 14. In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 2:
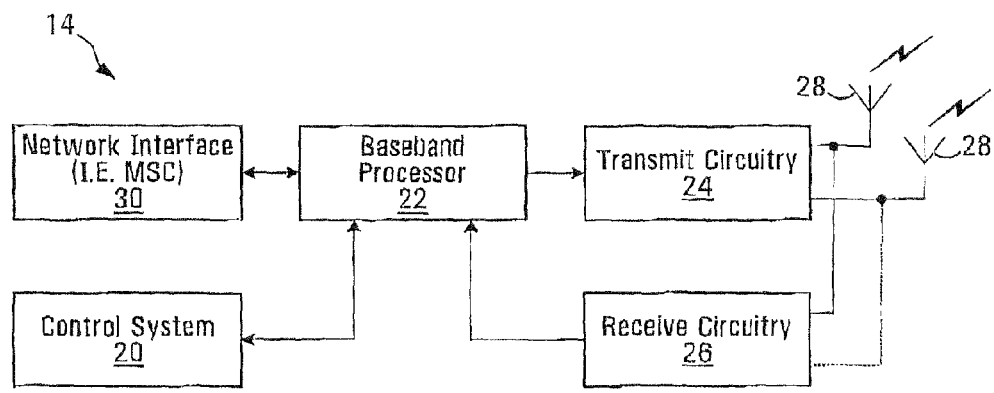
FIG. 2 is a block diagram representation of a base station according to one embodiment of the present invention.

An example of a high level overview of the mobile terminals 16 and base stations 14 that may be used with embodiments of the present invention is provided prior to delving into the structural and functional details of the preferred embodiments. With reference to FIG. 2, a base station 14 configured according to one embodiment of the present invention is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 3:
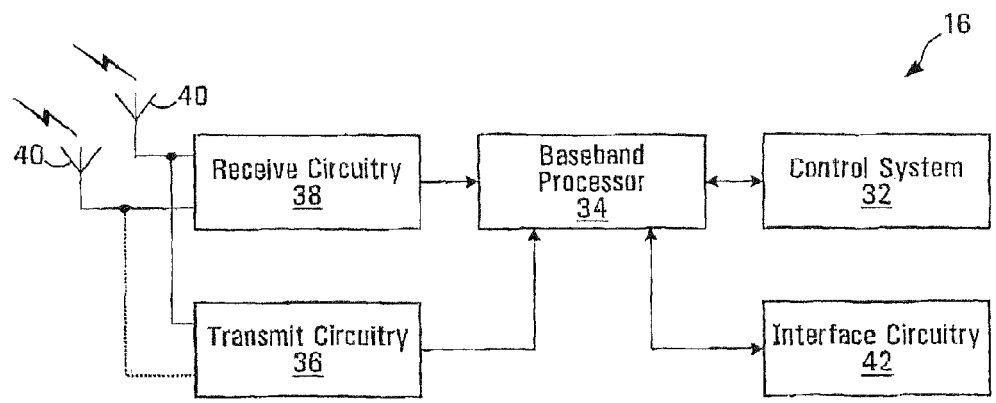
FIG. 3 is a block diagram representation of a mobile terminal according to one embodiment of the present invention.

With reference to FIG. 3, a mobile terminal 16 configured according to one embodiment of the present invention is illustrated. Similar to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed on greater detail below. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation typically employs the performance of an Inverse Fast Fourier Transform (IFFT) on the information to be transmitted. For demodulation, a Fast Fourier Transform (FFIT) is typically performed on the received signal to recover the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier wave are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In the preferred embodiment, OFDM is used for at least the downlink transmission from the base stations 14 to the mobile terminals 16. Each base station 14 is equipped with N transmit antennas 28, and each mobile terminal 16 is equipped with M receive antennas 40. Notably, the respective antennas can be used for reception and transmission using appropriate duplexers or switches.

Figure 4:
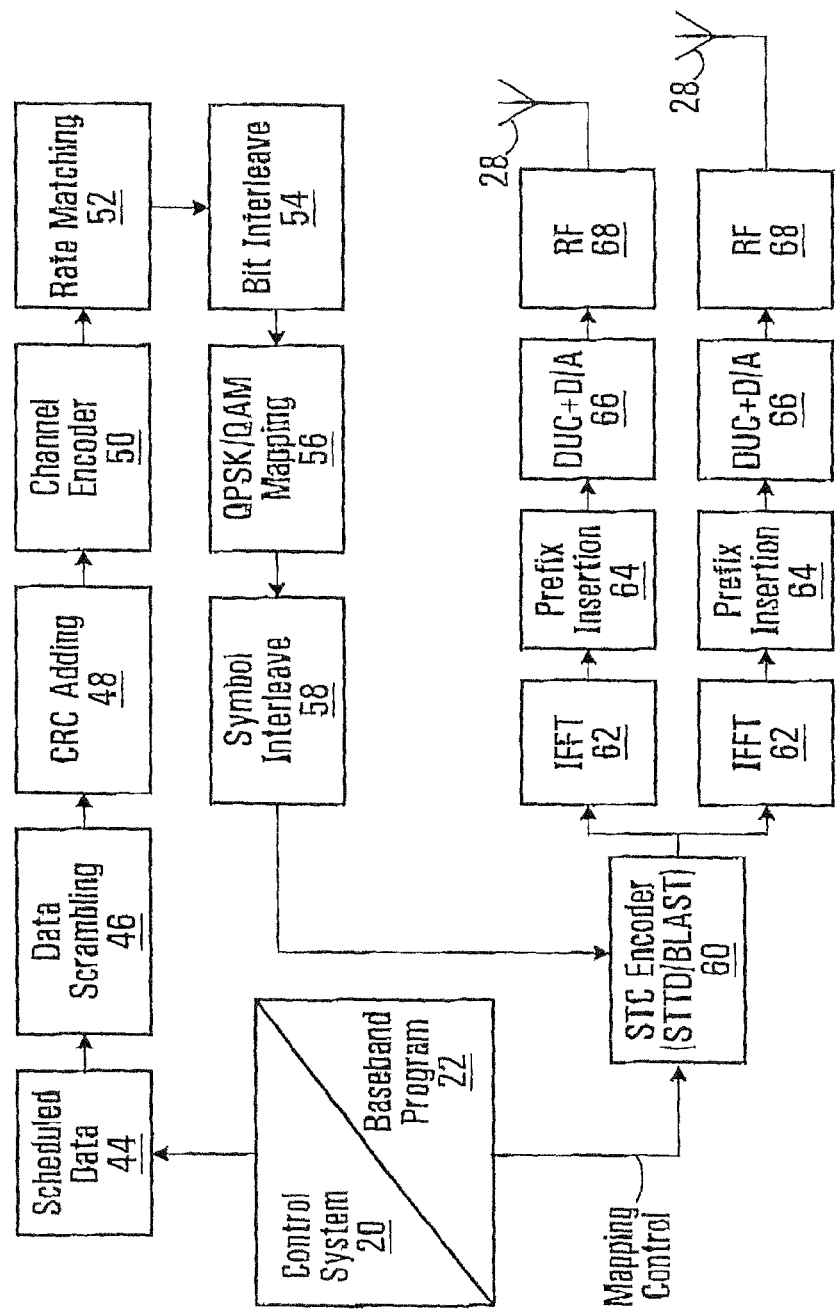
FIG. 4 is a logical breakdown of an OFDM transmitter architecture according to one embodiment of the present invention.

With reference to FIG. 4, a logical OFDM transmission architecture is provided according to one embodiment. Initially, the base station controller 10 will send data to be transmitted to various mobile terminals 16 to the base station 14. The base station 14 may use the CQIs associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. The channel coding for a particular mobile terminal 16 may be based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide N outputs corresponding to the number of transmit antennas 28 for the base station 14. The control system 20 and/or baseband processor 22 will provide a mapping control signal to control STC encoding. At this point, assume the symbols for the N outputs are representative of the data to be transmitted and capable of being recovered by the mobile terminal 16. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 14 has two antennas 28 (N=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an-inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 5:
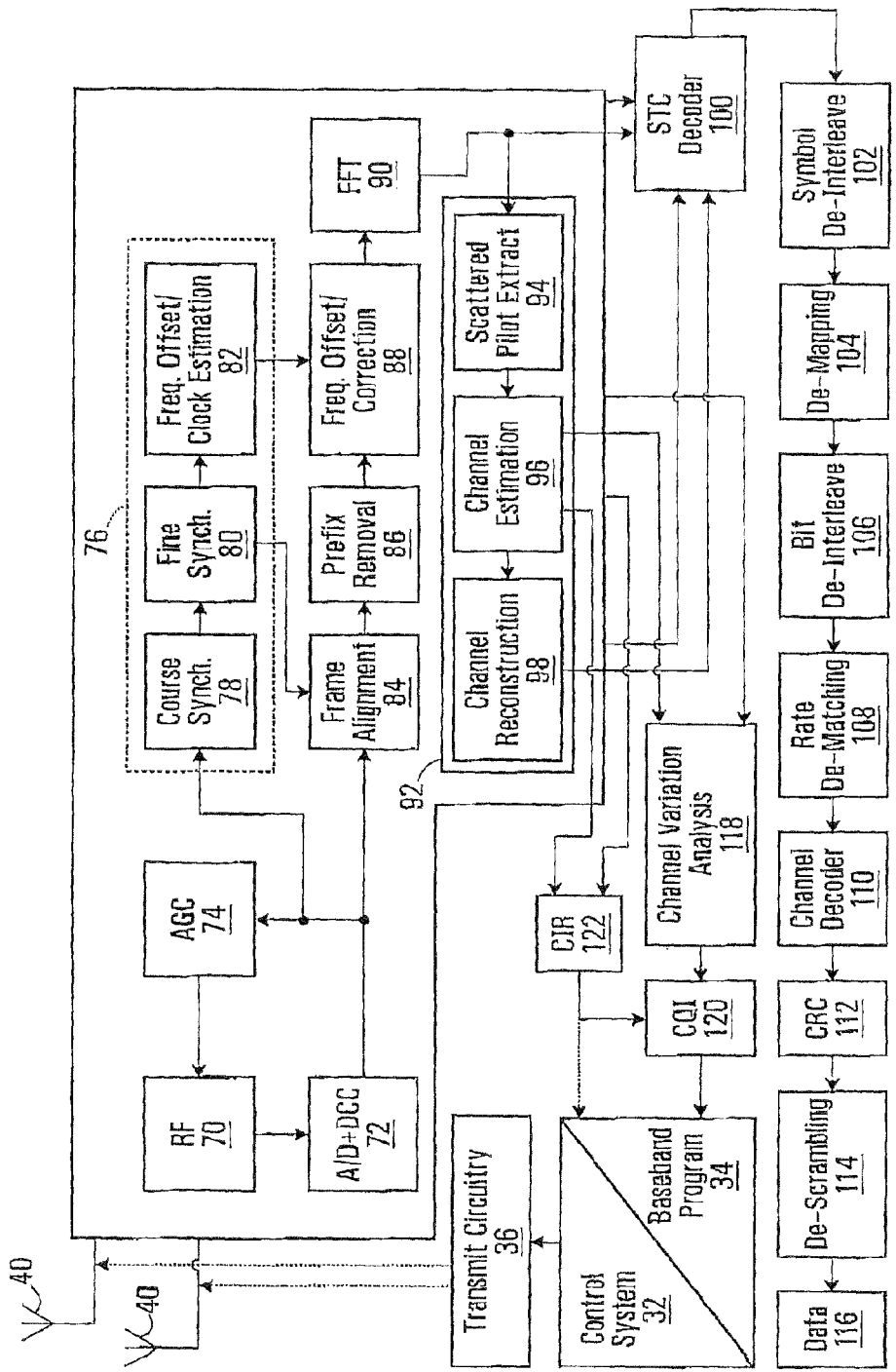
FIG. 5 is a logical breakdown of an OFDM receiver architecture according to one embodiment of the present invention.

Reference is now made to FIG. 5 to illustrate reception of the transmitted signals by a mobile terminal 16. Upon arrival of the transmitted signals at each of the antennas of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is multiple pilot symbols that are scattered among the data symbols throughout the OFDM sub-carriers in a known pattern in both time and frequency. Continuing with FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI in a preferred embodiment is a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information are compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

It is to be understood that the FIGS. 1 through 5 are for the purpose of providing an example system within which the closed loop MIMO embodiments described below can be applied. More generally, they can be applied in any system with multiple transmit antennas and multiple receive antennas, the particular number of transmit antennas and receive antennas being an implementation specific decision. Most of the embodiments are applicable to wide-band multi-carrier systems such as OFDM. However, they may also be applied to narrow band closed loop MIMO and even to single carrier closed loop MIMO. It is clear from the description that follows which embodiments would be applicable to a single carrier versus a multi-carrier context exclusively.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims. While the embodiments can be applied in a system such as exemplified in FIG. 1 to described above, embodiments are in no way limited to such application.

Transmission Formats for Closed Loop MIMO

Various Transmission formats are provided for closed loop MIMO air-interface designs. MIMO transmission formats and signalling apparatus are generalized to allow a variety MIMO schemes to operate using the same air-interface design. According to one aspect of the invention, basic transmission formats include: (1) spatial multiplexing (SM) and (2) space-time transmit diversity (STTD), with vector or matrix weighted full MIMO or sub-MIMO transmission based on various transmit antennas configurations. These formats can be used in single or multi-carrier configurations. The schemes can also be generalized to cover multiple base station transmission.

Some embodiments feature a receiver selecting between various available transmit formats. The particular formats to include in a given system are implementation specific.

Spatial Multiplexing (BLAST)

BLAST is also called spatial multiplexing (SM). This transmission format allows maximum parallel transmission of data streams and can achieve a theoretical capacity limit.

For an open loop M×N MIMO SM transmission (M transmit antennas and N receive antennas), basic transmission matrices are presented below in Table 1 for up to four transmit antennas. It is readily apparent how similar transmission matrices can be constructed for numbers of transmit antennas larger than four.

TABLE 1

Basic SM matrices

|  | 2-transmit matrix-A Time k | 3-transmit matrix-B Time k | 4-transmit matrix-C Time k |
|---|---|---|---|
| $Tx_1$ $Tx_2$ $Tx_3$ $Tx_4$ | $\begin{bmatrix} s_1 \\ s_2 \end{bmatrix}$ | $\begin{bmatrix} s_1 \\ s_2 \\ s_3 \end{bmatrix}$ | $\begin{bmatrix} s_1 \\ s_2 \\ s_3 \\ s_4 \end{bmatrix}$ |

For M transmit antenna SM, there can be N receiver antennas with N≥M. Where N<M for a given receiver, antenna selection can be performed to identify a subset of the M transmit antennas for use in BLAST transmission to the receiver. Mechanisms for performing antenna selection are described below.

Vector Weighted Closed Loop SM Transmission

For M×N MIMO vector weighted SM transmission according to an embodiment of the invention, the transmission matrices are presented below in Table 2 for up to four transmit antennas. It is readily apparent how vector weighted SM matrices can be extended to handle more than four transmit antennas. With vector weighted closed loop transmission, each symbol is transmitted on a single transmit antenna and a single weight is applied to each such symbol. Other users can then be supported using the remaining antenna(s).

TABLE 2

Vector weighted SM matrices

|  | 2-transmit matrix-A Time k | 3-transmit matrix-B Time k | 4-transmit matrix-C Time k |
|---|---|---|---|
| $Tx_1$ $Tx_2$ $Tx_3$ $Tx_4$ | $\begin{bmatrix} w_1 s_1 \\ w_2 s_2 \end{bmatrix}$ | $\begin{bmatrix} w_1 s_1 \\ w_2 s_2 \\ w_3 s_3 \end{bmatrix}$ | $\begin{bmatrix} w_1 s_1 \\ w_2 s_2 \\ w_3 s_3 \\ w_4 s_4 \end{bmatrix}$ |

Vector weighted SM allows, for example, per antenna power allocation and balancing, SINR optimization from the receiver, and joint transmit-receive closed loop optimization as a Weiner solution. For M transmit antenna vector weighted SM, there can be N receiver antennas with N≥M. Where N<M for a given receiver, antenna selection can be performed to identify a subset of the M transmit antennas for use in BLAST transmission to the receiver. Mechanisms for performing antenna selection are described below. Other users can then be supported using the remaining antenna(s)

Matrix Weighted Closed Loop SM Transmission

M×N MIMO matrix weighted SM transmission according to an embodiment of the invention has associated transmission matrices as shown in Table 3, where 2, 3 and 4 transmit antenna matrices are shown. As in the previous examples, it is readily apparent how matrix weighted SM transmission matrices can be extended to handle more than four transmit antennas. With matrix weighted spatial multiplexing, each symbol is represented on multiple transmit antennas with a respective weight. However, depending upon the weight selected, a given symbol may not necessarily be represented on all transmit antennas. Different examples of this are presented below.

TABLE 3

Matrix weighted SM matrices

|  | 2-transmit matrix-A Time k | 3-transmit matrix-B Time k | 4-transmit matrix-C Time k |
|---|---|---|---|
| $Tx_1$ $Tx_2$ $Tx_3$ $Tx_4$ | $\begin{bmatrix} w_1 s_1 + w_2 s_2 \\ w_3 s_1 + w_4 s_2 \end{bmatrix}$ | $\begin{bmatrix} w_1 s_1 + w_2 s_2 + w_3 s_3 \\ w_4 s_1 + w_5 s_2 + w_6 s_3 \\ w_7 s_1 + w_8 s_2 + w_9 s_3 \end{bmatrix}$ | $\begin{bmatrix} w_1 s_1 + w_2 s_2 + w_3 s_3 + w_4 s_4 \\ w_5 s_1 + w_6 s_2 + w_7 s_3 + w_8 s_4 \\ w_9 s_1 + w_{10} s_2 + w_{11} s_3 + w_{12} s_4 \\ w_{13} s_1 + w_{14} s_2 + w_{15} s_3 + w_{16} s_4 \end{bmatrix}$ |

The matrix weighted M×N SM transmission can be applied to a single user reception application where N≥M or to the multi-user concurrent transmission cases, such as 2×2×1, 4×4×1, 4×2×2, for example. In the above examples, 2×2×1 for example, means two transmit antennas, two users, and each user having one receive antenna. Where N<M for a given receiver, antenna selection can be performed to identify a subset of the M transmit antennas for use in BLAST transmission to the receiver. Mechanisms for performing antenna selection are described below. Other users can then be supported using the remaining antenna(s).

Tables 4 to 6 and FIGS. 6 and 7 below provide illustrative examples of single and multi-user configurations of vector and matrix weighted SM beam-formers. Referring first to Table 4, this is a set of example configurations for the two transmit antenna case, i.e., using the 2-transmit matrix-A of Table 3 describe above. Two different transmissions formats are shown with format-1 shown in the first row and format-2 shown in the second row. With format-1, a single user is assigned to the entire stream mapping. With format-2, a first user is assigned to symbol $s_1$ in the stream mapping and a second user is assigned to a symbol $s_2$ in the stream mapping. Thus, either one user is given both symbols of each pair, or two users are each given a single symbol in each pair. The transmit beam-forming that is performed is the same in both cases, however, the weights/feedback information will be different for one user as opposed to two users. The three right hand columns in Table 4 show various options for feeding back channel information. These will be expanded upon in much more detail below. For this example and the other examples below, the feedback options shown consist of feeding back the channel matrix or a portion thereof for a given user, with the form of the channel matrix or portion thereof being shown in the table, or feeding back unitary matrix information, vector information that may be quantized. The symbol "x" simply indicates that this option is available for each of the formats. With the example of Table 4, for format-1 the entire channel matrix can be fed back from the single receiver to the transmitter. Format-2, a first user would only transmit back a portion of the channel matrix, namely $h_{11}$, $h_{12}$. The other user would similarly transmit a portion of the channel matrix back, namely $h_{21}$, $h_{22}$. In the table, the values $w_1$, $w_2$, $w_3$ and $w_4$ are the weights that are applied in transmit beam-forming. These weights are determined as a function of the feedback information received. These weights are described in much more detail below. Note that in a typical implementation, only one of the various feedback options would be implemented. While the table shows three different feedback options, a larger number of feedback options are described below and any of these can be used in a given implementation.

Figure 6:
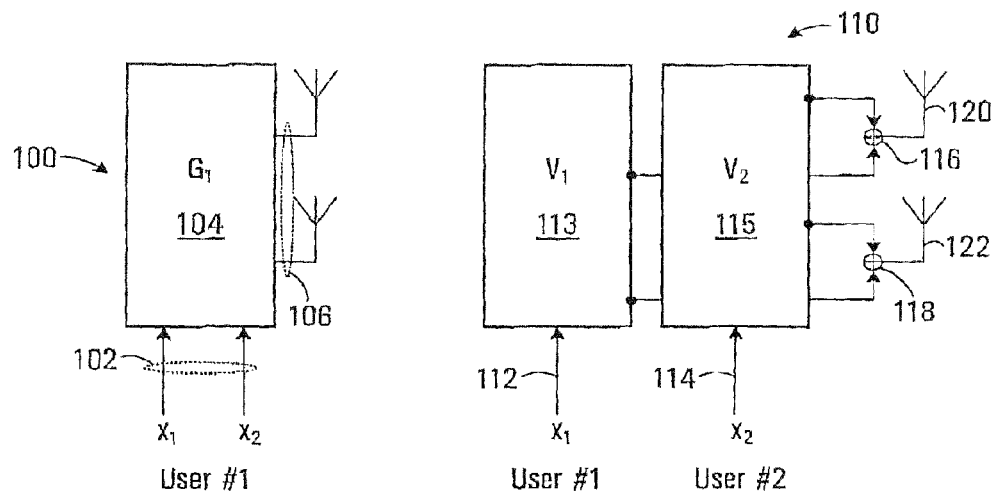
FIG. 6 is a first example schematic diagram for beamforming spatial multiplexing (SM) transmission using matrix or vector weighting according to an embodiment of the invention.

FIG. 6 provides an example of beam-forming SM transmission of matrix weighted matrix-A, wherein a first configuration generally indicated by 100 corresponds to a single user format with matrix weighting and a second configuration generally indicated by 110 corresponds to a multi-user format with matrix weighting.

The first configuration 100 is for a single user. The user input is indicated at 102, this consisting of two symbols $x_1$, $x_2$ at a given instant. These two inputs are then multiplied beam-forming weights in a beam-former 104 that implements, beam-forming matrix $G_1$ 104. The output of the beam-former 104 is then fed to a pair of transmit antennas 106. In the event of a matrix weighting, the beam-forming matrix corresponds to that of matrix-A for Table 3 above. A similar structure exists in the event of vector weighting (not shown), in which case the beam-forming matrix would correspond to matrix-A of Table 2 described above.

For the second configuration, generally indicated at 110, there are two separate user inputs indicated at 112, 114 respectively. Each of the two user inputs are multiplied by a respective vector with the first input 112 being multiplied by $V_1$ 113, and the second input being multiplied by $V_2$ 115. The outputs of these vector multiplications are summed on a per element basis in adders 116,118. The output of the first adder 116 is fed to the first transmit antenna 120 and the output of the second adder 118 is fed to the second transmit antenna 122. The two vector multiplications $V_1$ 113, $V_2$ 115 collectively implement the beam-forming operation of matrix-A of Table 3. Given that it is a multi-user format, it also corresponds to the transmission format-2 of Table 4 above.

Table 5 below provides similar information to that described in Table 4 above, but for a three transmit antenna case. In other words, this is elaborating the details of transmit formats available for the matrix weighted SM matrix-B described above in Table 3. The options available with a three transmit case are to use all three streams for a single user as indicated at format-1 in the first row, to use one of the three symbol streams for a first user and the remaining two symbol streams for a second user as shown in format-2 in the second row, and to assign a different user to each of the three streams as shown in format-3 in the third row. In all cases, the transmit beam-forming matrix has the same structure. The feedback options are again listed in the right hand three columns of Table 5.

TABLE 4

| | Configuration of Matrix weighted SM matrix-A | | | | | |
|---|---|---|---|---|---|---|
| | User Assignment | Stream Mapping | Transmit Seam-forming | Channel Matrix | Unitary Matrix/Vector | Compressed Quantizer |
| FORMAT-1 | User-1 | $\begin{bmatrix} s_1 \\ s_2 \end{bmatrix}$ | $\begin{bmatrix} w_1 s_1 + w_2 s_2 \\ w_3 s_1 + w_4 s_2 \end{bmatrix}$ | $\begin{bmatrix} h_{11} & h_{12} \\ h_{21} & h_{22} \end{bmatrix}$ | x | x |
| FORMAT-2 | User-1<br>User-2 | $\begin{bmatrix} s_1 \\ s_2 \end{bmatrix}$ | | $[h_{11}\ h_{12}]$<br>$[h_{21}\ h_{22}]$ | x<br>x | x<br>x |

TABLE 5

Configuration of Matrix weighted SM matrix-B

| | TRANSMISSION FORMATS | | | FEEDBACK OPTIONS | | |
|---|---|---|---|---|---|---|
| | User Assignment | Stream Mapping | Transmit Beam-forming | Channel Matrix | Unitary Matrix/ Vector | Compressed Quantizer |
| FORMAT-1 | User-1 | $\begin{bmatrix} s_1 \\ s_2 \\ s_3 \end{bmatrix}$ | $\begin{bmatrix} w_1 s_1 + w_2 s_2 + w_3 s_3 \\ w_4 s_1 + w_5 s_2 + w_6 s_3 \\ w_7 s_1 + w_8 s_2 + w_9 s_3 \end{bmatrix}$ | $\begin{bmatrix} h_{11} & h_{12} & h_{13} \\ h_{21} & h_{22} & h_{23} \\ h_{31} & h_{32} & h_{33} \end{bmatrix}$ | x | x |
| FORMAT-2 | User-1 User-2 | $\begin{bmatrix} s_1 \\ s_2 \\ s_3 \end{bmatrix}$ | | $[h_{11}\ h_{12}\ h_{13}]$ $\begin{bmatrix} h_{11} & h_{12} & h_{13} \\ h_{21} & h_{22} & h_{23} \end{bmatrix}$ | x x | x x |
| FORMAT-3 | User-1 User-2 User-3 | $\begin{bmatrix} s_1 \\ s_2 \\ s_3 \end{bmatrix}$ | | $[h_{11}\ h_{12}\ h_{13}]$ $[h_{21}\ h_{22}\ h_{23}]$ $[h_{31}\ h_{32}\ h_{33}]$ | x | x |

Similarly, the configurations available for a four transmit antenna configuration with matrix weighting are shown in Table 6 below. A single user format is shown in the first row; two user formats are shown in the second and fourth rows, a three user format is shown in the third row, and a four user format is shown in the fifth row. It is to be understood that not all of the potential formats have been exhaustively shown in Table 6. In all cases, the transmit beam-forming matrix has the same structure, and the feedback options for the different formats are shown in the right hand three columns of Table 6.

TABLE 6

Configuration of Matrix weighted SM matrix-C

| | TRANSMISSION FORMATS | | | FEEDBACK OPTIONS | | |
|---|---|---|---|---|---|---|
| | User Assignment | Stream Mapping | Transmit Beam-forming | Channel Matrix | Unitary Matrix/ Vector | Compressed Quantizer |
| FORMAT-1 | User-1 | $\begin{bmatrix} s_1 \\ s_2 \\ s_3 \\ s_4 \end{bmatrix}$ | $\begin{bmatrix} w_1 s_1 + w_2 s_2 + w_3 s_3 + w_4 s_4 \\ w_5 s_1 + w_6 s_2 + w_7 s_3 + w_8 s_4 \\ w_9 s_1 + w_{10} s_2 + w_{11} s_3 + w_{12} s_4 \\ w_{13} s_1 + w_{14} s_2 + w_{15} s_3 + w_{16} s_4 \end{bmatrix}$ | $\begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$ | x | x |
| FORMAT-2 | User-1 User-2 | $\begin{bmatrix} s_1 \\ s_2 \\ s_3 \\ s_4 \end{bmatrix}$ | | $\begin{bmatrix} h_{11} & h_{12} & h_{13} & h_{14} \\ h_{21} & h_{22} & h_{23} & h_{24} \end{bmatrix}$ $\begin{bmatrix} h_{31} & h_{32} & h_{33} & h_{34} \\ h_{41} & h_{42} & h_{43} & h_{44} \end{bmatrix}$ | x x | x x |
| FORMAT-3 | User-1 User-2 User-3 | $\begin{bmatrix} s_1 \\ s_2 \\ s_3 \\ s_4 \end{bmatrix}$ | | $[h_{11}\ h_{12}\ h_{13}\ h_{14}]$ $[h_{21}\ h_{22}\ h_{23}\ h_{24}]$ $\begin{bmatrix} h_{31} & h_{32} & h_{33} & h_{34} \\ h_{41} & h_{42} & h_{43} & h_{44} \end{bmatrix}$ | x x x | x x x |
| FORMAT-4 | User-1 User-2 | $\begin{bmatrix} s_1 \\ s_2 \\ s_3 \\ s_4 \end{bmatrix}$ | | $[h_{11}\ h_{12}\ h_{13}\ h_{14}]$ $\begin{bmatrix} h_{21} & h_{22} & h_{23} & h_{24} \\ h_{31} & h_{32} & h_{33} & h_{34} \\ h_{41} & h_{42} & h_{43} & h_{44} \end{bmatrix}$ | x x | x x |
| FORMAT-5 | User-1 User-2 User-3 User-4 | $\begin{bmatrix} s_1 \\ s_2 \\ s_3 \\ s_4 \end{bmatrix}$ | | $[h_{11}\ h_{12}\ h_{13}\ h_{14}]$ $[h_{21}\ h_{22}\ h_{23}\ h_{24}]$ $[h_{31}\ h_{32}\ h_{33}\ h_{34}]$ $[h_{41}\ h_{42}\ h_{43}\ h_{44}]$ | x x x x | x x x x |

Figure 7:
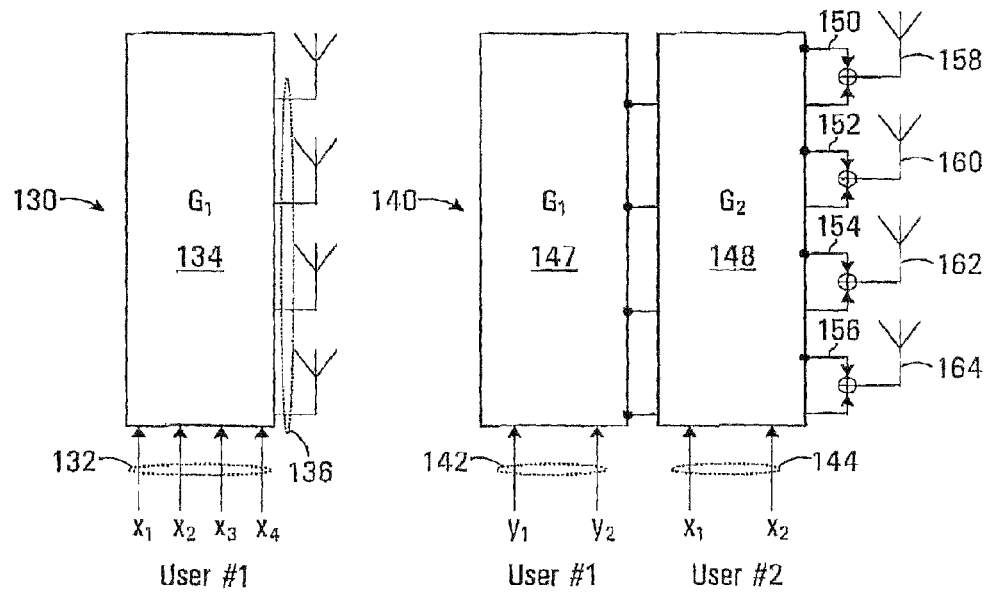
FIG. 7 is a second example schematic diagram for beamforming SM transmission with matrix weighting according to an embodiment of the invention.

FIG. 7 shows two examples of beam-forming SM transmission of Matrix weighted matrix-C. A first configuration, generally indicated at 130, corresponds to format-1 of Table 6 above, namely a format in which a single user is transmitting on all four antennas. The single user's data inputs are indicated at 132; these are processed by beam-forming matrix $G_1$ 134 the output of which is transmitted on four antennas 136.

The second configuration shown in FIG. 2, generally indicated at 140, corresponds to format-2 of Table 6 described above, namely a format in which there are two users each of which occupy two of the streams. The first user's input is indicated at 142, and the second user's input is indicated at 144. The entire arrangement indicated at 146 performs a beam-forming operation on the two user inputs. This involves multiplying user 1 input by matrix $G_1$ 147 and user 2 input 144 by matrix $G_2$ 148. The output to these two multiplication operations are added in adders 150,152,154, 156 and then output on antennas 158,160,162,164. It should be readily apparent how similar the structure can be created for each of the other available formats described above.

The above described BLAST vector and weighted transmission configurations are generally applicable for closed loop MIMO systems with 2, 3 and 4 antennas. It should be readily apparent how these can be extended to handle a larger number of antennas.

In a multi-carrier environment, these transmission configurations can be applied either on a per-carrier basis, for blocks of contiguous carriers, sets of non- or partially-contiguous carriers, or for an entire transmit bandwidth. Thus, for the OFDM particular implementations, in some implementations, a different beam-forming matrix/user assignment can be applied on a per-carrier basis; in other implementations, the available OFDM bandwidth is divided into sub-bands, and the same beam-forming matrix/user assignment is used on each sub-band; and yet a further available option, the entire OFDM bandwidth is used to transmit with the same beam-forming configuration. In yet another option, the entire available OFDM bandwidth divided into small sub-channels, with each user being assigned a respective set of such sub-channels.

Spatial Multiplexing when there are More Transmit Antennas than Receive Antennas When there are extra transmit antennas, antenna selection and signal pre-processing can be used to significantly enhance link level performances. The SNR relation is: $\gamma_{pp} > \gamma_{as} > \gamma_{fa}$, where $\gamma_{pp}$, $\gamma_{as}$, and $\gamma_{fa}$ are the SNRs of pre-processing, antenna selection, and fixed antenna configuration (using M fixed transmit antennas from a pool of N). The gain of signal pre-processing over antenna selection is mainly from the use of beam-forming. Details of how feedback can be performed for beam-forming are given below. The gain of antenna selection over fixed antenna configuration is from two areas: diversity gain and average SNR gain (over STC). Preferably, the water-filling principle (the principle of using the most energy where conditions are the best) is applied to both antenna selection and beam-forming. Antenna selection is the most simple and effective way to achieve diversity and SNR gain.

Antenna Selection for Spatial Multiplexing

With antenna selection, the receiver analyzes conditions on the channel and selects antennas that are best for that receiver. This antenna selection information is then fed back to the transmitter for use in performing the actual transmissions.

Antenna Selection for a Single User with Single Antenna

A single stream selective transmit diversity technique is represented in Table 7 below. This example assumes that there are four transmit antennas available to be selected for a single receive antenna user. The four different transmit options are shown in the table to include: the user's symbol $s_1$ being transmitted either using the first transmit antenna $Tx_1$, or the second, third or fourth transmit antenna similarly labelled. In order for the transmitter to know which antenna to use, preferably a feedback signal from the receiver is employed. In the particular example shown, a two bit feedback signal is shown in the first column that can be used to identify one of four different possible transmit antennas. Other formats for the feedback information can be employed. When a single antenna is used, there is no spatial multiplexing.

Once again for a multi-carrier implementation, antenna selection can take place to any appropriate sub-carrier resolution. The particular feedback signalling is one particular example of how to signal back an identity of one of four antennas. An appropriate signalling mechanism can be employed. Furthermore, the antenna selection mechanism can be extended to differing numbers of transmit antennas.

TABLE 7

SISO selective transmit diversity

|  |  | $Tx_1$ | $Tx_2$ | $Tx_3$ | $Tx_4$ |
|---|---|---|---|---|---|
| $b_0b_1 = 00$ | Time t | $s_1$ | 0 | 0 | 0 |
| $b_0b_1 = 01$ | Time t | 0 | $s_1$ | 0 | 0 |
| $b_0b_1 = 10$ | Time t | 0 | 0 | $s_1$ | 0 |
| $b_0b_1 = 11$ | Time t | 0 | 0 | 0 | $s_1$ |

2-Stream Spatial Multiplexing for Single User

An embodiment of the invention proposes closed loop sub-MIMO selection for SM. The term "sub-MIMO" is used to describe the case where there are multiple transmit antennas and a fewer number of receive antennas, and antenna selection is used to select a subset of the transmit antennas for use by the given receiver with the remaining antennas being available for other receivers. This will be described in the context of a 4×2 sub-MIMO system, in which the channel matrix to a given receiver has the following format:

$$H = \begin{bmatrix} h_{11} & h_{12} & h_{13} & h_{14} \\ h_{21} & h_{22} & h_{23} & h_{24} \end{bmatrix}.$$

Selecting two of the four antennas results in a smaller 2×2 channel matrix for the given receiver. There are six different possible channel matrices depending upon which of the two of the four transmit antennas are selected. The six possible channel matrices are as follows:

$$H_{12} = \begin{bmatrix} h_{11} & h_{12} \\ h_{21} & h_{22} \end{bmatrix} \quad H_{13} = \begin{bmatrix} h_{11} & h_{12} \\ h_{21} & h_{22} \end{bmatrix} \quad H_{21} = \begin{bmatrix} h_{12} & h_{13} \\ h_{22} & h_{23} \end{bmatrix}$$

$$H_{14} = \begin{bmatrix} h_{11} & h_{14} \\ h_{21} & h_{24} \end{bmatrix} \quad H_{24} = \begin{bmatrix} h_{12} & h_{14} \\ h_{22} & h_{24} \end{bmatrix} \quad H_{34} = \begin{bmatrix} h_{13} & h_{14} \\ h_{23} & h_{24} \end{bmatrix}$$

These six potential channel matrices can then be analyzed to determine which sub-MIMO channel is best, i.e., which of the two four transmit antennas are best for the particular user. Any appropriate way of selecting the two antennas can be implemented. In the particular example that follows, antenna selection is performed on the basis of determinants calculated for the different channel matrices. The particular pair of antennas that is best for a given receiver is determined by selecting the sub-system $H_{ij}$ that satisfies $$|det(H_{ij})|=\max\{|det(H_{12})|,|det(H_{13})|,|(H_{23})|,|det(H_{14})|,|det(H_{24})|,|det(H_{34})|\}.$$

Figure 8:
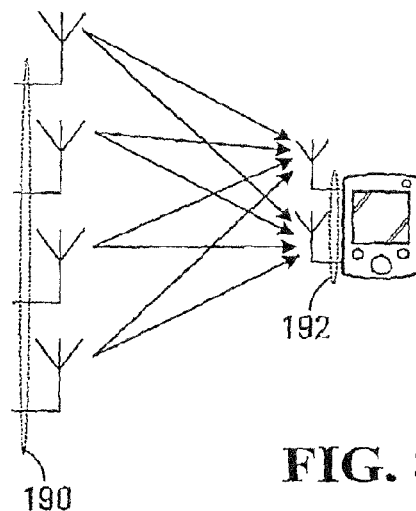
FIG. 8 is a schematic diagram for use in describing antenna/sub-channel selection criteria.

This is depicted in FIG. 8 where a transmitter has four transmit antennas 190, and a receiver has two receive antennas 192. The determinant method is employed to select two of the four transmit antennas 190 for transmitting to the receiver.

More generally, in a K receive antenna system, K columns from channel matrix H can be selected, where K is the size of the subset antenna group. There are a total of $C^K_M$ choices. For each possible selection, calculate det(H'H). Finally, select the antenna group with max(det(H'H)).

As in previous discussions, for multi-carrier applications, antenna selection can be used at whatever frequency resolution may be determined for a given application. The best antenna group may differ for different sub-carriers. If no other users are simultaneously being transmitted to, null sub-carriers are preferably fed into non-selected antennas. This antenna selection process is typically performed at the receiver. Once the best two transmit antennas have been selected at the receiver, the selection is fed back to the transmitter. An example of how this feedback can be performed is shown in Table 8 below. The transmit contents that are possible are shown for each of the four transmit antennas. It can be seen that there are six different permutations depending upon which two transmit antennas are selected. The first column is used to show how three bits can be used to transmit a selection of two of the six antennas. Other feedback formats are possible. In some implementations feed back is for every sub-carrier. If three bits are fed back on a per sub-carrier basis, then for L sub-carriers, L×3 bits would be required. In some implementations, feed back is for a sub-channel of contiguous sub-carriers. If three bits are fed back for a contiguous block of sub-carriers, under the assumption that channel conditions are substantially constant across the block, obviously fewer feedback bits are required.

TABLE 8

2-Layer SM with Beam-forming with antenna selection

|  |  | $Tx_1$ | $Tx_2$ | $Tx_3$ | $Tx_4$ |
|---|---|---|---|---|---|
| $b_0b_1b_2 = 000$ | Time t | $w_1s_1$ | $w_2s_2$ | 0 | 0 |
| $b_0b_1b_2 = 001$ | Time t | $w_1s_1$ | 0 | $w_2s_2$ | 0 |
| $b_0b_1b_2 = 010$ | Time t | 0 | $w_1s_1$ | $w_2s_2$ | 0 |
| $b_0b_1b_2 = 011$ | Time t | $w_1s_1$ | 0 | 0 | $w_2s_2$ |
| $b_0b_1b_2 = 100$ | Time t | 0 | $w_1s_1$ | 0 | $w_2s_2$ |
| $b_0b_1b_2 = 101$ | Time t | 0 | 0 | $w_1s_1$ | $w_2s_2$ |

In this case, the sub-MIMO channel selection is based on the sub-MIMO channel condition and the antenna power allocation for the SM data can be adjusted by the feedback information pertaining to the weights.

Antenna group index (illustratively 3 bits), and proportional weighting vector (illustratively 2 real elements (or alternatively complex elements), each element being of 4-bits, 6-bits, or 8-bits) are preferably provided as feedback signals. It should be appreciated, however, that weights may be derived from feedback information and need not necessarily be directly provided in feedback information.

Closed Loop Sub-MIMO Selection with Beam-Forming

For a DL 4×2 MIMO system, consider six sub-MIMO systems $H_{1,2}$, $H_{1,3}$, $H_{1,4}$, $H_{2,3}$, $H_{2,4}$, and $H_{3,4}$. Assuming that $H_{ij}$, $H_{ik}$ and $H_{il}$ are the sub-MIMO systems that satisfy:

$|det(H_{ij})|+|det(H_{ik})|+|det(H_{il})|=\max\{|det(H_{ij})|+|det(H_{ik})|+|det(H_{il})|,|det(H_{ij})|+|det(H_{jk})|+|det(H_{ji})|\}$ then by beam-forming with the $j^{th}$ and $k^{th}$ columns of H, and setting the weights to $$w_j = \frac{det^*(H_{il})}{\sqrt{|det^*(H_{ij})|^2 + |det^*(H_{ik})|^2 + |det^*(H_{il})|^2}}$$

$$w_k = \frac{det^*(H_{ik})}{\sqrt{|det^*(H_{ij})|^2 + |det^*(H_{ik})|^2 + |det^*(H_{il})|^2}}$$

$$w_l = \frac{det^*(H_{il})}{\sqrt{|det^*(H_{ij})|^2 + |det^*(H_{ik})|^2 + |det^*(H_{il})|^2}}$$

respectively, where the particular selection of the three determinants maximizes the denominator in the above-weight calculation we have $$det(H_{ij}^{(jkl)})=\sqrt{|det^*(H_{ij})|^2+|det^*(H_{ik})|^2+|det^*(H_{il})|^2}.$$

Table 9 is an illustrative example of this. A single antenna is used to transmit a stream without any weighting; another antenna is used to transmit the same stream with weighting; and the remaining two antennas are used to transmit the other second stream, both with weighting. The particular antenna used to transmit either the un-weighted symbol or the weighted symbols is information that is preferably fed back to the transmitter. The weighting vector or information from which the weights can be derived is also preferably fed back from the receiver to the transmitter. Thus, the illustrated example, this would require the equivalent of three bits to identify one of the six permutations, and additional feedback for the three weights $w_1$, $w_2$ and $w_3$. This format is a hybrid of beam-forming and spatial multiplexing. In this example, there are two data streams mapped onto four antennas. Each symbol is transmitted on two different antennas with the weights as shown in the table below. Antenna selection is performed to select which antennas go together to transmit the same symbol, and beam forming is used to apply weights to three of the four antennas. Four weights could be applied alternatively. It should be readily apparent how this concept can be extended to handle larger numbers of antennas overall and/or larger numbers of antennas per stream and/or larger numbers of streams. This approach will be referred to as K-layer SM employing more than K transmit antennas. In the example, we have 2-layer SM with four transmit antennas.

TABLE 9

2-Layer SM with antenna selection and beam-forming

|  |  | $Tx_1$ | $Tx_2$ | $Tx_3$ | $Tx_4$ |
|---|---|---|---|---|---|
| $b_0b_1b_2 = 000$ | Time t | $s_1$ | $w_1s_2$ | $w_2s_1$ | $w_3s_2$ |
| $b_0b_1b_2 = 001$ | Time t | $s_1$ | $w_2s_1$ | $w_1s_2$ | $w_3s_2$ |
| $b_0b_1b_2 = 010$ | Time t | $s_1$ | $w_1s_1$ | $w_2s_2$ | $w_3s_2$ |
| $b_0b_1b_2 = 011$ | Time t | $w_3s_2$ | $s_1$ | $w_1s_2$ | $w_2s_1$ |
| $b_0b_1b_2 = 100$ | Time t | $w_3s_2$ | $s_1$ | $w_2s_1$ | $w_1s_2$ |
| $b_0b_1b_2 = 101$ | Time t | $w_3s_2$ | $w_2s_1$ | $s_1$ | $w_1s_2$ |

STTD Transmission Formats

The transmission formats described thus far have all been based on the BLAST approach in which there is a single transmitted symbol for each information symbol, or on the BLAST variant described by way of example with reference to Table 9 above in which each K-stream blast is employed on more than K antennas, so at least some of the symbols are transmitted twice. Additional transmission formats are based on STTD (space time transmit diversity) in which there are at least two transmitted symbols based on each information symbol, and typically sets of two information symbols are transmitted using 2×2 Alamouti block. However, other STTD formats are also contemplated.

Single Stream Weighted STTD (SSTD) for a Single User with Antenna Selection and Proportional Weighting In another transmission format, for a single data steam, transmit diversity is "proportionally weighted" STTD. This is a middle approach between conventional STTD (no weighting) and antenna switching. One advantage of this scheme is to safeguard against possible feedback error, feedback delay, and possible channel change between feedback updates for the antenna selection. The channel matrix condition (CMC) does not affect STTD when orthogonal codes are used. For quasi-orthogonal codes, CMC does affect signal quality.

In the case of single stream transmit diversity, we also have the two options of beam-forming and antenna selection that can be performed similarly to that described above for the BLAST transmission formats. Beam-forming involves applying weights to the elements of the STTD groups, and antenna selection involves selecting a sub-set of a set of available transmit antennas for transmitting the stream.

For an SSTD system with four transmit antennas, a hybrid proportionally weighted STTD approach can be used. In one embodiment, the two antennas with the strongest combined SNR are selected, and proportional weighting on these two selected antennas is then applied. The advantages of this scheme include: diversity and SNR gain due to antenna selection, increased robustness provided by proportional weighting, and the employment of efficient Alamouti codes. An example of SSTD with antenna selection and proportional weighting is given in Table 10, where two antennas out of four are selected and weighted.

TABLE 10

SSTD with antenna selection and proportional weighting

| | | $Tx_1$ | $Tx_2$ | $Tx_3$ | $Tx_4$ |
|---|---|---|---|---|---|
| $b_0b_1b_2 = 000$ | Time t | $w_1s_1$ | $w_2s_2$ | 0 | 0 |
| | Time (t + T) | $-w_1s_2^*$ | $w_2s_1^*$ | 0 | 0 |
| $b_0b_1b_2 = 001$ | Time t | $w_1s_1$ | 0 | $w_2s_2$ | 0 |
| | Time (t + T) | $-w_1s_2^*$ | 0 | $w_2s_1^*$ | 0 |
| $b_0b_1b_2 = 010$ | Time t | 0 | $w_1s_1$ | $w_2s_2$ | 0 |
| | Time (t + T) | 0 | $-w_1s_2^*$ | $w_2s_1^*$ | 0 |
| $b_0b_1b_2 = 011$ | Time t | $w_1s_1$ | 0 | 0 | $w_2s_2$ |
| | Time (t + T) | $-w_1s_2^*$ | 0 | 0 | $w_2s_1^*$ |
| $b_0b_1b_2 = 100$ | Time t | 0 | $w_1s_1$ | 0 | $w_2s_2$ |
| | Time (t + T) | 0 | $-w_1s_2^*$ | 0 | $w_2s_1^*$ |
| $b_0b_1b_2 = 101$ | Time t | 0 | 0 | $w_1s_1$ | $w_2s_2$ |
| | Time (t + T) | 0 | 0 | $-w_1s_2^*$ | $w_2s_1^*$ |

In this case, feedback signals preferably include antenna group index (illustratively 3 bits), proportional weighting vector or other information allowing the determination of the weighting vector (illustratively 2 real elements, each element might for example be of 4-bits, 6-bits, or 8-bits). It should be readily apparent how the single stream case can be extended to larger numbers of transmit antennas.

Double Stream Transmit Diversity (D-STTD) for a Single User

With double stream transmit diversity, two streams are transmitted to a single user with each stream being sent using a respective weighted Alamouti code structure (or some other STTD structure). More generally, with an M transmit antenna system, M/2 STTD sub-groups can be formed and transmitted to a different receiver, although multiple or all of the sub-groups might be sent to one receiver. This is a hybrid case of STTD and space-multi-plexing (SM). Because of inter-code interference, antenna grouping becomes more important. Preferably, layer based water-filling is employed to provide additional gain to the system. With layer-based water-filling, more power is transmitted to the layer having the better channel. Thus, with a double STTD system, a respective pair of antennas is assigned to each stream, and the respective "layer" is transmitted on that pair of antennas. Preferably, more power is given to the layer having the better channel conditions.

An example of a set of possible layer weighting permutations is shown in Table 11 for the four transmit antenna case. In the first row, transmit antennas 1 and 2 are grouped together, and antenna 3 and 4 are grouped together, to form two constituent STTD codes that can be assigned to respective receivers or to a single receiver. In the example of Table 11 below, symbols $s_1$ and $s_2$ are of one layer, while symbols $s_3$ and $s_4$ are of a second layer.

TABLE 11

Double STTD with layer weighting

| | | $Tx_1$ | $Tx_2$ | $Tx_3$ | $Tx_4$ |
|---|---|---|---|---|---|
| $b_0b_1 = 00$ | Time t | $w_1s_1$ | $w_1s_2$ | $w_2s_3$ | $w_2s_4$ |
| | Time (t + T) | $-w_1s_2^*$ | $w_1s_1^*$ | $-w_2s_4^*$ | $w_2s_3^*$ |
| $b_0b_1 = 01$ | Time t | $w_1s_1$ | $w_2s_3$ | $w_1s_2$ | $w_2s_4$ |
| | Time (t + T) | $-w_1s_2^*$ | $-w_2s_4^*$ | $w_1s_1^*$ | $w_2s_3^*$ |
| $b_0b_1 = 10$ | Time t | $w_1s_1$ | $w_2s_3$ | $w_2s_4$ | $w_1s_2$ |
| | Time (t + T) | $-w_1s_2^*$ | $-w_2s_4^*$ | $w_2s_3^*$ | $w_1s_1^*$ |

The feedback signals in this case are used to select one of the three different permutations, and this can take the form of an antenna group index (2 bits in the example shown), and weights or information relating to weights. In this implementation, there are two STTD water-filling weights and each can be fed back to an implementation specific resolution, for example, 4-bits, 6-bits, or 8-bits. The water-filling weights determine the relative amount of power used on the two STTD groups.

Figure 9:
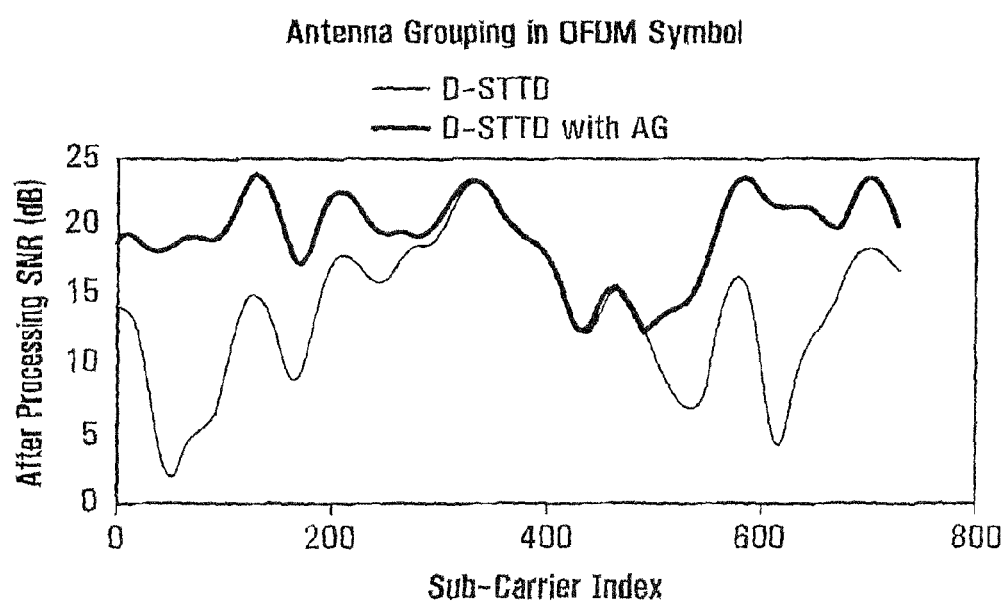
FIG. 9 is a graphical comparison of fixed D-STTD (double-space-time time division) and antenna grouping D-STTD.

In summary, the options for STTD transmissions for a single user include a pair of antennas to transmit a single layer, or multiple pairs of transmit antennas each used to transmit a respective layer, in each of these oases each layer being transmitted using STTD. Preferably, for multi-carrier applications, antenna selection/grouping is performed on a per sub-carrier basis. Alternatively, it can be performed for some other sub-carrier breakdown. In the event an entire OFDM band, this would be referred to as "fixed" STTD, while in the event of antenna grouping on a per sub-carrier basis, this is referred to as antenna grouping D-STTD. FIG. 9 shows a comparison of the performance of fixed D-STTD and antenna grouping D-STTD for an OFDM system. It can be seen that over a range of sub-carriers, the fixed D-STTD will perform similarly to the antenna grouping D-STTD on sub-carriers where the particular fixed antennas perform the best. Elsewhere, the antenna grouping D-STTD will perform better. In the example of FIG. 9, on a per sub-carrier basis, an antenna grouping has been performed. The feedback required for this implementation would be two bits per sub-carrier to choose the antennas. Preferably, weights are also fed back if there is available bandwidth for this.

In addition to antenna grouping, antenna selection can also be used to eliminate some of the antennas and only use a single antenna per STTD block. This will make a 4×2 double STTD system degenerate to a 2×2 BLAST system. In fact, this can be viewed as applying antenna selection to each STTD sub-code-after the rule of antenna grouping has been applied.

For example, if antenna selection is also used with the W-STTD format in the second row of Table 11 to eliminate the first and fourth transmit antennas, the result is something that is effectively equivalent to a 2×2 BLAST system as shown in Table 12 below.

TABLE 12

Weighted BLAST degenerated from double STTD

| | $Tx_1$ | $Tx_2$ | $Tx_3$ | $Tx_4$ |
|---|---|---|---|---|
| Time t | 0 | $w_2 s_3$ | $w_1 s_2$ | 0 |
| Time (t + T) | 0 | $-w_2 s_4^*$ | $w_1 s_1^*$ | 0 |

In another embodiment, proportional weighting is applied to each constituent STTD code after antenna grouping, rather than or in addition to for the STTD codes as a whole as was the case in Table 11 above. An example of weighted double STTD with antenna grouping and proportional weighting is given in Table 13 below. There are two levels of weighting in this design: water-filling is applied across layers (i.e. across constituent STTD codes), and proportional weighting is applied within each constituent STTD code. In other words, weighting is sued to get the best allocation of the Alamouti pairs among the antennas, and weighting is used to weight the antennas of a given pair differently. In the table below, both of these weights are included within the single weight $w_i$ applied to each symbol. In the example below, antennas 1 and 3 have been grouped to form a first STTD group, and antennas 2 and 4 have been grouped to form a second STTD group.

TABLE 13

Weighted double STTD with antenna grouping and proportional weighting of each element

| | $Tx_1$ | $Tx_2$ | $Tx_3$ | $Tx_4$ |
|---|---|---|---|---|
| Time t | $w_1 s_1$ | $w_2 s_3$ | $w_3 s_2$ | $w_4 s_4$ |
| Time (t + T) | $-w_1 s_2^*$ | $-w_2 s_4^*$ | $w_3 s_1^*$ | $w_4 s_3^*$ |

Figure 10:
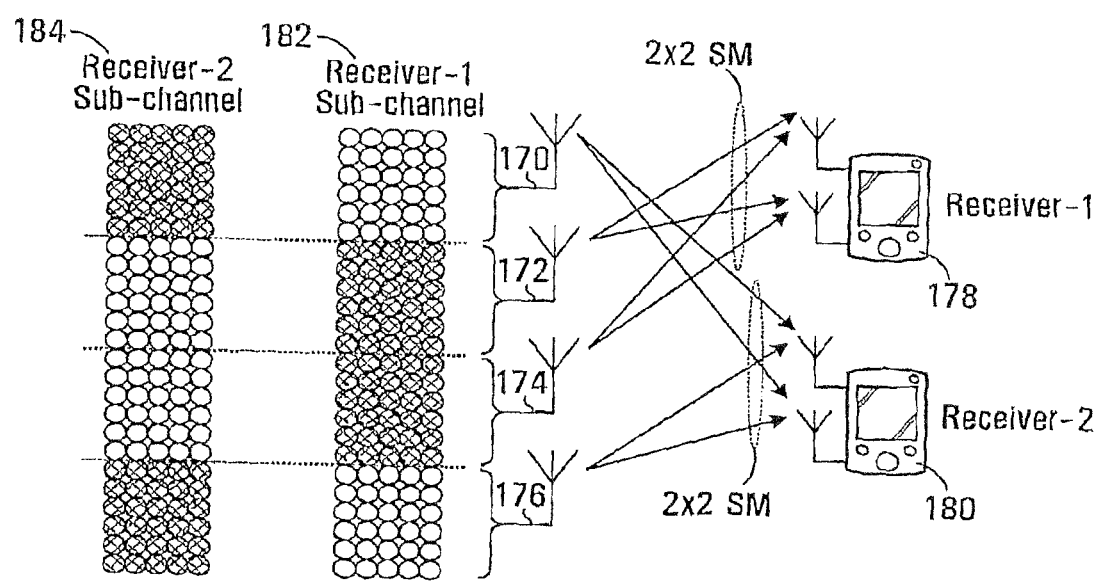
FIG. 10 is a schematic diagram of sub-channel allocation for a 4-antenna transmitter and two 2-antenna receivers according to an embodiment of the invention.

Referring now to FIG. 10, shown is a very specific example of how any of the above described transmission formats can be allocated to a pair of users occupying an OFDM band. In this case, there are four transmit antennas 170, 172, 174, 176, and there are two receivers indicated at 178 and 180. Each receiver has a respective pair of receive antennas. With the particular example shown, antenna selection is used to select the first and fourth antennas 170, 176 for transmitting to a second receiver 180 and to select the second and third antennas 172, 174 for transmission to the first receiver 178. Furthermore, the OFDM sub-carriers that are allocated to the two receivers are indicated at 182 for the first receiver and 184 for the second receiver. It can be seen that for this example, the sub-carriers are allocated in a non-overlapping fashion such that a different set of sub-carriers are transmitted to each of the two receivers 178, 180. In this example, the sub-carriers are allocated to antennas in groups of six. However, more generally, sub-carrier allocation to particular antennas, and antenna assignment to particular users can be performed on a per sub-carrier basis, or to any other desired resolution.

Only a subset of antennas/sub-channels are selected for transmitting signals to a given receiver. Receivers only need to feedback antennas/sub-channels group indexes to the transmitter. In the event weighting is also employed, then this case, weighting information might be fed back for each sub-carrier, or for groups of six sub-carriers.

In multi-user applications, antenna/sub-channel selection is based on multi-user diversity; different users may select different antenna groups. Quasi-water-filling over is preferably employed in selecting antennas/sub-channels: transmitting power on good channels and antennas, while avoiding poor channels. Power balancing can be achieved through multi-user diversity. Since different receivers experience different channel environments, their antenna group selection will not necessarily the same. When different receivers select different antenna groups, the average power transmitted by each transmit antenna can be somewhat balanced.

Antenna Selection for STTD Formats and SM Formats

The above STTD and SM options have all featured weighting, either in the form of water-filling across different STTD groups/SM antennas and/or proportional weighting within STTD groups. Antenna selection/antenna grouping can be combined with these weighting options. In another embodiment, antenna selection/antenna grouping alone is employed. Several examples of pure antenna selection will now be described.

Antenna Selection/Grouping for Three Transmit Antennas

Example STTD formats for three transmit antenna applications will now be described. In the example of FIG. 11, each 4×3 matrix has three rows and each row is transmitted on a respective transmit antenna. In the first example matrix $A_1$, the first two symbols $s_1$, $s_2$ are transmitted using STC coding on the first two antennas and during two transmit intervals, and the next two symbols $s_3$, $s_4$ are transmitted using space time coding on the first and third antennas during the next two transmit intervals. The matrices $A_2$ and $A_3$ show other permutations for selecting two of the antennas for each STC block. The matrices $A_1$, $A_2$ and $A_3$ are single stream transmission matrices. During four transmission intervals, four symbols $s_1$, $s_2$, $s_3$, $s_4$ are transmitted.

Another antenna grouping example is shown in FIG. 11 for matrices $B_1$, $B_2$, $B_3$. This is a two stream example. It can be seen that one of the streams consists of $s_1$, $s_2$, $s_3$, $s_4$ transmitted over the four transmission intervals, and the other stream consists of symbols $s_5$, $s_6$, $s_7$, $s_8$ transmitted over the four symbol transmission intervals. In this case, space time coding is applied for both streams, but diversity is applied for one of the streams but not for the other. The three matrices $B_1$, $B_2$, $B_3$ show different ways of assigning the antennas to the various streams.

FIG. 12 shows examples of antenna groupings and antenna selections for closed loop STC/MIMO 3-transmit antenna arrangements. Also shown in FIG. 12 is a set of examples of antennas selection feedback for a three antenna system. For a single stream application, the receiver simply selects one of three antennas, and feeds back an identification of the selected antenna. Thus, $C_1$ represents the selection of the first antenna, $C_2$ represents the selection of the second antenna, and $C_3$ represents the selection of the third antenna. The transmission matrix also shows a term "c" which represents the amount of power boosting that can be implemented. In this case, such a single antenna is used for the particular user, the entire power for that user can be applied to that single antenna and no power boosting need be employed. An example of CQICH bits that might be fed back to identify one of the three permutations is also shown.

Also shown is a two stream example where the receiver must select two of the three possible antennas, and feedback to the transmitter which two of the three antennas it would like to receive its data on. In this case, a power boosting factor of $1/\sqrt{2}$ such that the total amount of power is divided across the two antennas for the given user.

Antenna Selection/Grouping for Four Transmit Antennas

FIG. 13 shows a set of example antenna groupings for 4-transmit closed loop STC/MIMO. Shown are examples for one stream, two streams and four streams. The possible matrices for one stream are indicated at $A_1$, $A_2$, $A_3$. In each of these examples, a stream consisting of $s_1$, $s_2$, $s_3$, $s_4$ is transmitted using all four antennas, with space time coding being applied between $s_1$ and $s_2$, on two antennas and between $s_3$, and $s_4$ over two antennas. The three different antenna groupings represent different selections of antennas for the two STC groups.

With the two stream example, the matrices $B_1$, $B_2$, $B_3$, $B_4$, $B_5$, $B_6$ show how two streams consisting of $s_1$, $s_2$, $s_3$, $s_4$ and $s_5$, $s_6$, $s_7$, $s_8$ can be spread across four transmit antennas in six different ways. Space time coding is again employed between sets of two symbols within each stream.

FIG. 14 shows antenna selection options for a closed loop STC/MIMO 4-transmit antenna arrangement in accordance with an embodiment of the invention. Shown are 1, 2 and 3 stream, antenna selection options. With one stream antenna selection option, a single of the four antenna as selection for transmitting a single symbol. The transmission matrices are indicated at $C_1$, $C_2$, $C_3$, $C_4$. A power boosting of c=1 is applied since only a single transmit antenna is employed.

For two streams, two of the four antennas are selected, and there are six different options as set out in the table. A power boosting factor of $1/\sqrt{2}$ is applied for this case. For a three stream example, there are four different ways to select three of the four antennas as set out in the table. A power boosting factor of $1/\sqrt{3}$ is applied. Also shown in the table is an example set of bits that can used to feedback on the channel quality indicator channel selection of an appropriate one of the potential transmission matrices depending upon whether there are 1, 2 or 3 streams.

Binary Beam-Forming

It is noted that while the above examples show antenna selection feedback, binary beam-forming can be used to similar effect. With binary beam-forming, the beam-forming weights are binary, meaning that a given antenna is either on or off. This is analogous to selection. Two specific examples of using beam-forming to perform antenna selection are provided in FIGS. 15 and 16 for three and four antenna systems respectively. For the four antenna system, assuming the symbol stream can be defined in the form of x-diag[s1, s2,s3,s4], and the transmitted beam-formed matrix is C=xW where is listed in FIG. 16. This is the same result as the antenna selection examples of FIG. 14. This allows the unification of antenna selection with beam-forming, where W consists of binary weights in this particular case.

MIMO Downlink Pilot Designs

Referring now to FIGS. 17 through 23, a number of different pilot transmission schemes will now be described for MIMO applications of OFDM. In these examples, it is assumed that a common pilot structure is used for any receivers that might need to rely on it. In order that multiple receivers can make use of the pilots, no receiver specific pre-coding is performed. In other examples described further below, pre-coding of pilots for specific receivers is performed. In all of the Figures showing pilot transmission schemes, the horizontal axis represents OFDM sub-carriers separated in frequency, and the vertical axis is the time dimension, with each row representing on OFDM symbol transmission interval. In all of the examples, the receiver recovers the transmitted pilots, compares them to known content of the pilots, and determines channel estimates on the basis of this comparison. Channel estimates can be interpolated for the non-pilot sub-carrier locations.

Figure 17:
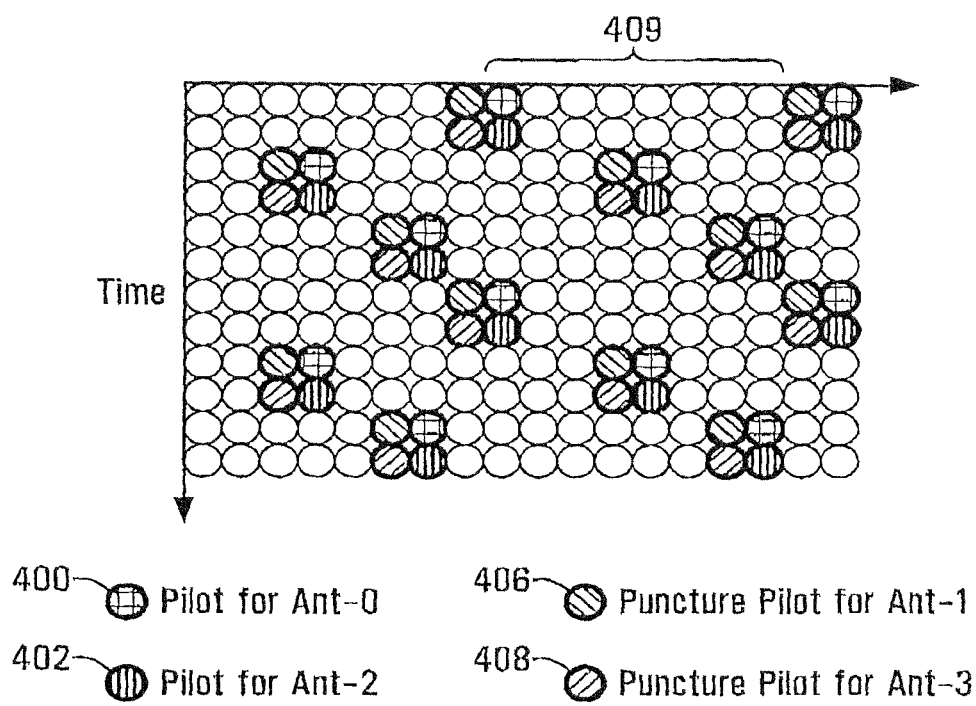
FIG. 17 is pilot mapping for a pilot allocation for 4-antenna BS (base station) for the optional FUSC (full utilization sub-channel) and Optional AMC (adaptive modulation and coding) zones in 802.16d in accordance with an embodiment of the invention.

Referring first to FIG. 17, shown is a pilot transmission scheme in which pilots are allocated for four antennas as indicated at 400,402,406,408. The pilots are allocated in blocks of 2×2 sub-carrier locations, with two consecutive sub-carriers over two consecutive OFDM symbols. In this example, the location of the pilot for each antenna is the same with each group of four sub-carrier locations. Furthermore, note that the pilots 406,408 for antennas 1 and 3 are "punctured pilots", meaning that these pilots are transmitted in place of data sub-carriers such that the receiver must rely on error correction to demodulate and recover correctly the transmitted information in the absence of the punctured data locations. In other words, where in a 2-antenna system, data would be transmitted on sub-carriers indicated at 409, with the 4-antenna system no data is transmitted on the sub-carrier locations used for the punctured pilot locations. Each pilot is transmitted only by the respective antenna with null sub-carriers inserted in the other antennas. In the illustrated example, pilots are inserted in every pair of two consecutive OFDM symbols, but in some implementations, not every OFOM symbol contains pilots. The location of the 2×2 blocks of pilots is staggered between adjacent pairs of OFDM symbols. In the illustrated example, the staggering is not uniform, but it could be uniform in other implementations.

Figure 18:
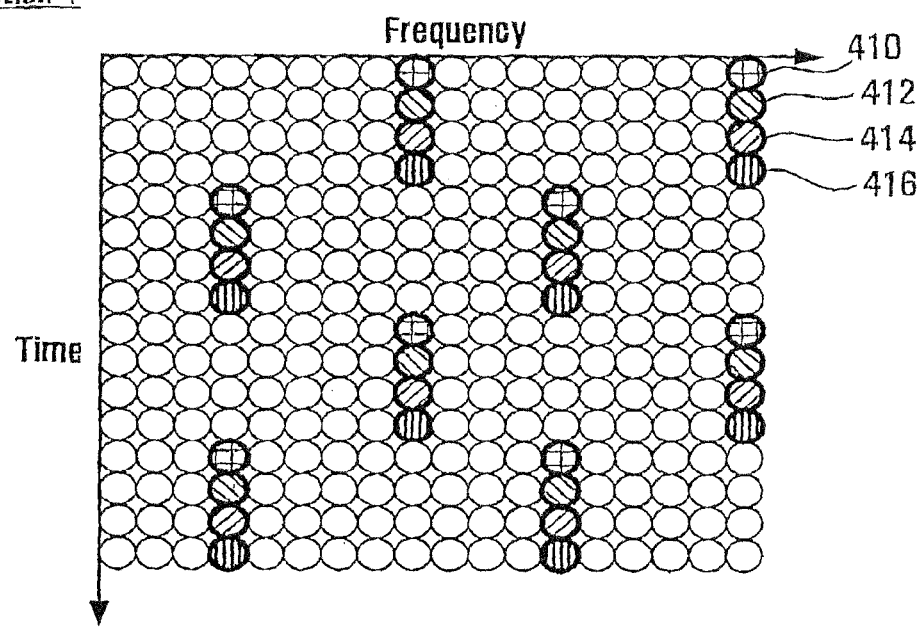
FIGS. 18 and 19 are pilot mappings for a pilot allocation for four transmit antennas in which there is no puncturing required in accordance with an embodiment of the invention.

Referring now to FIG. 18, another example of a 4-antenna pilot transmission scheme is shown. In this example, four pilots are inserted on a single sub-carrier for the four antennas as shown in 410,412,414,416 over four OFDM symbol transmission intervals. Multiple such groups of four pilots are inserted in sub-carrier locations that are separated by eight data sub-carriers in the example shown. Furthermore, the particular sub-carriers used are offset in consecutive sets of four OFDM symbols. It can be seen that half as many pilots are inserted with the example of FIG. 18 as are inserted in the example of FIG. 17. The result is that for a given sub-carrier and a given antenna, an accurate channel estimate can be obtained at the receiver half as often. The interpolated channel estimates may therefore be less accurate. This has the potential of effecting the accuracy of data recovery at the receiver.

While a particular staggering arrangement has been shown in FIGS. 17 and 18, it is to be understood that other arrangements are possible.

Figure 19:
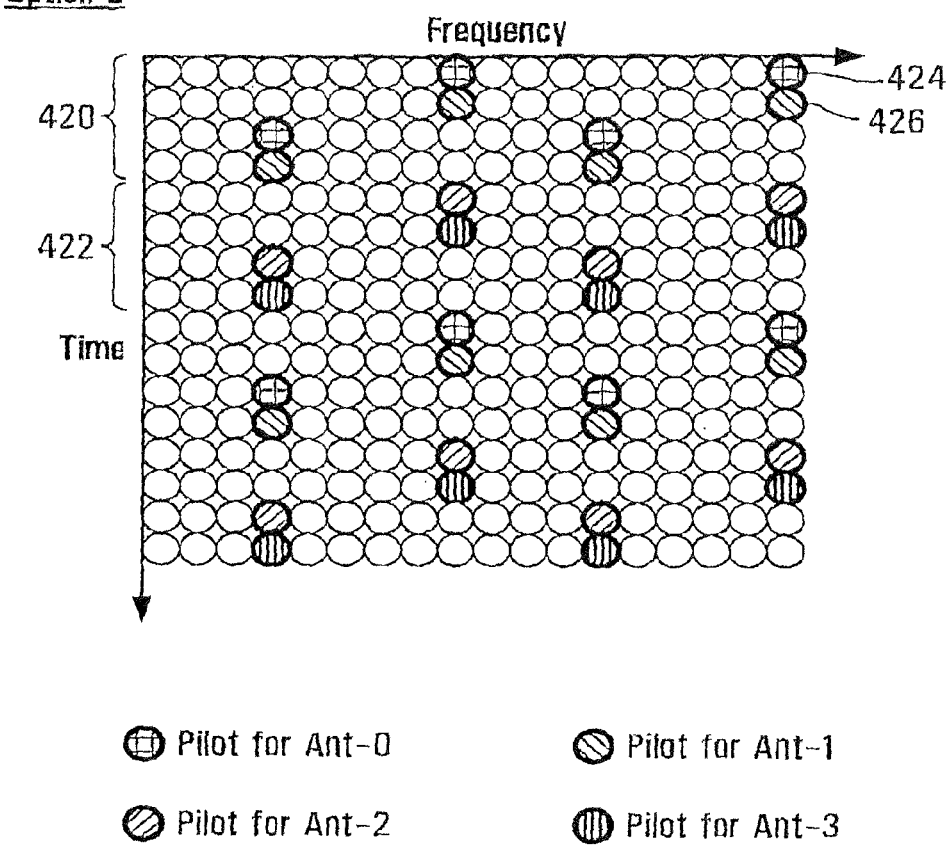

Referring now to FIG. 19, shown is another example of a pilot transmission scheme for a 4-antenna system. In this system, for groups of four consecutive OFDM symbols, pilots are inserted only for two of the antennas. The group of four OFDM symbols indicated at 420, pilots are inserted for antennas 0 and 1, while for the group of four OFDM symbols 422 pilots are inserted for antennas 1 and 3. For subsequent groups, the set of antennas alternates. Within a given set, pilot pairs are inserted in selected OFDM sub-carrier locations over two OFDM symbols. For example, one such pair of pilot symbols is indicated at 424,426, this including one pilot for antenna 0 and one pilot for antenna 2. The sub-carriers used for the pilots are offset between the first two OFDM symbols and the second OFDM symbols of the set of four OFDM symbols 420. A similar arrangement is shown for the pilots of antennas 1 and 3 during the second set of four OFDM symbols 422. While a particular offsetting arrangement has been shown, other offsetting arrangements can be implemented.

Figure 20:
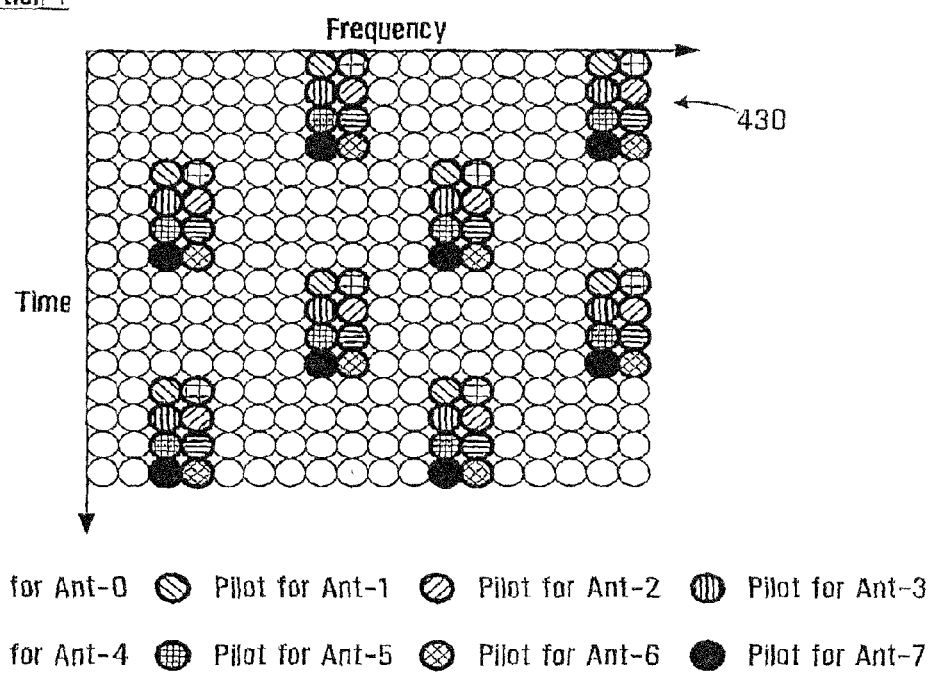
FIGS. 20 and 21 are pilot mappings for a pilot allocation for eight transmit antennas in accordance with an embodiments of the invention.

Referring now to FIG. 20, shown is an example of a pilot transmission scheme for an 8-antenna system. Groups of eight pilots are inserted in a staggered fashion within the time frequency plane. Each group is two sub-carriers by four OFDM symbols, and includes one pilot for each of the eight antennas. One such group of eight is indicated at 430.

Figure 21:
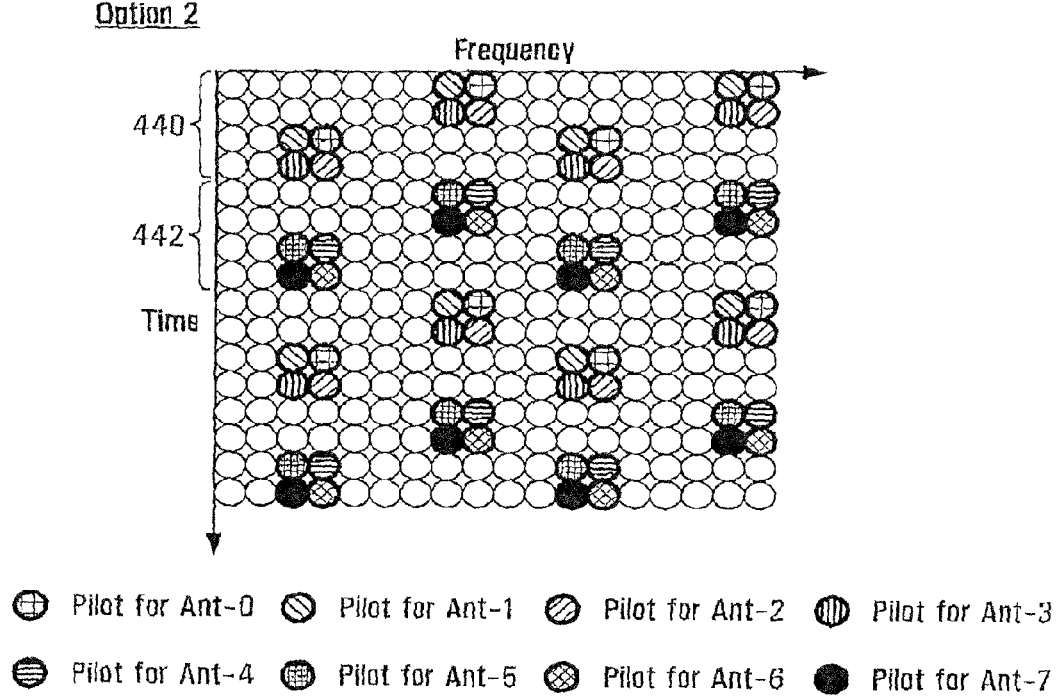

Referring now to FIG. 21, shown is another example of pilot transmission scheme for an 8-antenna system. In this example, alternating sets of four OFDM symbols are used to transmit pilots for respective sets of four antennas. Thus, the first set of four OFDM symbols 440 is used for the first four antennas and the next set of four OFDM symbols 442 is used for the next set of four antennas. For each set of four antennas, the pilots are inserted in blocks of two sub-carriers by two OFDM symbols each containing one pilot for each of the four antennas, and the location of the block is offset between consecutive pairs of OFDM symbols.

Figure 22:
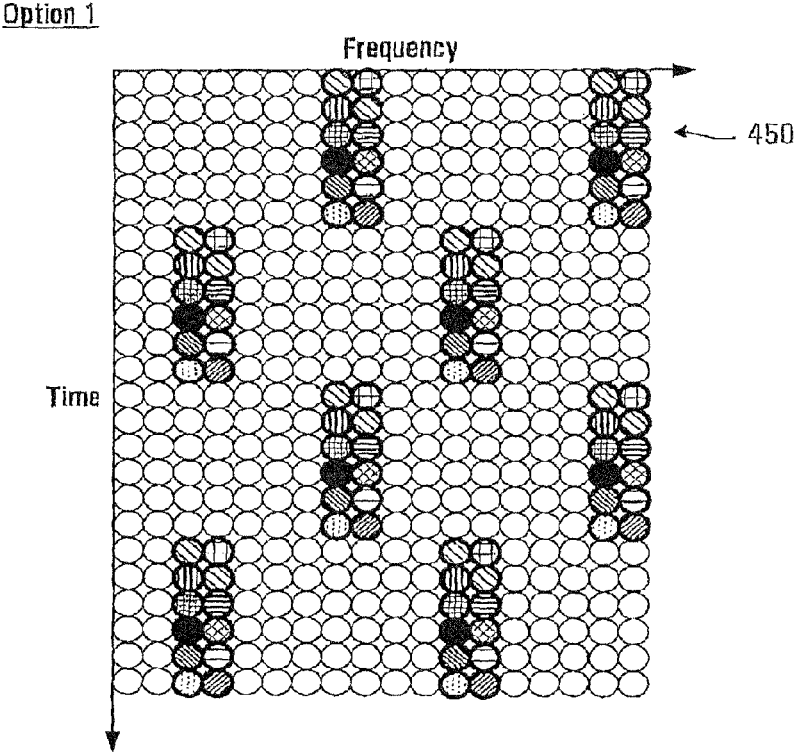
FIGS. 22 and 23 are pilot mappings for a pilot allocation for twelve transmit antennas in accordance-with an embodiments of the invention.

Referring now to FIG. 22, shown is a pilot transmission scheme for a 12-antenna system. This example is basically an extension of the example of FIG. 20 but with each group of pilots being inserted having a dimension of two OFDM sub-carriers by six OFDM symbols, and each block of OFDM pilots containing one pilot for each of 12 different antennas. One example block is indicated at 450.

Figure 23:
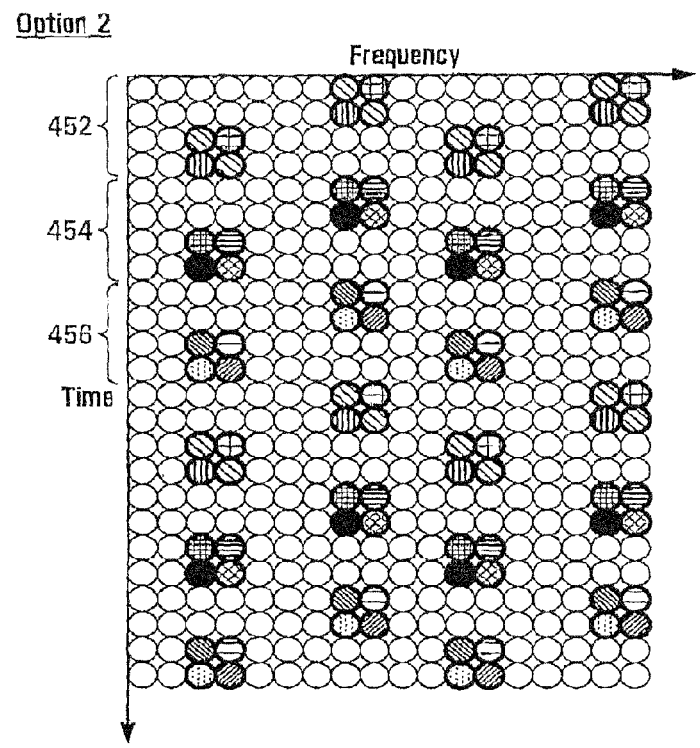

Referring now to FIG. 23, shown is another example of a pilot transmission scheme for a 12-antenna system. In this case, the overall pilot pattern is 12 OFDM symbols in duration. The first four OFDM symbols 452 are used for first four antennas; the next four OFDM symbols 454 are used for the next four antennas, and the last four OFDM symbols 456 are used for the last four antennas. Each set of four OFDM symbols is shown arranged similarly to the sets of four OFDM symbols described previously with reference to FIG. 28 for the eight antenna design.

As indicated above, for the example pilot patterns of FIGS. 17 through 23, as described, the pilots are not pre-coded, and can therefore be used by any receiver to obtain channel estimations for the particular antenna. In another embodiment, for any one of the patterns described thus far, the pilots for at least one antenna are pre-coded for a particular user. As described above, pre-coding of pilots for a particular user may enable pilots to be inserted at a lower frequency or for the particular user and thereby save transmission bandwidth. Further examples are given below that involve pre-coding of pilots for closed-loop MIMO sub-channel transmissions.

Pilot Transmission Schemes with Pilot Pre-Coding

Systems and methods employing pre-coding of MIMO pilots in accordance with an embodiment of the invention will now be described. In the above described embodiments, it has been assumed that pilot channel information is transmitted without any weights being applied. In this manner, any receiver can look at the transmitted pilot information and recover a respective channel for the particular receiver. In some embodiments, a pre-coding of the pilot is performed.

For a pre-coded pilot, the equivalent channel measured at the receiver becomes G=HW, where H is the actual channel, and W are the weights applied to the pilots. The feedback beam-former W, or information from which it can be derived, may be computed from the channel H for a particular user. Many examples of how this feedback can be performed are detailed below.

In the event pre-coding of the pilot is performed, the channel can be recovered according to:

$$H=GW^*(WW^*)^{-1}$$

However, the pilots need to be user-specific for such a case because beam-forming weights are receiver-specific. This is in contrast to the case where the pilots are not pre-coded and the channel can be recovered by each user.

Figure 24:
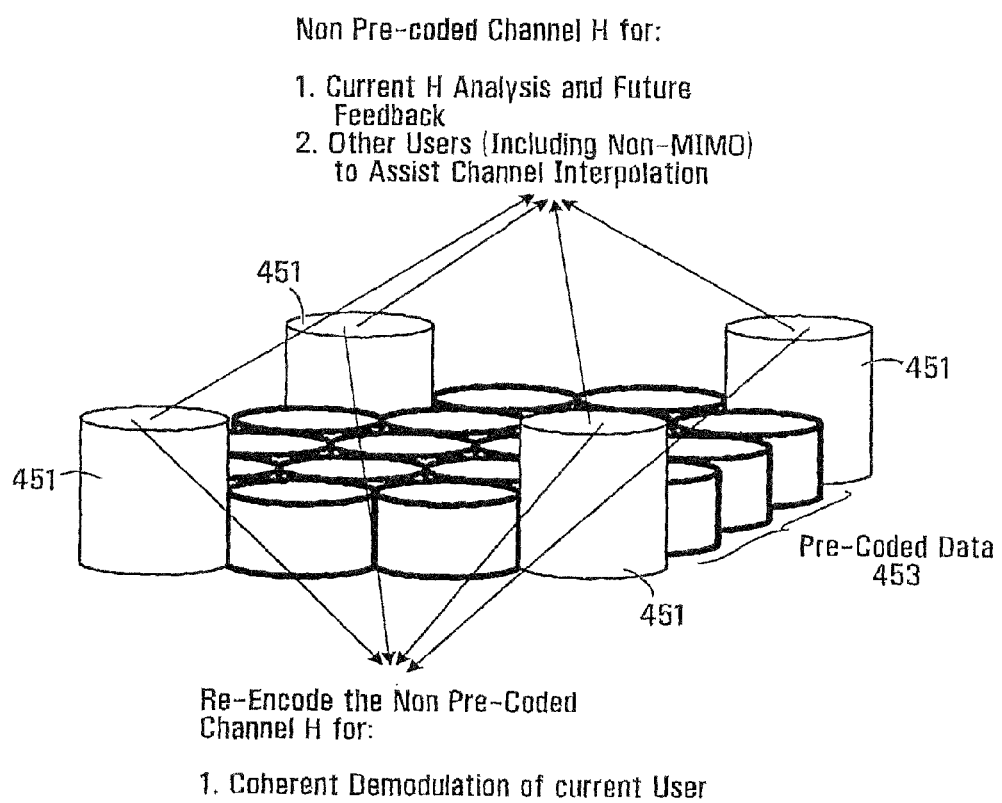
FIG. 24 is a schematic diagram showing an example of pre-coding of MIMO pilots in accordance with an embodiment of the invention.
Figure 25:
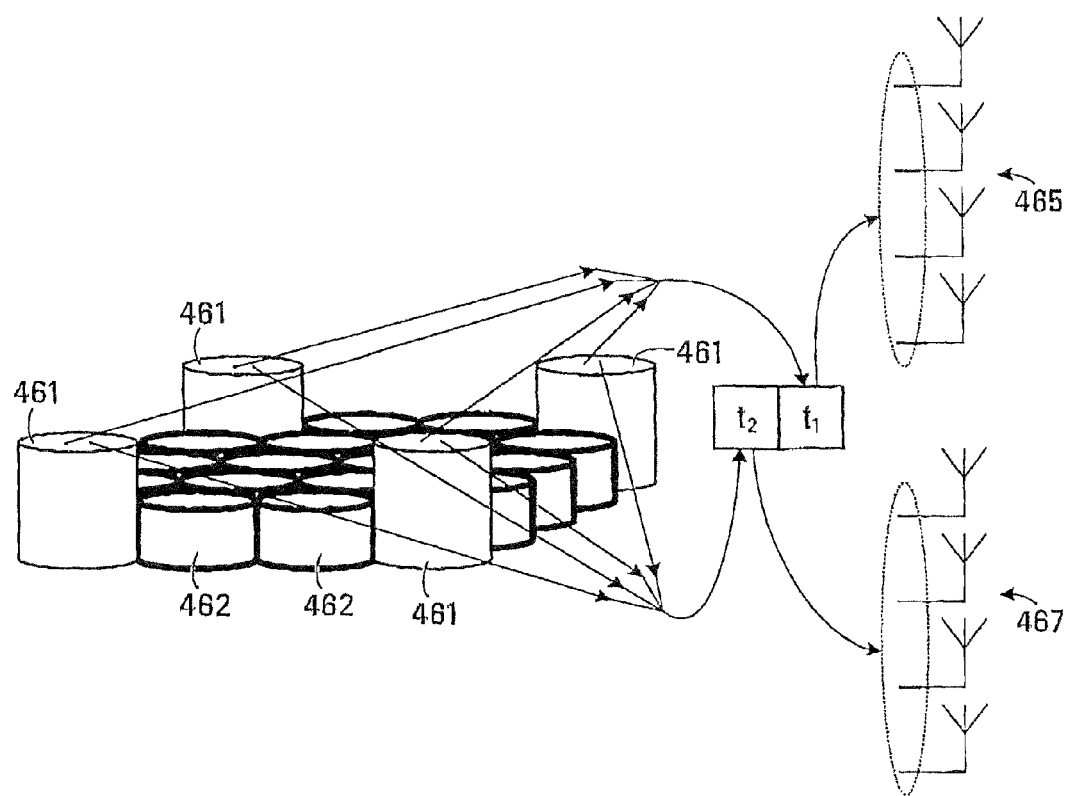
FIG. 25 is a schematic diagram showing an example of pre-coding of MIMO pilots in accordance with an embodiment of the invention suitable for larger antenna arrays.

FIGS. 24 and 25 compare and contrast the use of non-pre-coded pilots as opposed to pre-coded pilots. In FIG. 24, it is assumed that a set of non-pre-coded pilots were transmitted. A distribution of data sub-carrier locations 451 and pilot sub-carrier locations 453 are shown for the purpose of example only. In this case, the channel H can be used for:

1. current H analysis and future feedback; and
2. multiple users (possibly including non-MIMO) to assist in channel interpolation.

The non-pre-coded channel H can be re-encoded to coherently demodulate current data for each user.

In contrast, with the example of FIG. 25, some of the pilots are dedicated to a particular user, and as such can be pre-coded while other pilots are for multiple use, and as such are not pre-coded. The use of pre-coding for pilots can be constant, or can vary over different time. A distribution of data sub-carrier locations 451 and pilot sub-carrier locations 453 are shown for the purpose of example only. During time $t_1$, the pilot sub-carriers 461 are pre-coded pilots for a first receiver 465, and during a second time $t_2$, pre-coded pilots are inserted for a different receiver 467. There may also be pilots that are transmitted for use by both users (not shown).

Advantageously, by using pre-coded pilots, a smaller number of pilots can be used. The number of pilots can be reduced in either the time or frequency dimension. Preferably, for cases in which the receiver is mobile, the density in time is kept the same and the density is reduced in the frequency domain. Furthermore, for band adaptive modulation and coding, it is preferable to select the most flat part of the band or use larger FFT size, and/or to use an interlaced antenna pilot mapping.

For the case where a receiver is nomadic, i.e., it is not highly mobile, but does move periodically, it is advantageous to keep the frequency density the same, and to reduce the density in the time domain. In this case, preferably a block antenna pilot mapping is employed.

The location of the receiver-specific pilots is an implementation specific decision. For the purpose of completeness, several examples are presented below.

Figure 26:
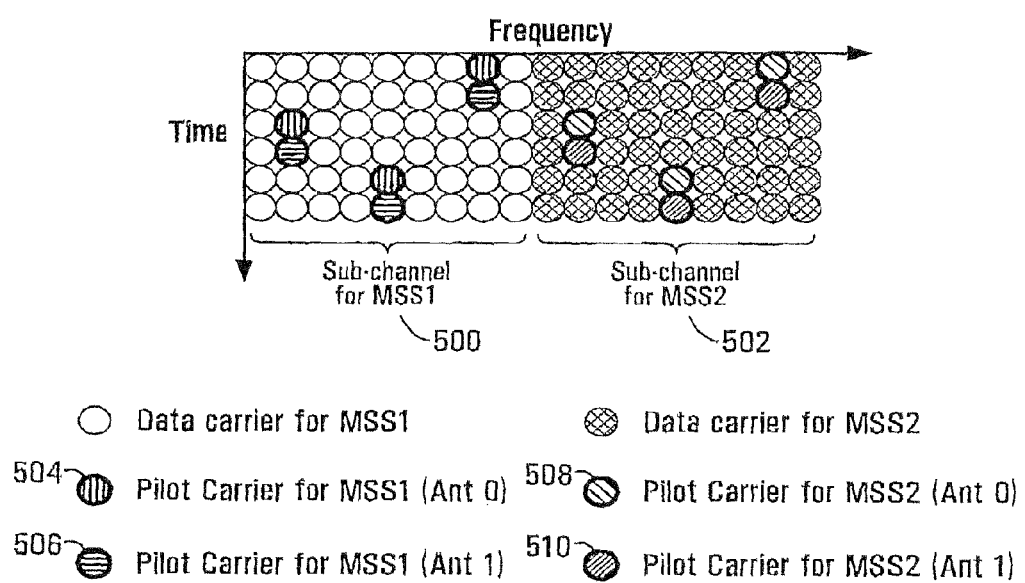
FIG. 26 is a pilot mapping showing a pre-coded pilot design for a 2-antenna basestation (BS) for optional AMC in accordance with an embodiment of the invention.

FIG. 26 shows an example of pre-coded pilot design for a 2-antenna basestation (BS) in accordance with an embodiment of the invention. In this example, sub-channels are defined that are nine sub-carriers wide for a given receiver, each sub-channel being assigned to a respective receiver. Thus, two sub-channels are indicated at 500,502. These sub-channels can be continuously allocated for a given mobile station, or they can be allocated in a time division manner. Pilot carriers are inserted as indicated at 504,506 for antenna 0 and antenna 1 respectively and for the first mobile station. These are inserted in the sub-channel 500 for the first mobile station. Similarly, pilot carriers 508,510 are inserted in the sub-channel for the second receiver for antenna 0 and antenna 1 respectively. Because the pilot sub-carriers are dedicated to a particular receiver, preferably they are pre-coded as discussed above. Pre-coded pilot sub-carriers are coded for the particular receiver using feedback information received from each receiver.

The example of FIG. 26 shows sub-channels that consist of a set of sub-carriers being allocated to respective mobile stations. This approach can be extended to multiple sub-channels, more than simply the two shown. Furthermore, the particular location of the sub-carriers used for pilots can vary on an implementation specific basis. Preferably the pilots are somewhat scattered within each sub-channel for a given receiver so that better channel information can be interpolated for the remaining data sub-carrier locations.

Figure 27:
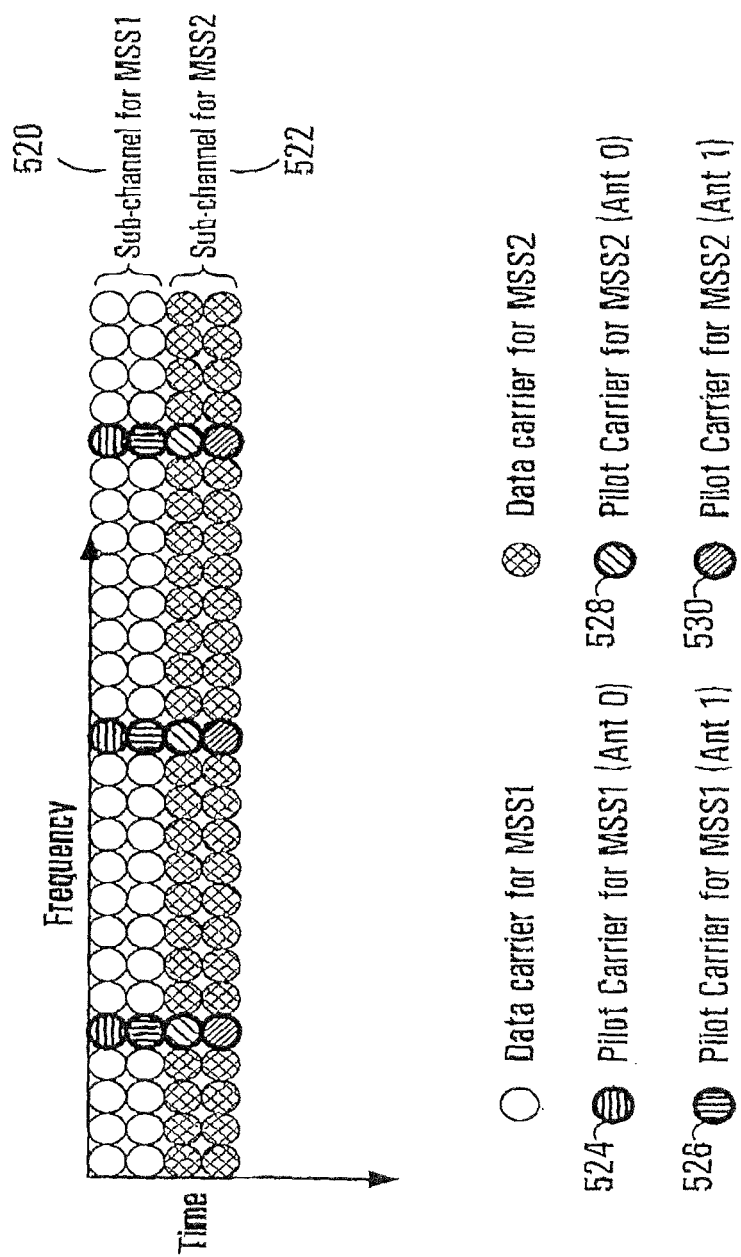
FIG. 27 is a second pre-coded pilot design for a 2-antenna basestation (BS) for optional AMC in accordance with an embodiment of the invention.

Referring now to FIG. 27, shown is another example in which sub-channels are divided up in a time-wise manner. The sub-channel for a first mobile station is transmitted on the first two OFDM symbols as indicated at 520, and the sub-channel for a second mobile station is transmitted on the second set of two OFDM symbols as indicated at 522, and then this pattern repeats. The sub-channel for a given mobile station may contain fewer or greater number of OFDM symbols than the two shown in FIG. 27. Furthermore, there can be any appropriate number of sub-channels defined. In this example, receiver specific pilot carriers are inserted during each of the two sub-channels 520,522. The pilots for the first sub-channel are indicated at 524,526 and the pilot carriers for the second receiver are indicated at 528,530. In this example, the pilots for antenna 0 are inserted in one OFDM symbol, and the pilots for antenna 1 are inserted in the next OFDM symbol within each sub-channel. A particular spacing for the pilot carriers is shown, but of course different spacings and frequencies can alternatively be employed. Once again, since the pilots are dedicated to a particular user, they can be pre-coded for each user.

Figure 28:
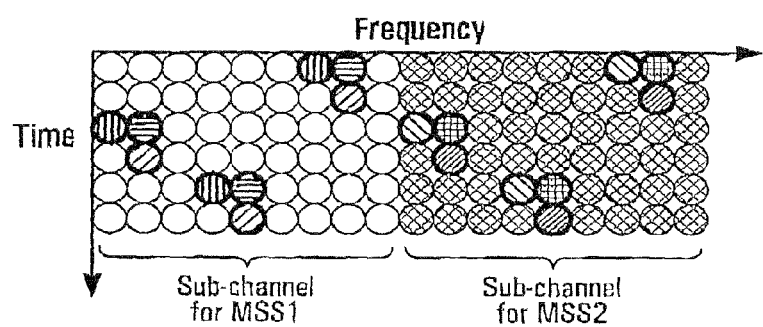
FIG. 28 is a pilot mapping showing a pre-coded pilot design for a 3-antenna basestation (BS) for optional AMC in accordance with an embodiment of the invention.
Figure 29:
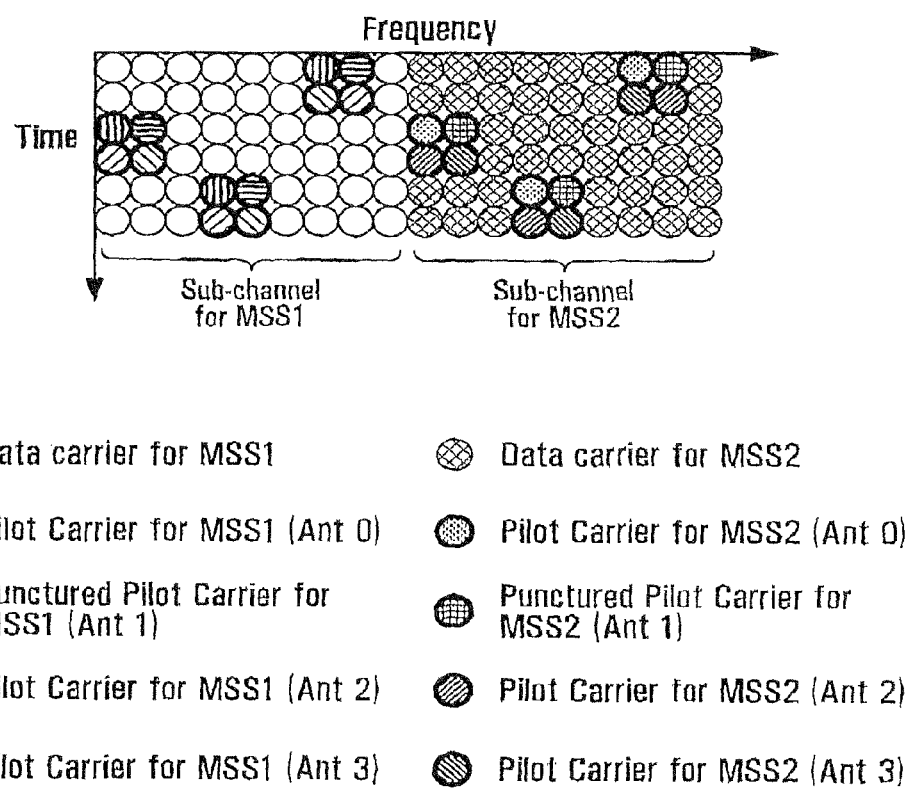
FIG. 29 is a pilot mapping showing a pilot design for a 4-antenna basestation (BS) for optional AMC in accordance with an embodiment of the invention.

The example of FIG. 26 can be extended to differing numbers of antennas. An example is shown in FIG. 28 where there are three antennas and as such each sub-channel has pilot carriers for each of the three antennas. With the example of FIG. 28, the pilots for one of the antennas, in the illustrated example antenna 1, are punctured pilot carriers. This means that data locations would normally have been transmitted there, and as such the receiver must rely on error correction to correctly recover an entire transmitted data stream. Alternatively, pilot locations could be allocated for all three antennas that do no rely on puncturing. Furthermore, it may be that only some of the pilots for a given antenna are puncture locations. A very similar example is shown in FIG. 29 for a four transmit antenna example in which the pilot carriers for two of the antennas, namely antennas 1 and 3 are punctured pilot carriers. In this example and the other examples, zero, one, or multiple pilots may rely on puncturing.

In accordance with another embodiment of the invention a pre-coded pilot design for the PUSC (partial use sub-carrier applications) is provided. For PUSC the symbol is first divided into basic clusters of consecutive sub-carriers. Pilots and data carriers are allocated within each cluster of sub-carriers. According to IEEE 802.16-2004, a permutation is used when allocating the data carriers to a sub-channel, a permutation consisting of a remapping of the a cluster sub-carriers into other allocations (that can be almost random). The data carriers in each cluster may be assigned to different MSSs, and therefore, pilots may be used by multiple MSSs. To support the dedicated pilots to closed-loop MSSs operating in PUSC mode, the permutation procedure to partition the sub-carriers into sub-channels is disabled or is allowed to apply to the PUSC sub-channel within a single user. Each sub-channel includes 48 data carriers from two clusters.

Figure 30:
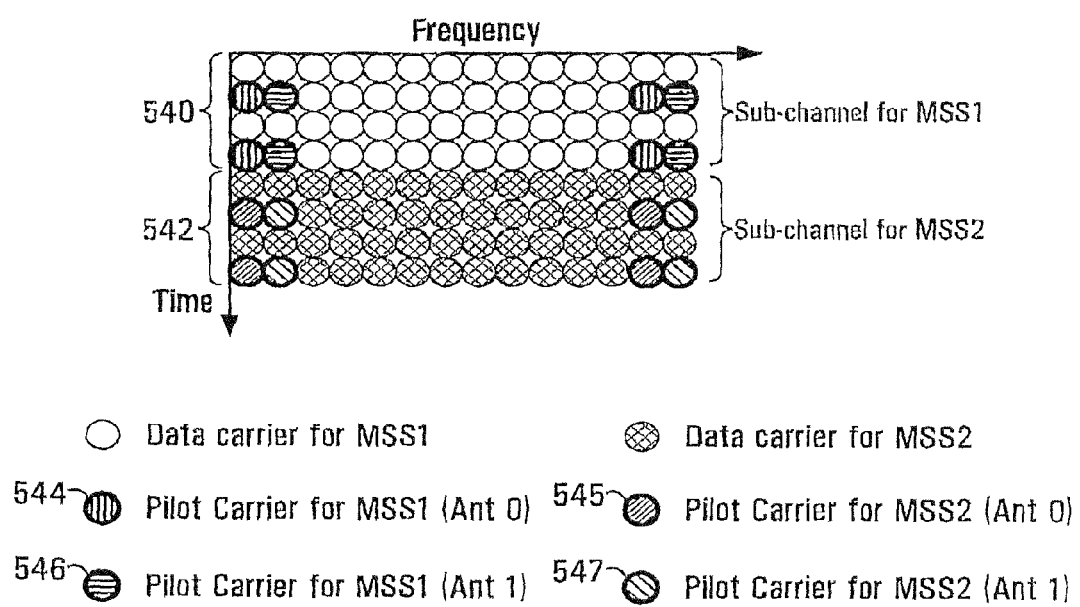
FIG. 30 is a pilot mapping showing a pre-coded pilot design for a 2-antenna BS for PUSC (partial utilization sub-channel) zone in accordance with an embodiment of the invention.

FIG. 30 shows a pre-coded pilot design for a 2-antenna BS for a PUSC zone in accordance with an embodiment of the invention, where the pilot design shows the form of the cluster prior to remapping/permutation. In other words, the pattern of FIG. 30 would actually be scrambled across an OFDM bandwidth. In this example, the first four OFDM symbols are used for a sub-channel for a first mobile station, and the next four OFDM symbols 542 form a sub-channel for another mobile station. In the frequency domain, there may be additional sub-channels for other mobile stations, not shown, or the entire bandwidth may be applied for a single wireless station at a time. In this case, pilots are inserted for two antennas, and these can be inserted in a receiver specific manner. Pilot carriers for the first receiver on antenna 0 are indicated at 544, and pilot carriers for the first receiver on the next antenna are indicated at 546. These are inserted in pairs on consecutive sub-carrier locations and in every other OFDM symbol at illustrated. The pattern continues with pilots carriers 545,547 inserted during the sub-channel 542 for the second receiver, and the pilots are pre-coded for the respective receivers.

Figure 31:
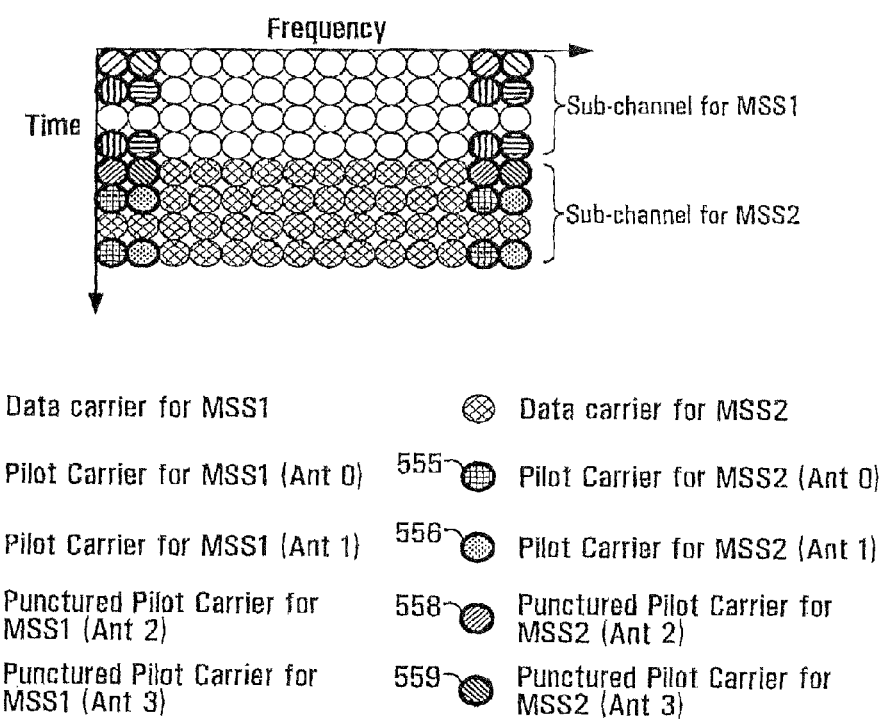
FIG. 31 is a pilot mapping showing a pre-coded pilot design for a 4-antenna BS for PUSC zone in accordance with an embodiment of the invention.

Referring now to FIG. 31, shown is another example similar to that of FIG. 30, but in which pilot carriers are inserted for four antennas. In this case, the pilot carrier insertions for antenna 0 and 1 are identical to those of FIG. 30. In addition to this, pilots are inserted in the first OFDM symbol of each sub-channel for antennas 2 and 3 as indicated at 550,552. In this case, it is assumed that the pilots for antennas 2 and 3 are inserted in punctured pilot locations. Furthermore, the pilots are inserted half as frequently for the antennas 2 and 3, namely for only one OFDM symbol of each set of four.

Closed Loop Feedback Options for MIMO Applications

Figure 32:
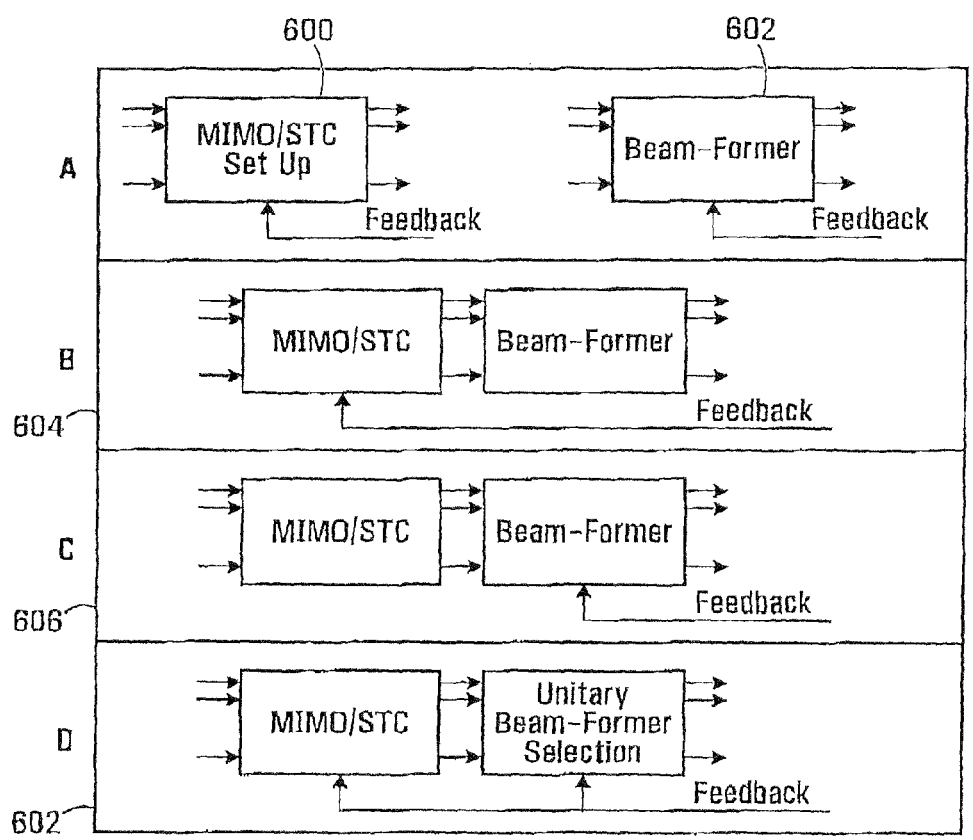
FIG. 32 is a schematic diagram of a set of closed loop STC/MIMO arrangements with beam-former structures in accordance with an embodiment of the invention.

The transmission formats discussed above rely on antenna selection/grouping feed back and/o beam-forming weights. FIG. 32 shows a summary of available closed loop STC/MIMO arrangements with beam-former structures in accordance with embodiments of the invention.

The first option indicated at 600 is to perform MIMO/STC set up based on closed loop feedback. This may involve selection between SM and STTD, and/or antenna selection and/or antenna grouping, as defined for a given application. Given a set of options that are to be made available to a given receiver, the feedback information allows the receiver to select between the options and inform the transmitter of the selection.

The next option indicated at 602 is to perform beam-forming based on feedback information. The feedback information may come in a variety of forms described in detail below. The information that is fed back allows a transmitter to generate weights for the particular receiver. The feedback information can be the weights per se, or other information.

The next option indicated at 604 involves performing MIMO/STC setup based on feedback and feeding the output of this into a beam-former that might be statio in nature.

In another embodiment, indicated at 606, the output of a MIMO/STC matrix is input into a beam-former that under-goes beam-forming as a function of feedback.

Finally, the next option indicated at 608 involves performing MIMO/STC set up based on feedback, and feeding the output of this into a beam-former that also performing beam-forming a function of feedback.

In summary, the options are to apply feedback for MIMO/STC set up and/or applying feedback to the beam-former. The beam-former feedback information may be for a unitary beam-former structure, or some other beam-former. Detailed examples have been given previously as to how MIMO/STC set up information can be fed back. Many options for beam-former feedback are given in the details below.

In accordance with various embodiments of the invention there is provided methods of facilitating closed loop MIMO pre-coding and feedback in a communications network that might, for example be operating in accordance with the IEEE 802.16(e) and IEEE 802.11(n) standards. As will be apparent to one of skill in the art the various embodiments can be implemented in software, firmware or an ASIC (application specific integrated circuit) or any suitable combination of these or other components.

Feedback for Antenna Selection/Grouping and Eigen-mode Selection

SVD Approach

SVD (singular value decomposition) is theoretically optimal in terms of the best channel matching transmission and achieving the link level Shannon capacity. However, SVD typically requires a large amount of computing and a large amount of CSI (channel state information) feedback in the FDD (frequency division duplexing) case. With SVD, the channel matrix H is decomposed according to $$H = U \Lambda V$$

where U and V are unitary, and $\Lambda$ is a diagonal matrix containing the eigenvalues. Typically, information defining V is fed back (although H could be fed back and the decomposition re-executed at the transmitter). Then the transmitter sends $V^T S$, where S is the information vector. The receiver receives this, as modified by the channel, i.e., $$\hat{S} = H V^T S = U \Lambda V V^T S (+\text{noise}).$$

The receiver multiplies this by $U^1$ (conjugate transpose of U, known at the receiver) to yield $$U^1 \Lambda V V_S^T = \Lambda S$$

due to the properties of unitary matrices. The diagonal matrix $\Lambda$ is also known at the receiver and S can then be recovered. Various methods of efficiently feeding back V or information allowing the transmitter to reconstruct V are given below.

H can be further expressed as follows:

$$H = \lambda_1 u_1 v_1 + \lambda_2 u_2 v_2 + \lambda_3 u_3 v_3 + \lambda_4 u_4 v_4$$

the U matrix consists of columns equaling the vectors u1,u2,u3,u4 and the V matrix consists of rows equaling the vectors v1,v2,v3,v4 all the vectors being unitary.

Thus, the matrix $V^T$ used in the transmitter consists of a set of unitary vectors as columns, each associated with a respective eigenvalue. For example, a 4×4 matrix is [v1,v2,v3,v4] where v1,v2,v3,v4 are unitary vectors in columns of the matrix. Eigen-mode selection involves setting one or more of the vectors in V to zero, typically the vectors associated with the weak eigenvalue(s). In some embodiments, eigen-mode selection information is fed back to the receiver.

Antenna Selection/Grouping

Antenna selection/grouping is based on the selection of sub-set of antennas from a larger set of available antennas by the terminal based on a simple criterion. The terminal generally needs to feedback very little information to the base station. Mechanisms for transmitting this feedback information from the receiver to the transmitter have been presented above.

Antenna grouping criterion can be based on determinant as described previously. Antenna grouping can also be based on an eigenvalue approach. This approach may avoid selection being dominated by weak layers. Typically degradation due to antenna selection is smaller when the group size is larger.

For a MIMO system, the eigenvalues of the channel matrix are often unevenly distributed. Removing the layers associated with small eigenvalues will have little effects on channel capacity. With a reduced number of layers, more sophisticated MIMO decoders can be used to improve link performance. The power saved from layers that are not used for this a particular receiver can be used by other users on other sub-bands.

$$C = 10 \sum_{i=1}^{M} \lg\left(1 + \frac{P}{M\beta_i}\right) \to \beta_i = \sigma^2 \sum_{j=1}^{M} \left(\frac{v_{ij}^2}{\lambda_j}\right) \to C = 10 \sum_{i=1}^{M-1} \lg\left(1 + \frac{P}{M} \frac{\lambda_1}{\sigma^2}\right)$$

This expression is for the channel capacity. It can be seen that larger lambdas make a larger contribution to the channel capacity. While a default would be to assign equal power to all eigenvalues, in another embodiment, water filling according to eigenvalue is performed, and/or some eigenvalues are not used at all.

The V matrix of an SVD decomposed channel matrix consists of a set of horizontal vectors each of which are multiplied by a respective eigenvalue in the product UDV. In the transmitter, through the use of a beamforming matrix $V^T$ a respective stream can be transmitted in association with each eigenvalue/column of $V^T$=row of V. Thus, if $V^T$=[v1, v2,v3,v4], then what is transmitted can be expressed as v1×s1+v2×s2+v3×s3×v4×s4 for a 4×4 system. Transmission using such a vector will be referred to as an "eigen-mode". Different AMC can be applied in the transmitter for each such eigen-mode. For example, in a 4×4 system, there will be 4 eigenvalues, and four beamforming vectors each for use with a respective stream. In the event water filling is employed, the power allocated to the streams is not equal, and in some cases one or more of the layers is simply not used at all, and the power that would have been used for that stream is available for the other layers. Feedback in such systems can consist of an index of the eigen-modes to employ, with the remaining eigen-modes shut down, and/or with channel quality readings for some or all of the selected eigen-modes. In some embodiments, the channel quality defines an associated AMC for use on the eigen-mode at the transmitter.

Figure 33:
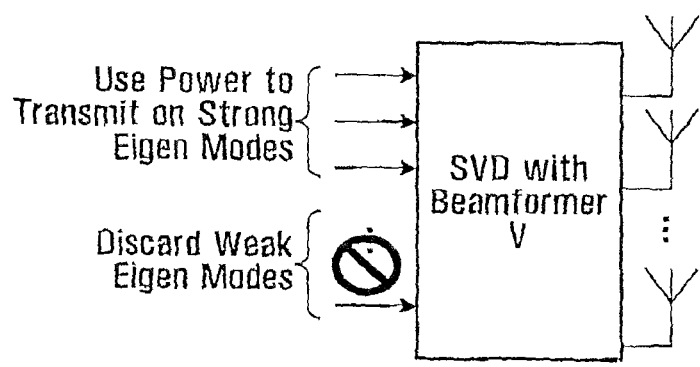
FIGS. 33, 34, 35 and 36 present a comparison of SVD (singular value decomposition) to antenna grouping.
Figure 34:
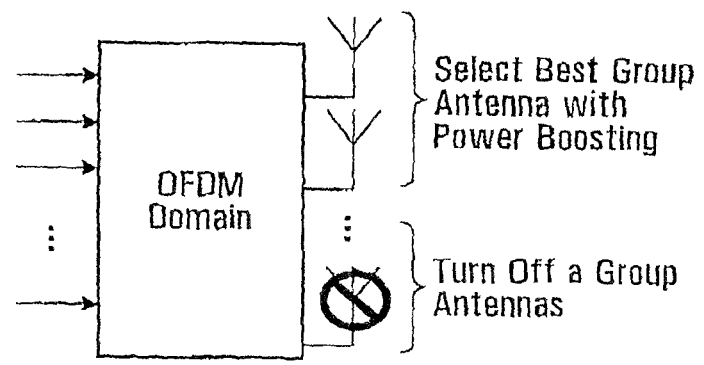
Figure 35:
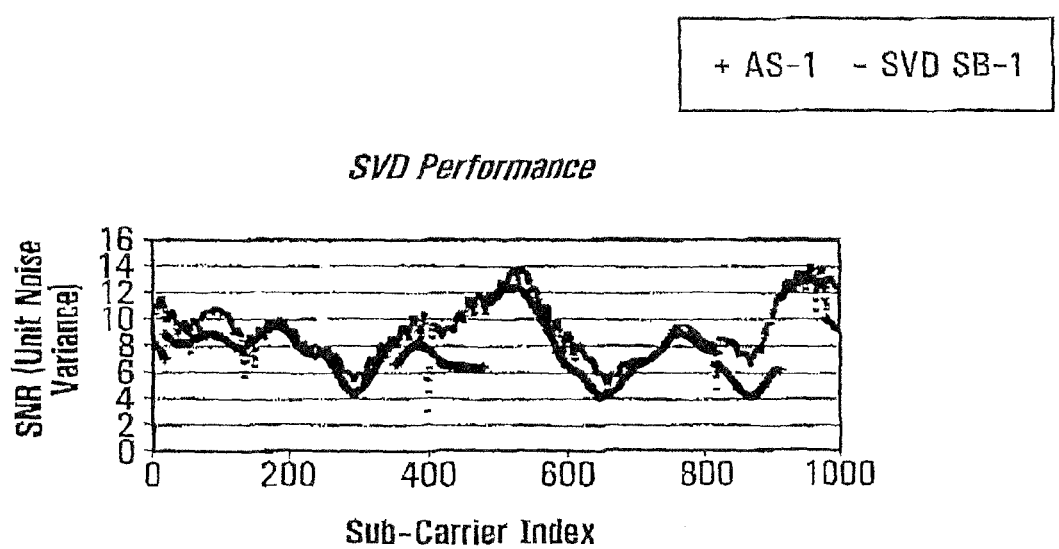
Figure 36:
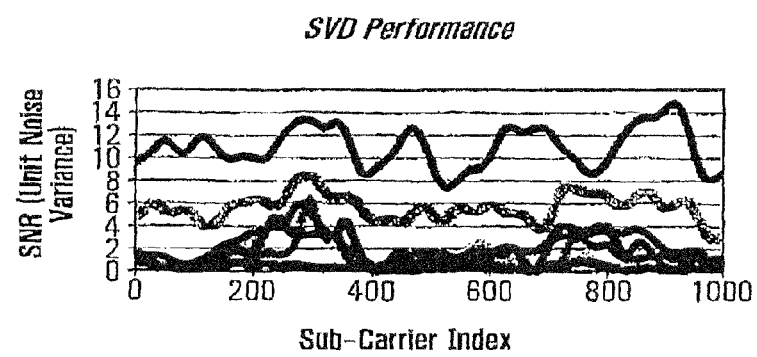

These two approaches are summarized in FIG. 33 for the SVD approach showing the discarding of weak eigen-modes, and FIG. 34 showing de-selected antennas turned off/not used for the particular user. The simulation results of FIGS. 35 and 36 show that antenna grouping can achieve very close to SVD performance with significantly lower complexity.

SVD generally provides optimal performance when adaptive modulation and coding (AMC) can be performed on each individual layer. When AMC is not layer based, the performance difference is generally smaller due to imbalanced layer SNR distribution. Preferably, therefore, AMC is implemented on per layer basis.

In some embodiments, when SVD is used the 4-th layer can generally be eliminated, meaning only 3 columns of the V-matrix generally need to be fed back to the transmitter. In systems with larger numbers of antennas, it may be possible to eliminate more layers.

Antenna Grouping Algorithms

Various antenna grouping algorithms will now be described. Any of these can be employed on a per sub-carrier, per block of sub-carriers, per group of blocks of sub-carriers or for an entire OFDM band. They can be applied for a single or multiple user system.

Selection Between STTD and SM

An antenna grouping algorithm in accordance with an embodiment of the invention will now be described. With channel estimates from the pilots: the receiver computes criterion for use in selecting between STTD and SM transmission modes as follows, where if the STTD criteria is greater than the SM criteria, then STTD transmission is employed and alternatively, SM is employed. Other criteria can be used.

STTD SM $$\sum_{i=1}^{N}\sum_{j=1}^{M}|h_{ij}|^2 > \frac{\gamma_0^{M-1}}{\frac{M}{\prod_{i=1}^{M}\|g_i\|^2}} \cdot 2 \quad \text{where } \gamma_0 = \frac{P}{M\sigma^2}$$

and $g_i$ is the row of matrix G, where $G=(H'H)^{-1} H'$, and H is the channel matrix.

For a MISO arrangement the weights may be provided as follows:

Beam-forming $$\gamma = \frac{1}{\sigma^2}\sum_{i=1}^{N}|h_i|^2$$

Antenna selection $$\gamma = \frac{1}{\sigma^2}\max\{|h_1|^2, |h_2|^2, \ldots, |h_N|^2\}$$

STTD $$\gamma = \frac{1}{N\sigma^2}\sum_{i=1}^{N}|h_i|^2$$

According to another embodiment one may exploit the benefits of both. For example, when a channel changes slowly, beam-forming provides a SNR gain, while STTD provides diversity gain (on the symbol level) which improves FEC performance (especially for higher code rates). Then, when a channel changes quickly one can degenerate to an STTD system which will preserve protection against fading.

Antenna Selection for STTD

An antenna grouping algorithm in accordance with an embodiment of the invention will now be described for an STTD mode. The antenna group selection can be based on criterion including the following:

$$SS_{STTD} = \underset{SS}{\operatorname{argmax}} \sum_{i=1}^{N}\sum_{j=1}^{M_{SS}}|h_{ij}|^2$$

Antenna Selection for SM

For the SM mode, the antenna group selection can be based on criterion including the following:

$$SS_{V-BLAST} = \underset{SS}{\operatorname{argmin}} \prod_{i=1}^{M_{SS}}\|g_i\|^2$$

Antenna Selection for STTD, SM, and Switching Criterion

An antenna grouping algorithm in accordance with an embodiment of the invention will now be described. For the STTD mode, in accordance with an embodiment of the invention, define $$\xi_J = \sum_{i=1}^{N}|h_{ij}|^2$$

and select a set of antennas according to:

$$L_K = \underset{j \in |M|}{\operatorname{argmax}}(\xi_j)$$

And wherein transmission on an antenna is stopped when:

$$L_i < \alpha L_x$$

In accordance with embodiment of the invention, for the SM mode, if $$Q = \frac{\lambda_{max}}{\lambda_{min}} \geq \beta$$

then a new subset of antennas then can be selected according to criterion including maximum determinant criterion:

$$S_a = \arg\max(det(H_a'H_a))$$

where $H_a$ is the channel matrix of the new sub-MIMO size, and $\alpha$ and $\beta$ are predefined thresholds, and where $\lambda_{max}$ and $\lambda_{min}$ are the largest and smallest eigenvalues respectively.

The following is a particular example of an antenna grouping procedure:

Step 1: Decide antenna group size for STTD and SM mode;
Step 2: Select transmit antenna sub-sets based on selected size;
Step 3: Decide transmit mode: STTD vs. SM;
Step 4: If SM is selected and the antenna group size is larger than SM layers, then use Matrix B, otherwise, use Matrix C.

Multi-User Pre-Coding

A multi-user pre-coding algorithm in accordance with an embodiment of the invention will now be described. Consider a MIMO broadcast channel transmit antennas to transmit to K users each with N receive antennas. The base band model of this system is defined by:

$$y_k = H_k s + w_k, \quad 1 \leq k \leq K$$

where $H_k \in C^{N \times M}$ denotes the channel matrix from the base station to the $k^{th}$ user, $s \in C^{M \times 1}$ represents the transmitted vector, and $y_k \in C^{N \times 1}$ signifies received vector by the $k^{th}$ user. The vector $w_k \in C^{N \times 1}$ is white Gaussian noise with zero-mean and unit-variance.

In the proposed method, the transmitted vector a carries information for M users, defined as follows.

$$s = \sum_{j=1}^{M} \sigma_{\pi(j)} w_{\pi(j)}$$

where $\pi(j)$, $\pi(j)$, $j=1 \ldots M$ are the indexes of a subset of users so-called active user $v_{\pi(j)} \in C^{M \times 1}$, $j=1 \ldots M$ are a set of orthogonal vectors, and $d_{\pi(j)}$ includes information for the user $\pi(j)$. In addition, dirty-paper pre-coding is used on top of the system such that if $i>j$, the interference of the user $\pi(i)$ over user $\pi(j)$ is zero.

For demodulation, the user $\pi(j)$ multiplies the received vector to a normal vector $u'_{\pi(j)}$ where $(\cdot)'$ denotes transpose conjugate operation. In the next section, we specify a method to select the set of active users, modulation vectors $v_{\pi(j)}$, and demodulation vectors $u_{\pi(j)}$ for $j=1 \ldots M$.

Determination of the Active Users, Modulation, and Demodulation Vectors

In this part, it is assumed that the channel state information is available at the transmitter. Later, this algorithm is modified such that only partial channel state information is required.

Each stage of the algorithm includes two optimizing operations. First, for each user, finding a direction in which that user has maximum gain. Second, selecting the best user in terms of the larger gain. This optimization is performed in the null space of the former selected coordinates. In the following, the proposed algorithm is presented.

1) Set $j=1$ and the condition matrix $G_{eq}=O_{M \times M}$.
2) Find $\sigma^2_{\pi(j)}$ where $$\sigma^2_{\pi(j)} = \max_r \max_x x' H_r H'_r x$$

$$x'x = 1$$

$$G_{eq} x = 0$$

set $\pi(j)$ and $v_{\pi(j)}$ to be equal to the optimizing parameter $r$ and $x$, respectively.
3) Set $$u_{\pi(j)} = \frac{1}{\sigma_{\pi(j)}} H_{\pi(j)} v_{\pi(j)}$$

4) Set $g_j = v_{\pi(j)}$, where $g_j$ is the $j^{th}$ column of the matrix $G_{eq}$.
5) $j \leftarrow j+1$. If $j \leq M$ go to step two, otherwise stop.

Modified Algorithm

As it has been mentioned before, in this algorithm, a major part of the processing can be accomplished at the receivers. Therefore the perfect channel state information is not required at the transmitter which results a significant decreasing in the rate of feedback.

1) Set $j=1$ and $G_{eq}=Q_{M \times M}$.
2) Each user calculates $\sigma^2_{r(j)}$, defined as follows:

$$\sigma^2_{r(j)} = \max_x x' H_r H'_r x$$

$$x'x = 1$$

$$G_{eq} x = 0$$

$v_{r(j)}$ represents the optimizing parameter $x$.

3) Each user calculates $$u_{r(j)} = \frac{1}{\sigma_{r(j)}} H_r v_{r(j)}$$

4) Each user sends $\sigma^2_{r(j)}$ and $V_{r(j)}$ to the base station, if $\sigma_{r(j)}^2 \geq th(j)$. th(j) is a threshold which is predetermined by the base station.
5) Base station selects the user with the largest $\sigma^2_{r(j)}$. Let $\pi(j)$ be the index of the selected user. The corresponding gain and coordinate of that user. The corresponding gain and coordinate of that user are $\sigma^2_{\pi(j)}$ and $v_{\pi(j)}$, respectively.
6) The $\pi(j)^{th}$ user sends $U_{\pi(j)} H_{\pi(j)} w_{\pi(i)}$ $i=1 \ldots i-1$ to the base station.
7) Base station send $v_{\pi(j)}$ to all users. All include $v_{\pi(j)}$ in $G_{eq}$ as the $j^{th}$ column.
8) $j \leftarrow j+1$. If $j \leq M$ go to step two, otherwise stop.

Feedback MIMO Channel and CQI Separately

Figure 37:
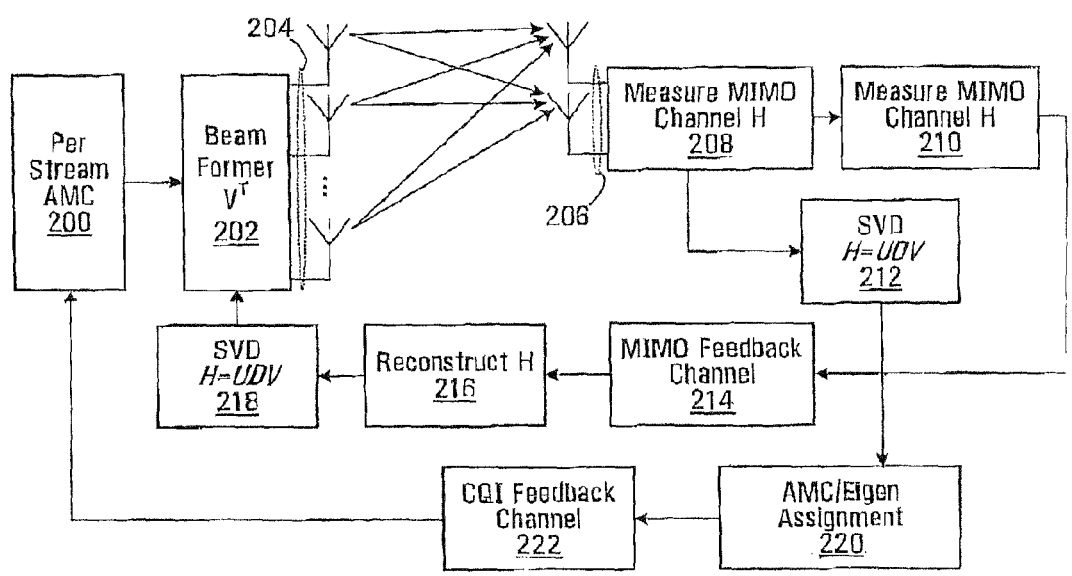
FIG. 37 is a block diagram of a system employing a direct differential encoding in accordance with an embodiment of the invention in which MIMO channel and CQI (channel quality indication) are separately fed back.

Referring now to FIG. 37, shown is a block diagram of a system in which MIMO channel information for use in performing beam-forming, and MIMO/STC setup information are separately fed back in accordance with an embodiment of the invention. In the illustrated example, the MIMO/STC setup information is fed back on a CQICH (channel quality indication) feedback channel, various permutations of which are available in existing standards definitions, but it is to be understood that in this and the other examples that follow, any appropriate physical/logical channel can be employed to feed back the MIMO/STC setup information as required.

At the transmitter, there is a transmit beam-former 202 that uses matrix $V^T$ this being the transpose of the matrix V in the singular value decomposition of the channel H. The output of the beam-former is transmitted on M transmit antennas 204. This is received at the receiver by N receive antennas 206, and the MIMO channel H is measured as indicated at 208. There are many existing methods of measuring the channel. This may for example be done using pilot symbols transmitted at known locations in time and/or frequency, possibly using one of the formats introduced previously and performing interpolation if necessary. This may include receiver specific pilots and or generic pilots. Next, block 212 performs a singular value decomposition of the channel matrix H into the matrix product UDV where U and V are unitary matrices and D is a diagonal matrix containing the eigenvalues.

At 220, AMC/eigen assignment according to eigenvalue is performed for any appropriate frequency resolution, for example for a given sub-channel. A sub-channel may for example be a contiguous block of sub-carriers that have substantially the same eigenvectors/eigenvalues. As discussed previously, weak eigen-modes can be discarded. In some embodiments, all that needs to be fed back is an index of the eigen-modes that are to be used. Then, the receiver, after it reconstructs the H or V matrix from the fed back channel information. can re-construct the eigen-modes, and use each eigen-mode for a respective stream. This information is then sent back to the transmitter on the CQI feedback channel 222 or using some other mechanism.

For the channel information, preferably the difference between the new channel matrix H and the previous channel matrix H is measured and a differential is determined between the two most recent channel matrices. This amount is encoded at 210 and transmitted back to the receiver on the MIMO feedback channel 214. Advantageously, the differential of two consecutive channel matrices will have a significantly smaller dynamic range than would the actual channel matrix H or V matrix. This enables the MIMO feedback channel 214 to use fewer bits to transmit back effectively the same amount of channel information.

At the transmitter, the channel matrix H is reconstructed at 216 using the fed back channel differential and the previous channel matrix H. Singular value decomposition is performed at 218 to recover the V matrix component of the channel matrix H, and the transpose of this matrix is then used in the beam-former 202. Furthermore, the CQI feedback channel 222 feeds into the per stream AMC function 200 that performs adaptive modulation of coding on each stream using the channel quality information as sent back from the receiver. In the above-described embodiment, a differential of the channel matrix H is fed back. Equivalently, the unitary matrix V or a differential of the unitary matrix V could be fed back. Various detailed methods of feeding back the channel matrix or the unitary matrix V are provided below.

The embodiment of FIG. 37 and the other embodiments described generalize to an arbitrary number of transmit antennas and receive antennas. While a particular arrangement of components are shown for each of the various embodiments, it is to be understood that the functionality of these components can be combined or separated differently than shown on an implementation specific basis. Furthermore, FIG. 37 can be thought of representing either a system or a method.

Feedback MIMO Channel and CQI Jointly

Figure 38:
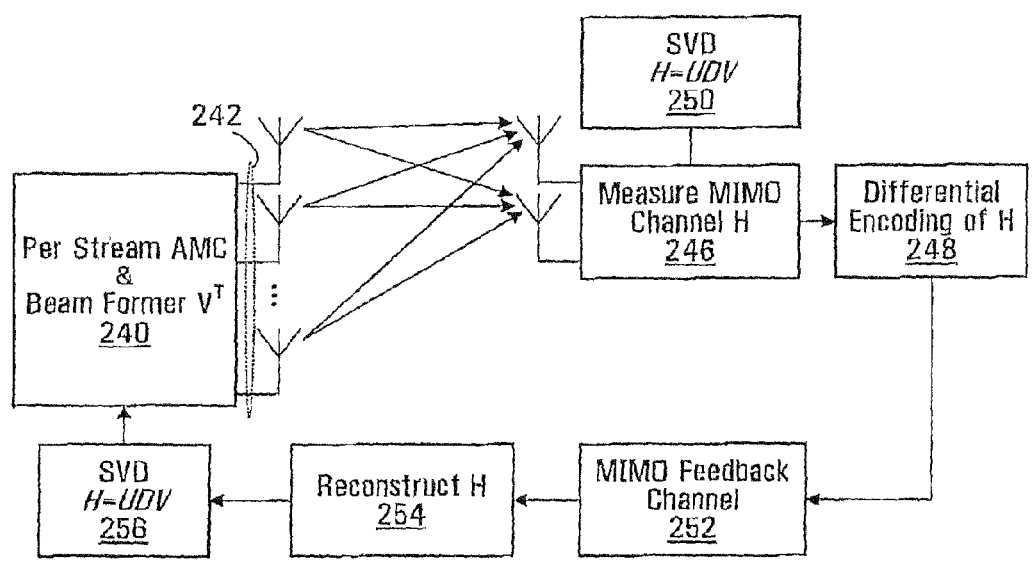
FIG. 38 is a block diagram of a system employing a direct differential encoding in accordance with another embodiment of the invention in which MIMO channel and CQI are jointly fed back.

Referring now to FIG. 38, shown is a system example in which the MIMO channel and the CQI are jointly fed back in accordance with an embodiment of the invention. Shown in the transmit side is a per stream AMC and beam-former $V^T$ 240 that has outputs connected to M transmit antennas 242. On the receive side, there are N receive antennas 244 and there is a function that measures the MIMO channel H at 246. The MIMO channel H is differentially encoded at 248. The receiver has knowledge of a set of possible differentially encoded H (or v in which case SVD decomposition is performed at 250) matrices, for example 64 different differential matrices. The receiver determines the candidate differential H matrix that is closest to the actual differential. Each possible H matrix has an associated predetermined adaptive modulation and coding and an associated index. Therefore, by simply feeding back the index from the receiver to the transmitter, the transmitter can determine the proper beam-former $V^T$, and the appropriate per stream adaptive modulation and coding to perform. The transmitter then reconstructs H at 254 and performs singular value decomposition at 256 to recover the unitary matrix V which is then used in the beam-former step. Note that while the illustrated embodiment shows H being differentially encoded and fed back, equivalently the unitary matrix could be differentially encoded and fed back.

Differential Scalar Quantizer—Element by Element Quantization

Figure 39:
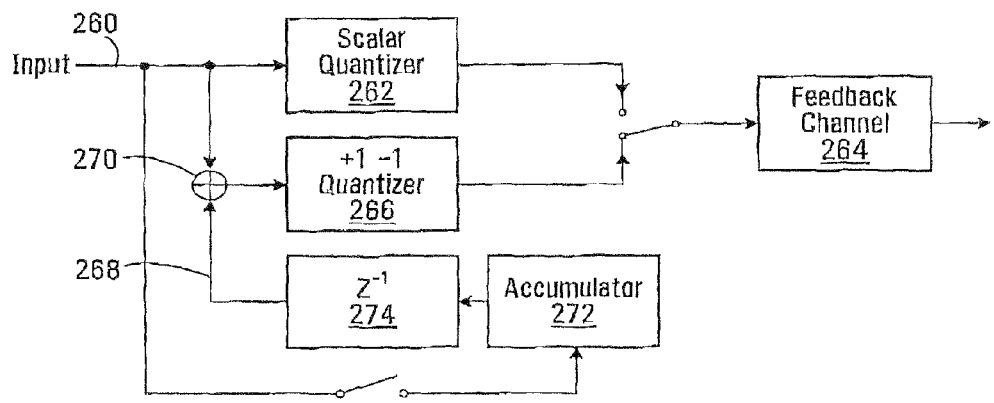
FIG. 39 is a block diagram of a system employing a direct differential encoding in accordance with an embodiment of the invention featuring 1 bit DPCM.

The two above-described embodiments employ the feedback of differentials in either the channel matrix H or the unitary matrix V. FIG. 39 shows a block diagram of an example of a differential scalar quantizer that can be used to feedback quantized differentials. In FIG. 39, the input 260 is the new value that needs to be quantized. This can be element in a channel matrix or a unitary matrix for example. Every k frames, this amount is passed through the scalar quantizer 262 and on to the feedback channel 264. This means that every k frames, the receiver feeds back the actual value as opposed to the differential value. This avoids the potential problem of drift that can occur over time due to ongoing differential quantization. For the remaining frames, quantization is performed. In the illustrated example, this consists of +1, −1 quantization 266. The quantization is performed on the basis of a difference between the current input 260 and the "previous input" 268 by difference function 270. The previous input is maintained by updating the value with the actual value every k frames in accumulator 272 and then applying any plus or minus quantizations as determined at the output of the +1, −1 quantizer 266 and storing the result in a delay element 274.

While the illustrated example uses +1, −1 quantization, this requiring one bit per element to be transmitted on the feedback channel 264, higher resolution quantization could alternatively be employed. Furthermore, some embodiments may not necessarily feature the scalar quantization step. Note that for a 4×4 channel matrix, each channel element is complex and therefore has an I and Q component. Therefore, to feedback quantized information for a 2×2 channel matrix requires eight bits, two bits per channel element, one bit per I and Q components.

ΔΣ Modulation 1-bit Quantizer

Figure 40:
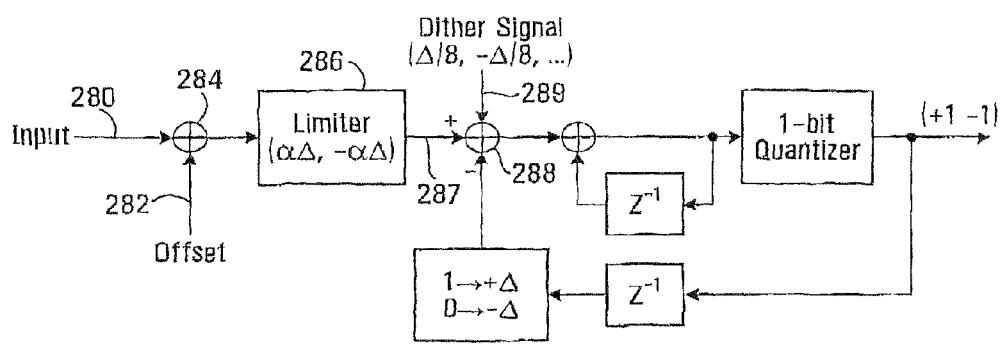
FIG. 40 is a block diagram of a system employing a direct differential encoding in accordance with an embodiment of the invention and using a 1 bit AZ modulator.

In accordance with another referred embodiment of the invention a ΔΣ modulator 1-bit quantizer is employed to determine the information to be fed back. An example of a $1^{st}$-order ΔΣ modulation encoder is shown in FIG. 40. Referring to FIG. 40, a new channel measurement is input at 280. This might for example be a C/I measurement for a particular channel element. An offset is applied at 282 so as to move the dynamic range of the channel measurement within the range of the ΔΣ signal modulator that follows. A limiter 286 is also shown that limits the dynamic range of the input to prevent ΔΣ overflow. A given implementation may not include either of the offset and limiter features or may include just one of them or both of them as illustrated. The input level is often less than the quantizer step size Δ and hence is denoted by αΔ where α<1 dependent on ΔΣ type. A dither signal may also be applied 289 to the $1^{st}$-order ΔΣ modulator input to eliminate the limit cycle inherent in the $1^{st}$-order modulators and in this instance is a sequence (Δ/8, −Δ/8). The remainder of the encoder is a classical ΔΣ modulators with the exception there are no delays in the signal paths. Once again, the output per I or Q component of a channel matrix is a plus or minus one. Again, different resolutions can be implemented if a given application needs the higher resolution. Furthermore, ΔΣ modulation can more generally be applied to any parameter for which feedback is to be implemented.

Multi-User Differential Feedback

Figure 41:
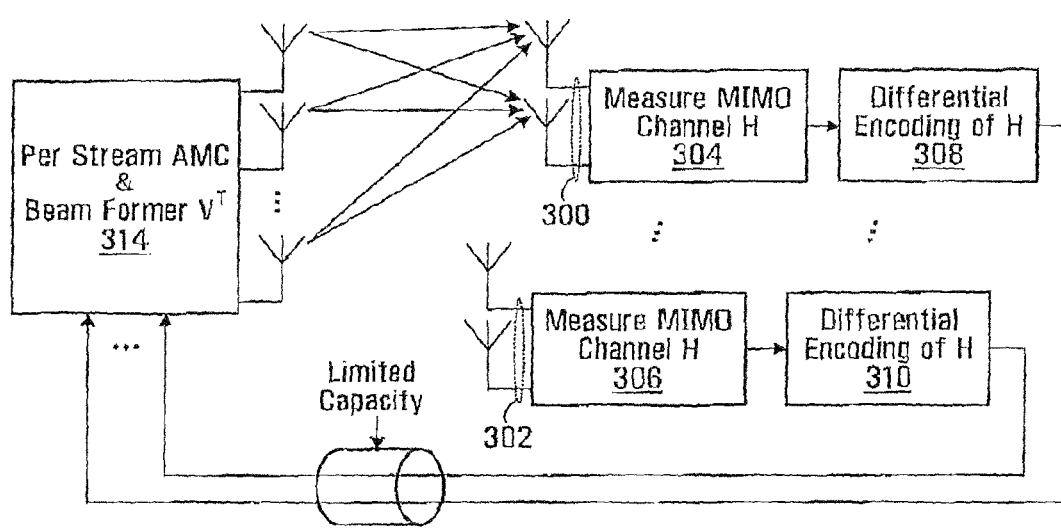
FIG. 41 is a block diagram of a system employing a direct differential encoding in accordance with an embodiment of the invention for multiple users.

FIG. 41 shows an example of a system that employs differential encoding of the channel matrix H from multiple receivers. This is simply an example to show that for the most part any of the examples given herein can be adapted for use with multiple users. With this example, there are two users each having a respective pair of antennas 300,302. Each user performs a channel measurement 304,306 respectively and differential encoding of the channel matrix 308, 310. The channel information is then fed back to the transmitter where a per stream AMC and beam-forming is performed as indicated at 314. It is noted that the feedback channel from the users typically has limited capacity. This may be a dedicated channel for each user, or may be a channel that is shared across users in a scheduled fashion.

The differential encoder output may be grouped together to map to the existing CQI feedback channel or MIMO feedback channel.

Givens Feedback

In another embodiment of the invention, the V matrix determined through singular value decomposition is fed back from the receiver to the transmitter using Givens feedback, Unitary matrices have the property that they can be decomposed into a product of Givens matrices. In particular, an n×n V matrix can be decomposed into Givens matrices containing $n^2-n$ complex parameters. The parameters can be fed back directly, or differentially and/or quantized to potentially reduce the amount of feedback required. Then, at the transmitter, the Givens matrices can be reconstructed, and then the V matrix reconstructed as the product of the reconstructed Givens matrices.

Figure 43:
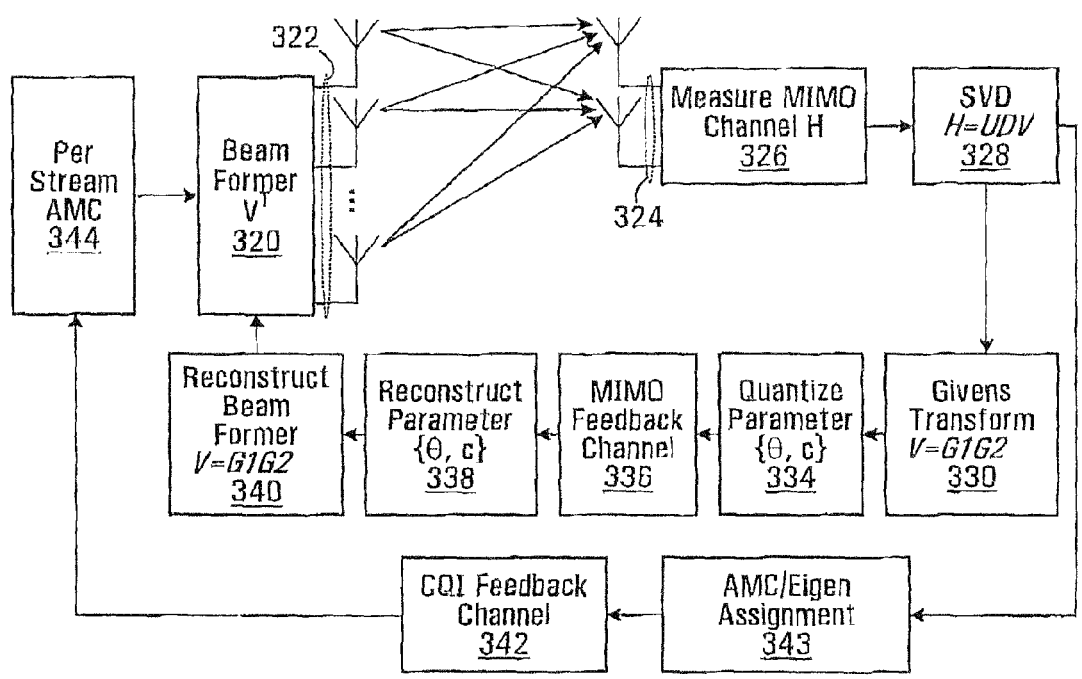
FIG. 43 is a block diagram of a system employing an SVD based Givens transform feedback in accordance with an embodiment of the invention.

An example of a system employing Givens feedback is shown FIG. 43. Shown is a transmit beam-former 320 with transmit antennas 322. At the receiver, receive antennas 324 receive signals, and the channel measurement is performed at 326. This produces the channel matrix which is then SVD decomposed at 328. Next, the V matrix is decomposed by the Givens transform 330 to produce a series of matrices $G_1$, $G_2$, . . . , the number of matrices being required being a function of the size of the channel matrix. Each such Givens matrix can then be uniquely represented by two parameters θ and C. These parameters are selected at 332 and differentially quantized at 334.

Then, the quantized parameters θ and C are fed back over the MIMO feedback channel 336, this requiring two parameters to be sent back for each Givens matrix. At the transmitter, the fed back parameters θ and C are reconstructed at 338, and then the beam-forming matrix V is reconstructed by determining the product of the Givens matrices generated using the reconstructed parameters, at 340. Finally, the transpose of the matrix V is used by the beam-former 320. The parameters may be directly fed back or differentially fed back.

Preferably, at the same time AMC/eigen assignment is performed on the basis of eigenvalues of the channel matrix of the SVD composition performed at 328 as described previously. This step is indicated at 332. The AMC/eigen assignment information is fed back over the CQI channel at 342. This information is fed back to the transmitter where per stream AMC is performed is indicated at 344.

Advantageously, for V matrix feedback, the base station is able to verify the integrity of the received matrix V by exploiting the orthogonality of the matrix.

By decomposing the SVD-based unitary V matrix into Givens matrices, the V matrix can be represented by $n^2-n$ independent complex parameters.

In accordance with an embodiment of the invention, $2(n^2-n)$ bits (one bit for I and Q of each parameter) are used for the differential quantization of the unitary V matrix, although other methods of feeding back the parameters can be used.

In accordance with this embodiment an n stream CQI channel may also be used, preferably 4 bits each. Combining the Given's feedback and the CQI yields the total amount for the unitary matrix feedback of $2n^2+2n$ bits. However, for the direct differential encoding approach the total feedback used is $2n^2$ including the CQI information, since it is embedded in H. FIG. 42 shows an example set of feedback requirements for N by N MIMO systems, in which a comparison is made between the number of bits fed back for the unitary matrix, fed back using Givens feedback and CQI channel information, as opposed to the direct H matrix feedback. It can be seen that the complexity becomes increasingly comparable as a number of transmit antennas increases.

2-Antenna Givens Transform

The following is an SVD based Givens transform algorithm in accordance with an embodiment of the invention suitable for 2-Transmit Antennas. With 2-antenna Givens transformation, $2^2-2=2$ complex parameters are required to feedback the V matrix. There are multiple known formats for Givens transformations any of which can be used. The Givens rotation for 2 transmit antennas (Format-A) includes:

$$G = \begin{bmatrix} \hat{c} & |\hat{s}|e^{j\theta} \\ -|\hat{s}|e^{-j\theta} & \hat{c} \end{bmatrix}$$

The parameter space includes $\theta=\{-\pi,+\pi\}$ and $c=\{0,1\}$ $s=(1-c^2)^{1/2}$.

An alternative format is the following Givens rotation for 2 transmit antenna (Format-B) that takes the form:

$$G = \begin{bmatrix} \cos(\eta) & e^{j\theta}\sin(\eta) \\ -e^{-j\theta}\sin(\eta) & \cos(\eta) \end{bmatrix}$$

The parameter space includes $\theta=\{-\pi,+\pi\}$ and $\eta=\{-\pi,+\pi\}$

3-Antenna Givens Transform

An SVD based Givens transform algorithm in accordance with an embodiment of the invention will now be described for 3-Transmit Antennas. With 3-antenna Givens transforms, $n^2-n=6$ complex parameters can be used to completely represent the V matrix. These can be represented in the following Givens rotation for 3 transmit antenna (Format-A) includes $G=G_1G_2G_3$ represented as follows where each of the three matrices has a respective parameter c ($c_1,c_2,c_3$) and s ($\theta_1,\theta_2,\theta_3$) which differs between the three matrices although this is not shown.

$$G = \begin{bmatrix} c & s & 0 \\ -s^* & c & 0 \\ 0 & 0 & 1 \end{bmatrix} \begin{bmatrix} c & 0 & s \\ 0 & 1 & 0 \\ -s^* & 0 & c \end{bmatrix} \begin{bmatrix} 1 & 0 & 0 \\ 0 & c & s \\ 0 & -s^* & c \end{bmatrix}$$

The parameter space includes $\theta_1=\{-\pi,+\pi\}$ and $c_1\pm=\{0,1\}$ for $G_1$ $\theta_2=\{-\pi,+\pi\}$ and $c_2=\{0,1\}$ for $G_2$ $\theta_3=\{-\pi,+\pi\}$ and $c_3=\{0,1\}$ for $G_3$ Preferably, these are quantized as follows:

$\theta_1 \rightarrow 2$ bit and $c_1 \rightarrow 1$ bit $\theta_2 \rightarrow 2$ bit and $c_2 \rightarrow 1$ bit $\theta_3 \rightarrow 2$ bit and $c_3 \rightarrow 1$ bit It can be seen in the above example, the quantization performed for the parameter θ is more precise than that performed for the parameter C. It is generally the case that different quantization accuracies may be performed for the different parameters being fed back using given speed back. Through experimentation, it has been found that acceptable performance can be achieved with a less accurate C parameter. In some embodiments described below, certain C parameters can be ignored.

4-Antenna Givens Transform

An SVD based Givens transform SQ algorithm in accordance with an embodiment of the invention will now be described for 4-Transmit Antennas. 4-antenna Givens transformation requires $4^2-4=12$ complex parameters. These can be represented in the Givens rotation for 4 transmit antenna (Format-A) as $G=G_1G_2G_3G_4G_5G_6$ represented as follows where each of the six matrices has a respective parameter c $(c_1,c_2,c_3,c_4,c_5,c_6)$ and s $(\theta_1,\theta_2,\theta_2,\theta_3,\theta_4,\theta_5,\theta_6)$:

$$G = \begin{bmatrix} c & s & 0 & 0 \\ -s^* & c & 0 & 0 \\ 0 & 0 & 1 & 0 \\ 0 & 0 & 0 & 1 \end{bmatrix} \begin{bmatrix} c & 0 & s & 0 \\ 0 & 1 & 0 & 0 \\ -s^* & 0 & c & 0 \\ 0 & 0 & 0 & 1 \end{bmatrix} \begin{bmatrix} c & 0 & 0 & s \\ 0 & 1 & 0 & 0 \\ 0 & 0 & 1 & 0 \\ -s^* & 0 & 0 & c \end{bmatrix} \begin{bmatrix} 1 & 0 & 0 & 0 \\ 0 & c & s & 0 \\ 0 & -s^* & c & 0 \\ 0 & 0 & 0 & 1 \end{bmatrix}$$

$$\begin{bmatrix} 1 & 0 & 0 & 0 \\ 0 & c & 0 & s \\ 0 & 0 & 1 & 0 \\ 0 & -s^* & 0 & c \end{bmatrix} \begin{bmatrix} 1 & 0 & 0 & 0 \\ 0 & 1 & 0 & 0 \\ 0 & 0 & c & s \\ 0 & 0 & -s^* & c \end{bmatrix}$$

The parameter space includes $\theta_1=\{-\pi+\pi\}$ and $c_1=\{0,1\}$ for $G_1$ $\theta_2=\{-\pi+\pi\}$ and $c_2=\{0,1\}$ for $G_2$ $\theta_3=\{-\pi+\pi\}$ and $c_3=\{0,1\}$ for $G_3$ $\theta_4=\{-\pi+\pi\}$ and $\theta_4=\{0,1\}$ for $G_1$ $\theta_5=\{-\pi+\pi\}$ and $c_5=\{0,1\}$ for $G_2$ $\theta_6=\{-\pi+\pi\}$ and $c_6=\{0,1\}$ for $G_3$ The scalar quantizers can be implemented as follows;

$\theta_1 \rightarrow 2$ bit and $c_1 \rightarrow 1$ bit $\theta_2 \rightarrow 2$ bit and $c_2 \rightarrow 1$ bit $\theta_3 \rightarrow 2$ bit and $c_3 \rightarrow 1$ bit $\theta_4 \rightarrow 2$ bit and $c_4 \rightarrow 1$ bit $\theta_5 \rightarrow 2$ bit and $c_5 \rightarrow 1$ bit $\theta_6 \rightarrow 2$ bit and $c_6 \rightarrow 1$ bit

Givens Transform—General Case

An SVD based Givens transform algorithm in accordance with an embodiment of the invention will now be described for n-Transmit Antennas. The Givens rotation for n transmit antennas (Format-A) includes:

$$V = \prod_{k=1}^{n-1} \prod_{i=1}^{n-k} G(k,i)$$

$$G(k,i) = \begin{bmatrix} 1 & \cdots & 0 & \cdots & 0 & \cdots & 0 \\ \vdots & \ddots & \vdots & & \vdots & & \vdots \\ 0 & \cdots & c & \cdots & s & \cdots & 0 \\ \vdots & & \vdots & \ddots & \vdots & & \vdots \\ 0 & \cdots & -s^* & \cdots & c & \cdots & 0 \\ \vdots & & \vdots & & \vdots & \ddots & \vdots \\ 0 & \cdots & 0 & \cdots & 0 & \cdots & 1 \end{bmatrix}$$

Preferably, scalar quantization is performed for each of the parameters as discussed previously.

Truncation of Givens Expansion

An SVD based Givens transform algorithm in accordance with an embodiment of the invention will now be described that employs truncation of the Givens expansion. Preferably, weak eigen-modes may be discarded with application of water filling in the eigen domain. Each Given matrix is associated with one or more eigen-modes and respective eigenvalue. As such, if a given weak eigenvalue is to be discarded, then the associated Givens matrices can be discarded. In the receiver, the V matrix is re-generated, and then only the selected eigen-modes used to transmit streams as in the above example for eigen-modes selection.

For example, where the full Givens expansion for the 3×3 case is as follows:

$$G = \begin{bmatrix} c & s & 0 \\ -s^* & c & 0 \\ 0 & 0 & 1 \end{bmatrix} \begin{bmatrix} c & 0 & s \\ 0 & 1 & 0 \\ -s^* & 0 & c \end{bmatrix} \begin{bmatrix} 1 & 0 & 0 \\ 0 & c & s \\ 0 & -s^* & c \end{bmatrix}$$

this can be truncated by dropping the "weakest" eigen-mode. For example if the third matrix corresponds to the weakest eigen-mode, the truncated expansion is:

$$G = \begin{bmatrix} c & s & 0 \\ -s^* & c & 0 \\ 0 & 0 & 1 \end{bmatrix} \begin{bmatrix} c & 0 & s \\ 0 & 1 & 0 \\ -s^* & 0 & c \end{bmatrix}$$

The full expansion above corresponds to all three eigenvectors of the channel. In contrast, the truncated expansion corresponds to only a single eigenvector. The correspondence of eigenvector to Givens matrices is a known math property of Givens expansions.

The following is another example of truncation of Givens expansion for a 4-antenna case. The Givens expansion for eigenvector #1 of a 4×4 channel matrix is as follows:

$$G = \begin{bmatrix} c & s & 0 & 0 \\ -s^* & c & 0 & 0 \\ 0 & 0 & 1 & 0 \\ 0 & 0 & 0 & 1 \end{bmatrix} \begin{bmatrix} c & 0 & s & 0 \\ 0 & 1 & 0 & 0 \\ -s^* & 0 & c & 0 \\ 0 & 0 & 0 & 1 \end{bmatrix} \begin{bmatrix} c & 0 & 0 & s \\ 0 & 1 & 0 & 0 \\ 0 & 0 & 1 & 0 \\ -s^* & 0 & 0 & c \end{bmatrix}$$

The Givens expansion for eigenvectors 1 and 2 for a 4×4 system is as follows:

$$G = \begin{bmatrix} c & s & 0 & 0 \\ -s^* & c & 0 & 0 \\ 0 & 0 & 1 & 0 \\ 0 & 0 & 0 & 1 \end{bmatrix} \begin{bmatrix} c & 0 & s & 0 \\ 0 & 1 & 0 & 0 \\ -s^* & 0 & c & 0 \\ 0 & 0 & 0 & 1 \end{bmatrix} \begin{bmatrix} c & 0 & 0 & s \\ 0 & 1 & 0 & 0 \\ 0 & 0 & 1 & 0 \\ -s^* & 0 & 0 & c \end{bmatrix} \begin{bmatrix} 1 & 0 & 0 & 0 \\ 0 & c & s & 0 \\ 0 & -s^* & c & 0 \\ 0 & 0 & 0 & 1 \end{bmatrix}$$

$$\begin{bmatrix} 1 & 0 & 0 & 0 \\ 0 & c & 0 & s \\ 0 & 0 & 1 & 0 \\ 0 & -s^* & 0 & c \end{bmatrix}$$

The Givens expansion for all four eigenvectors of the 4×4 system is as follows:

$$G = \begin{bmatrix} c & s & 0 & 0 \\ -s^* & c & 0 & 0 \\ 0 & 0 & 1 & 0 \\ 0 & 0 & 0 & 1 \end{bmatrix} \begin{bmatrix} c & 0 & s & 0 \\ 0 & 1 & 0 & 0 \\ -s^* & 0 & c & 0 \\ 0 & 0 & 0 & 1 \end{bmatrix} \begin{bmatrix} c & 0 & 0 & s \\ 0 & 1 & 0 & 0 \\ 0 & 0 & 1 & 0 \\ -s^* & 0 & 0 & c \end{bmatrix} \begin{bmatrix} 1 & 0 & 0 & 0 \\ 0 & c & s & 0 \\ 0 & -s^* & c & 0 \\ 0 & 0 & 0 & 1 \end{bmatrix}$$

$$\begin{bmatrix} 1 & 0 & 0 & 0 \\ 0 & c & 0 & s \\ 0 & 0 & 1 & 0 \\ 0 & -s^* & 0 & c \end{bmatrix} \begin{bmatrix} 1 & 0 & 0 & 0 \\ 0 & 1 & 0 & 0 \\ 0 & 0 & c & s \\ 0 & 0 & -s^* & c \end{bmatrix}$$

It can be seen that discarding two eigen-modes reduces the Givens expansion by one of the six matrices while discarding three of the four eigen-modes will reduce the Givens expansion by three of the six matrices. Given that each matrix requires two parameters to be fed back, a corresponding reduction in the quantity of feedback information that needs to be transmitted is realized. Generally, it can be seen that in an arbitrary n×n case, a Givens expansion can be employed, and the amount of feedback can be optionally reduced by discarding one or more eigen-modes.

Bit Allocation for Givens Feedback—Full Scalar Quantization

An SVD based Givens transform algorithm in accordance with an embodiment of the invention will now be described in which full scalar quantization is performed. As discussed above, it can be advantageous to use different quantizations for the various parameters being fed back using Givens feedback. Based on the pre-coding QoS requirement, the bit allocation may provide a tradeoff between performance and feedback penalty.

For the Givens parameter in Format-A, $\theta$ is uniformly distributed resulting in more bits being needed for accurate feedback, whereas C is non-uniformly distributed resulting in less bits being needed. In some implementations, some C have only minimum impact on performance and can be treated as constant without a substantial performance penalty.

Using a Lloyd-MAX quantizer the following bit allocations can be employed to realize a full scalar quantizer.

|  | # of Transmit Antennas | | | | | | | | | |
|---|---|---|---|---|---|---|---|---|---|---|
|  | 2 | 3 | | | 4 | | | | | |
| Givens matrix | G1 | G1 | G2 | G3 | G1 | G2 | G3 | G4 | G5 | G6 |
| Bits to represent theta | 2 | 2 | 2 | 2 | 2 | 2 | 2 | 2 | 2 | 2 |
| Bits to represent C | 2 | 1 | 1 | 1 | 1 | 1 | 1 | 1 | 1 | 1 |
| Total bit allocation to Givens | 4 | 3 | 3 | 3 | 3 | 3 | 3 | 3 | 3 | 3 |

Bit Allocation for Givens Feedback—Partial Scalar Quantization

An SVD based Givens transform algorithm in accordance with an embodiment of the invention will now be described in which partial scalar quantization is performed. With partial scalar quantization, a differential is not fed back for each and every parameter. In an example solution, a 1 bit or 0 bit is used for each parameter c and a differential 1-bit is used for each parameter theta. Another approach includes using less bits or zero bits for the non-significant Givens parameters.

The following is an example of bit allocation with partial scalar quantization for 2, 3 and 4 antennas. It can be seen that in a particular example, for the 3-antenna case for example, the o parameter is only fed back for the first of three Givens matrices, and a three bit value is sent back for theta for the first of the three matrices, and a one bit differential is used for theta for the other two matrices. This has the potential of reducing the number of feedback bits required from nine bits from the full quantization example given above to five bits for the example in the table.

|  | # of transmit | | | | | | | | | |
|---|---|---|---|---|---|---|---|---|---|---|
|  | 2 | 3 | | | 4 | | | | | |
| Givens matrix | G1 | G1 | G2 | G3 | G1 | G2 | G3 | G4 | G5 | G6 |
| Theta | 2 | 2 | 1 | 1 | 2 | 2 | 1 | 1 | 1 | 1 |
| C | 2 | 1 | 0 | 0 | 1 | 1 | 0 | 0 | 0 | 0 |
| Bit allocation to Givens | 4 | 3 | 1 | 1 | 3 | 3 | 1 | 1 | 1 | 1 |

The following table shows an example set of feedback allocations for different MIMO configurations using Givens feedback with full scalar quantization, versus partial scalar quantization with a 1-bit differential for theta and 1-bit for c. It can be seen that the savings in the number of bits required for feedback increase as the complexity of the MIMO configuration increases. Also shown in the table are the number of bits required for a Hausholder based feedback mechanism.

|  | MIMO CONFIGURATION | | | | | | | |
|---|---|---|---|---|---|---|---|---|
|  | 2 × 2 | 3 × 1 | 3 × 2 | 3 × 3 | 4 × 1 | 4 × 2 | 4 × 3 | 4 × 4 |
| #of spatial streams | 2 | 1 | 1 | 3 | 1 | 2 | 3 | 4 |
| #of parameters | 1 | 2 | 3 | 3 | 3 | 5 | 6 | 6 |
| Full Scalar | 4 | 3 | 9 | 9 | 9 | 15 | 18 | 18 |
| 1-bit differential theta 1-bit for c | 2 | 2 | 6 | 6 | 6 | 10 | 12 | 12 |
| Hausholder | 4 | 4 | 9 | 9 | 11 | 11 | 15 | 15 |

The table below shows examples of the feedback allocations for various MIMO configurations comparing full scalar feedback to partial feedback in which a 1-bit differential for theta is employed, and 1-bit or zero bits are used for each c parameter. Again, the requirements for Hausholder feedback are also shown for the sake of comparison.

|  | MIMO Configuration | | | | | | | |
|---|---|---|---|---|---|---|---|---|
|  | 2 × 2 | 3 × 1 | 3 × 2 | 3 × 3 | 4 × 1 | 4 × 2 | 4 × 3 | 4 × 4 |
| #of spatial streams | 2 | 1 | 2 | 3 | 1 | 2 | 3 | 4 |
| #of parameters | 1 | 2 | 3 | 3 | 3 | 5 | 6 | 6 |
| Full Scalar | 4 | 3 | 9 | 9 | 9 | 15 | 18 | 18 |
| 1-bit differential theta 1-bit or zero bit for c | 2 | 2 | 4 | 4 | 5 | 7 | 9 | 9 |
| Hausholder | 4 | 4 | 9 | 9 | 11 | 11 | 15 | 15 |

Grassman Subspace Packing—Vector Quantization

With scalar quantization, be it full scalar or partial scalar, each feedback element pertains to one parameter of interest.

This parameter can be a Givens parameter, or a channel matrix parameter from H or V for example, or some other value. In another embodiment, vector quantization is performed, in which each element fed back represents a vector, either in absolute terms or differential terms, and in respect of a set of parameters of interest. Each potential state for the output of the vector quantization operation is represented by a code word identifier/index which is fed back, and used by the transmitter to look up the vector. The vectors thus looked up are then used to generate the beam former in the transmitter. The vector might be a vector of a channel matrix, a vector of a V matrix (this would be a unitary vector), or a set of Givens parameters for example.

In one embodiment, an SVD based Givens transform vector quantization algorithm is provided that employs Grassmann Subspace Packing. However, other forms of vector quantization may alternatively be employed.

Each individual Givens matrix is a unitary matrix. The product of Givens matrices is a unitary matrix. The partial product of two or more Givens matrices is a unitary matrix. After determining a truncated or full Givens expansion, the resulting of unitary matrix may be quantized by using Grassmann sub-space packing (see for example D. J. Love, R. W. Heath Jr., and T. Strohmer, "Grassmannian Beamforming for Multiple-Input Multiple-Output Wireless Systems," IEEE Transactions on Information Theory, vol. 49, pp. 2735-2747, October 2003). In this case, the code book for quantization of a unitary matrix may be considered as sub-space packing in a Grassmann manifold.

Two codebooks that might be used include the uniform distributed Grassmann space, and Block circulant DFT, but other codebooks may alternatively be employed.

Figure 44:
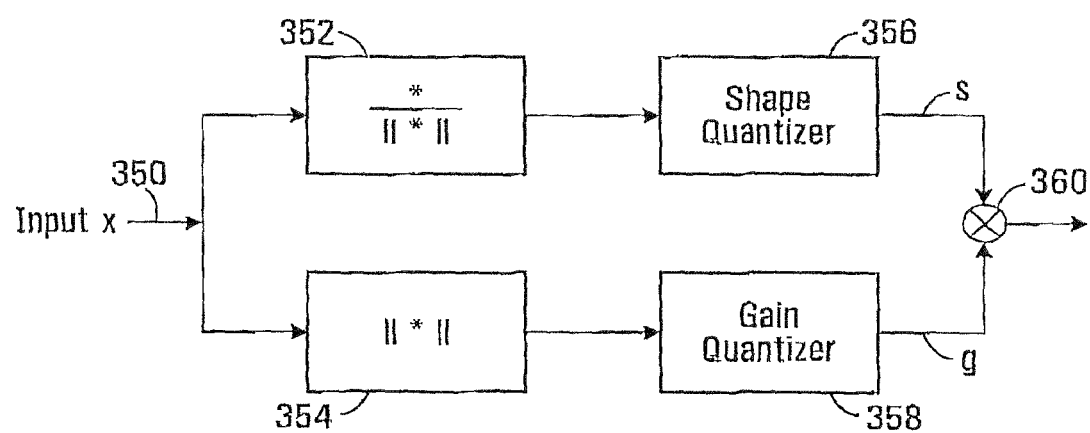
FIG. 44 is another example of an SVD based Givens transform in accordance with an embodiment of the invention in which a further spherical code based quantization is performed.

An example of encoding using shape and gain quantizer according to an embodiment of the invention is shown in FIG. 44. The input to the shape and gain quantizer is a vector to be quantized. Preferably, this vector is a column of a unitary V matrix, but it may not necessarily be so. For example, it may be a set of Givens parameters that are not necessarily unitary, or a vector of the channel matrix H. The vector is normalized at 352. Please note however that this step is only required if the input is not a unit length vector. V should consist of unitary columns and rows and as such this step can be skipped if the input is a column/row of the V matrix. At step 356, shape quantization is performed. This involves determining from a codebook the closest codeword/vector in the codebook to the input vector. In the event the input vector is not unitary, the magnitude can be taken at 354 and this quantized with gain quantizer 358. Then, the shape and gain can be together fed back at 360. Once again, the gain quantization step is not needed if the input is unitary. For example, if a four element input vector is used, then a "codebook" of different four element vectors is developed to define the overall feedback space. The shape quantizer then determines which of the defined potential four element feedback vectors is closest to the input, and then all that needs to be fed back is the identity of this vector. This can then be looked up at the transmitter and used to re-generate the vector. In effect, each vector is rounded off to the nearest vector in the code book. In a system in which there are 16 different codewords, the codeword can be uniquely identified by 4-bits. Thus, each column of the V matrix could be represented b 4-bits with this approach.

Spherical Codebook Quantizer

An SVD based Givens transform vector quantization algorithm in accordance with an embodiment of the invention will now be described that employs a Spherical Code Based Quantizer. This method begins with putting the Givens parameters into a vectpr and then encoding the vector using a spherical code based quantizer. The following steps are performed:

1. Given k element vector form the vector $X \rightarrow R^k$
2. Compute $g=\|X\|$ and $S=X/g$
3. Use the gain codebook to quantize g as $\underline{g}$
4. Find i such that $\alpha_i = <\sin^{-1} x_k < \alpha_{i+1}$ and compute $$h_i(S)=X/\|X\|*(\|X_L'\|-\|X_L-X\|)$$

5. Find the nearest neighborhood $\underline{h}_i(S)$ to $h_i(S)$
6. Compute $h_i^{-1}(\underline{h}_i(S))$ to identify the quantized shape S
7. Compute the index $\underline{g}\underline{S}$ and transmit In accordance with an embodiment, Leech Lattice is used as a codebook. Alternatively, a trellis-coded quantizer can also be employed.

Feedback Setup Using Receiver Criteria

A receiver based Givens transform in accordance with an embodiment of the invention will now be described in which search criteria are established in the receiver.

In accordance with this embodiment of the invention channel filling is based on criteria including the receiver criteria. Based on the QoS requirements, the receiver determines the minimum feedback needed adaptively. The process may include the following:

determining the Givens truncation level;

based on the Scalar quantizer structure assigning parameter values; and/or performing combinatorial searches of combinations.

One example search criterion may include receiver MSE. Others may include Max SNR, Max Shannon capacity, or True receiver operational process defining as follows:

$$l^{opt} = \arg\min_{l \in \{1,2...L\}} MSE\left\{\frac{E_s}{N_o} tr\left(I_M + \frac{E_s}{N_o N_r} P_l^H H^H H P_l\right)^{-1}\right\}$$

Based on the receiver criterion, exhaustive search the code book and maximize the given received based criterion to determine the best pre-code matrix. These equations represent exhaustively computing beam-forming weights to see which one is the best for a given Criteria.

$$SNR_{n,i}^r = (h_{n,i}^r)^H (h_{n,l}^r (h_{n,l}^r)^H + \sigma^2 I)^{-1} h_{n,i}^r$$

$$i, j = 2, i \neq j$$

$$V_n^{opt} = \arg\max_j \left(\max_i (SNR_{n,i}^r)\right)$$

Figure 45:
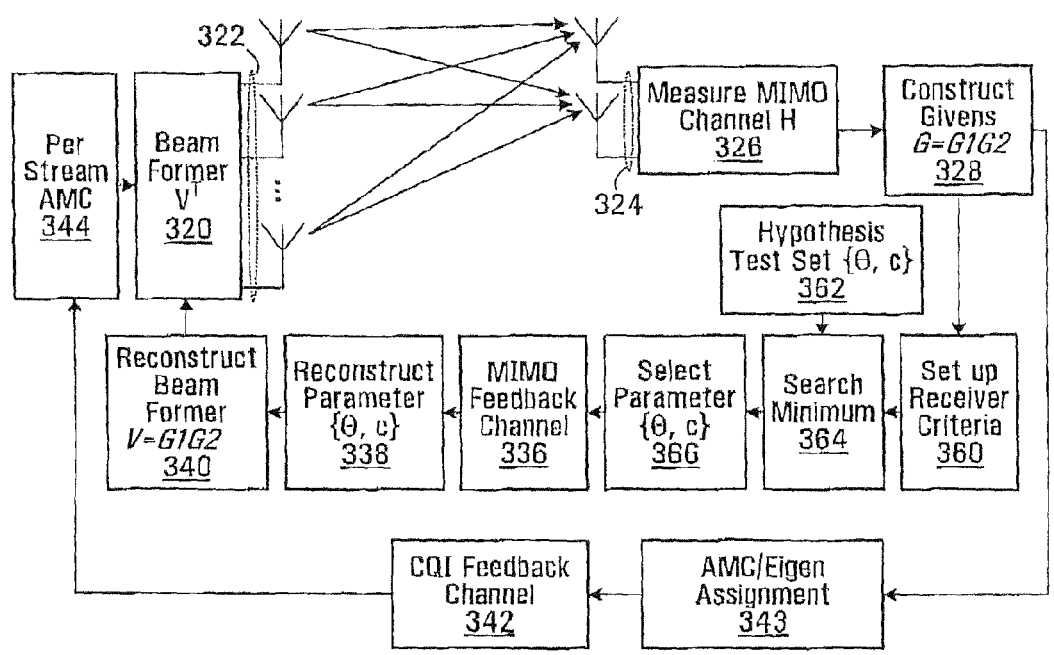
FIG. 45 is a block diagram of a system employing a receiver based Givens transform in accordance with an embodiment of the invention.

Referring now to FIG. 45, shown is an example of a system in which the receiver sets up criteria for searching. Much of this example is similar to the Givens feedback system of described above, and this material in common will not be repeated. After constructing the Givens matrices at 328, the set up receiver criteria 360 are used to search for a minimum. Examples of receiver criteria have been set out above, but other examples can alternatively be employed. The searching involves performing hypotheses testing against a set or dictionary of theta, c permutations 362 using the search minimum step 364. Once the minimum has been found, the parameters representing the minimum are selected at 366 and fed back on the MIMO channel 336 as before.

In any of the examples above, the Givens decomposition can be computed using any appropriate method. Iterative approaches may for example be employed such as Cholsky factorization and reverse order multiplication. These methods are known in the art and will not be described further here. It is noted that Givens decomposition is about 10% of the complexity of SVD computing complexity. This can be seen from the following table comparing the complexity of SVD versus Givens as a function of the number of transmit antennas, and the complexity is measured in terms of multiply and add operations.

| ANTENNAS | COMPLEXITY | | |
|---|---|---|---|
| | SVD | GIVENS | GIVENS/SVD |
| 1 | 21 | 0 | |
| 2 | 168 | 12 | 7.14% |
| 3 | 567 | 54 | 9.52% |
| 4 | 1344 | 144 | 10.71% |
| 5 | 2625 | 300 | 11.43% |
| 6 | 4536 | 540 | 11.90% |
| 7 | 7203 | 882 | 12.24% |
| 8 | 10752 | 1344 | 12.50% |

The following table shows a comparison of the complexity of Givens based feedback as opposed to Hausholder feedback as a function of the number of transmit antennas. It can be see that the Hausholder approach is significantly more complex.

| # of transmit antennas | Givens | | | Hausholder | | | |
|---|---|---|---|---|---|---|---|
| | Complex Division | Complex Multiply | Complex Add | Comparison | Complex Multiply | Complex Add | Complex Storage |
| 3 | 3 | 30 | 30 | 32 | 259 | 160 | 32 |
| 4 | 4 | 56 | 56 | 64 | 771 | 672 | 64 |
| 6 | 6 | 132 | 132 | 256 | 3843 | 3744 | 256 |
| 8 | 8 | 240 | 240 | 1024 | 20227 | 20128 | 1024 |
| 12 | 12 | 552 | 552 | 16384 | 413443 | 413344 | 16384 |

Example of Codebook Construction for Vector Pre-Coding

An example of Vector Pre-coding (code-book construction) for purpose of context and comparison will now be described. The cross-correlation of the codeword in this examples has a block circulant structure. The diagonal rotation matrix Q is defined as:

$$Q = \begin{bmatrix} e^{j\frac{2\pi}{L}u_1} & & 0 \\ & \ddots & \\ 0 & & e^{j\frac{2\pi}{L}u_L} \end{bmatrix} u_1 \Rightarrow U[u_1 \ldots u_L]$$

Matrix $P_1$, is selected from sub-matrixes of DFT matrix as $$P_1 = [d_{c_1} \ldots d_{c_{N_1}}]$$

$$(D_{N_1})_{m \times n} = [e^{j\frac{2\pi}{N_l}(m-1)(n-1)}]_{m \times n} \Rightarrow D = [d_1 \ldots d_{N_l}]$$

The codebook can be constructed as:

$$P_l = Q^l P_1 \quad l = 2, 3 \ldots L$$

The codebook can be optimized by choosing rotation matrix Q indexes $$c = \lfloor c_1 \ldots c_{M_1} \rfloor$$

The code book can be optimized by choosing rotation matrix Q indexes $$u = \lfloor c_1 \ldots c_{N_1} \rfloor$$

By exhaustive search of the codebook we have $$l^{opt} = \arg\min_{l \in (1,2 \ldots L)} MSE\left\{ \frac{E_s}{N_o} tr\left(I_M + \frac{E_x}{N_o N_r} P_l^H H^H H P_l\right)^{-1}\right\}$$

Examples of Codebook Construction for Matrix Pre-Coding

An overview of Matrix Pre-coding (column by column vector quantize channel-1) for purposes of context and comparison will now be described. Preferably, the V matrix is quantized column by column and recursively.

STEP-0: Denote the beam-forming matrix as $$V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}$$

STEP-1: Quantize the first column of V denoted as $V_1$ as follows: $\hat{v}_1 = \arg\max_{U \in E_1} \|u^H v_1\|$ Where $C_1$ is a codebook containing unit 4-vectors for quantization. $\hat{v}_1$ has the maximum inner product among all unit vectors in the codebook.

STEP-2: Compute Hausholder reflection matrix as follows $$F_1 = I - \frac{2}{\|w_1\|^2} w_1 w_1^H$$

Where $\phi_1$ is the phase of $v_{11}$ $$F_1 V = \begin{bmatrix} e^{j\phi_1} & 0.0 & 0.0 \\ 0.0 & \hat{v}_{11} & \hat{v}_{12} \\ 0.0 & \hat{v}_{21} & \hat{v}_{22} \\ 0.0 & \hat{v}_{31} & \hat{v}_{32} \end{bmatrix}$$

where $$v_2 = \begin{bmatrix} \hat{v}_{11} & \hat{v}_{12} \\ \hat{v}_{21} & \hat{v}_{22} \\ \hat{v}_{31} & \hat{v}_{32} \end{bmatrix}$$

where two properties are employed to get the result, i.e. $\hat{v}_{11}$ is real and the unitary property of V Since both $F_1$ and V are unitary, $V_2$ is unitary. From STEP-2, we see that size of $V_2$ is 3 by 2 and it is reduced from that of $V_1$ by one on both the row and column dimensions.

STEP-3: Quantize the first column of $V_2$ denoted as $v_2$, using another codebook or unit 3-vectors, whose first element of each codeword is real.

STEP-4: Construct a Hausholder reflection matrix $F_2$

STEP-5: Multiply $F_2$ with $V_2$ as follows.

$$F_1 V_2 = \begin{bmatrix} e^{j\phi_2} & 0.0 \\ 0.0 & \hat{v}_{11} \\ 0.0 & \hat{v}_{21} \end{bmatrix}$$

where $$v_3 = \begin{bmatrix} \hat{v}_{11} \\ \hat{v}_{21} \end{bmatrix}$$

The reconstruction of the beam-forming matrix V is as follows:

STEP-0: Two vectors, $v_3$ and $v_2$, are reconstructed using the feedback quantization indexes and the corresponding 2-vector and 3-vector codebooks.

STEP-1: Compute a Hausholder matrix using the reconstructed $V_2$ as $$F_2 = I - \frac{2}{\|w\|^2} w w^H$$

where $w = \hat{v}_2 - e_1$ and $\hat{v}_2$ is the reconstructed 3-vector; $F_2$ can be stored beforehand to reduce computation.

STEP-2: $V_2$ can be reconstructed as $$\hat{V}_2 = F_2 \begin{bmatrix} 1 & 0 \\ 0 & \\ 0 & \hat{V}_3 \end{bmatrix}$$

STEP-3: we reconstruct the first column of V using the quantization index and compute a Hausholder matrix as $$F_1 = I - \frac{2}{\|w\|^2} w w^H$$

where $w = \hat{v}_1 - e_1$ and $\hat{v}_1$ is the reconstructed first column of V.

STEP-4 the beam-forming matrix V is given by $$\hat{V} = F_1 \begin{bmatrix} 1 & 0 & 0 \\ 0 & & \\ 0 & & \hat{V}_2 \\ 0 & & \end{bmatrix}$$

The codebook is constructed such that the codeword vectors distribute on the n-dimension complex unit sphere uniformly. Additionally, the first element of each codeword is set to be real for the next step.

The Hausholder matrix can be computed and stored beforehand for small codebooks. Even in the case that there is no quantization error, the reconstructed matrix could be different from the original V by a global phase on each column and this is fine with closed loop MIMO.

Example of 2-Transit Antenna Codebook for Givens Feedback

Pre-design the rotation matrix for 2 transmit antennas, and then the rotation matrix is parameterized. A set of parameterized rotation matrixes serves as codebook.

$$V^1_{n_1 n_2} = \begin{bmatrix} e^{j\phi_{n_2}} \cos\theta_{n_1} & -e^{j\phi_{n_2}} \sin\theta_{n_1} \\ \sin\theta_{n_1} & \cos\theta_{n_1} \end{bmatrix}$$

$$\phi_{n_2} = \frac{2\pi n_2}{N_2}, n_2 = 0, 1 \ldots N_2 - 1$$

$$\theta_{n_1} = \frac{2\pi n_1}{N_1}, n_1 = 0, 1 \ldots N_1 - 1$$

Feedback Differential Codebook Index

Figure 48:
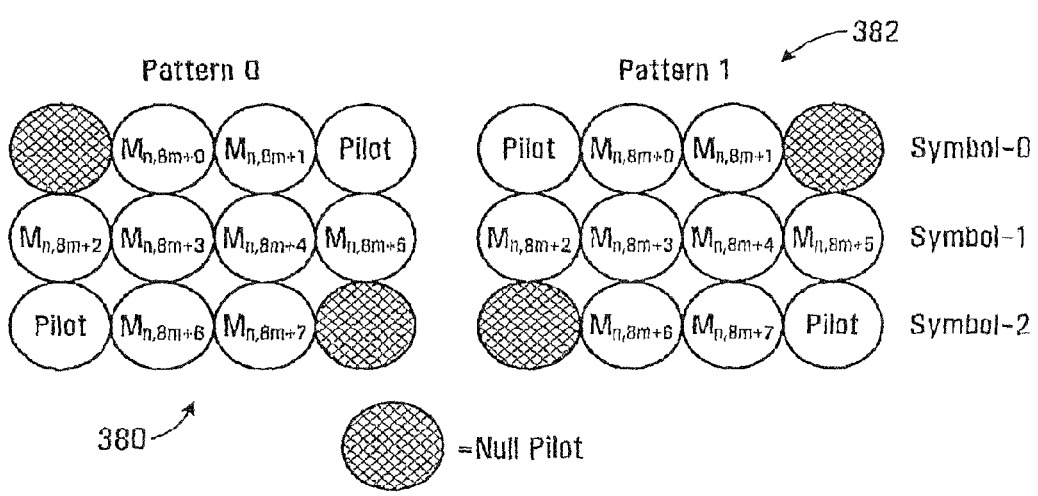
FIG. 48 is an example of space-time coding for CQICH in accordance with an embodiment of the invention suitable for SM (spatial multiplexing)

According to an embodiment of the invention a differential index feedback is provided as illustrated pictorially in FIG. 48. The differential index is representative of the sub-space searching. According to this embodiment the channel will not change very fast. Therefore, the indices of consecutive feedbacks will not be far from the previous feed-back.

Avoiding the Impact of Ageing

A MIMO feedback channel ageing algorithm in accordance with an embodiment of the invention will now be described, in which receiver ageing beam-former correction is utilized.

For a mobile MIMO channel the channel matrix may be time-varying:

Time-0→$H_0 = U_0 D_0 V_0'$

Time 1→$H_1 = U_1 D_1 V_1'$

The beam forming matrix $V_0$ sent to the transmitter may already be old by the time it is utilized for transmission. However, the receiver may still be able to compute the latest receiver beam forming matrix $U_0$ as follows:

$U_1' y = U_1' U_1 D_1 V_1' V_0' s + U_1' n = D_1 V_1' V_0' s + n$

This may prevent the ageing impact at receiver side, the ageing impact potentially causing the inter-antenna interference. In the above example, at the receiver the received sequence y has been multiplied by the latest beam-forming matrix $U_1$, rather than use $U_0$ that would have been used with the channel information at time 0. In the result, the product $V_1' V_0$ or likely be close to the identity matrix and can be ignored; alternatively given that both $V_1'$ and $V_0$ are known at the receiver, the effect of this can also be divided out at the receiver. This would increase the complexity however.

Physical Layer Design

A CQICH Support of Differential Encoding Algorithm in accordance with an embodiment of the invention will now be described. For OFDM systems, preferably differential encoding is used to cross multiple sub-carriers to feedback the vector index or other feedback information. The following is an example of a mini-tile modulation scheme for sending back a vector index of zero or one. Preferably this would be transmitted on two sub-carriers. In this case, two different phases are transmitted for vector index zero, and a different arrangement of the same phases is sent for vector index one.

| Vector index | $M_{n,8}, M_{n,8m+1}$ |
|---|---|
| 0 | P0, P1 |
| 1 | P1, P0 |

$$P0 = \exp j\frac{\pi}{4}$$
$$P1 = \exp j\frac{3\pi}{4}$$

Figure 46:
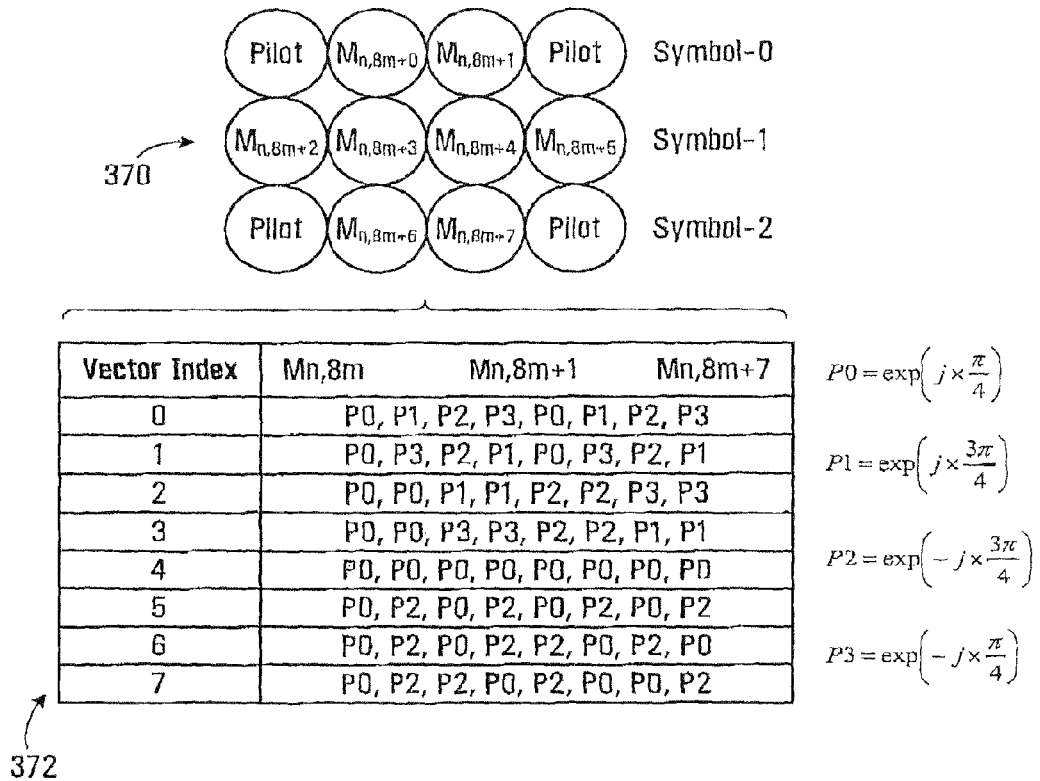
FIG. 46 is an example of space-time coding for use on a CQICH (channel quality indication channel) in accordance with an embodiment of the invention suitable for a single input single output application.

Another example is shown in FIG. 46, this being a feedback approach that allows the transmission of one of eight different vector indexes can be used to transmit up to 3-bits of information. The vector index might for example be an index of codebook, or alternatively the raw bits might be used to indicated feedback information, be it channel feedback or Givens feedback or unitary matrix feedback. In the example shown, a tile generally indicated at 370 is four sub-carriers by three symbols, and the four corner sub-carrier locations in the tile are used for transmitting pilot information. The remaining eight sub-carrier locations over the three symbols are used to transmit the vector index. The encoding used for the index is indicated in the table generally indicated at 372. In this example, four different phases are used, and a codeword consisting of eight-phases is used to represent each of the potential vector indices. The receiver of the feedback information can then recover the phase information and perform a correlation to identify the transmitted vector index and thereby recover the feedback information.

Figure 47:
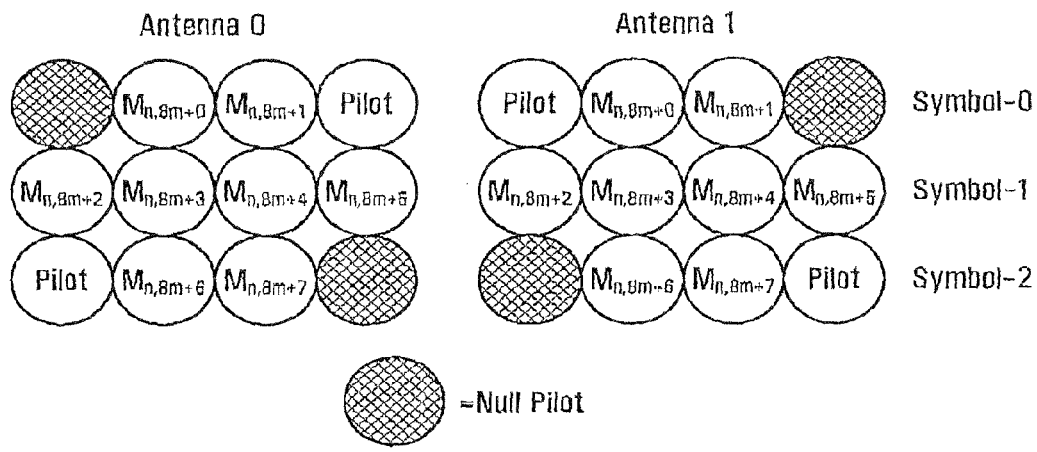
FIG. 47 is an example of space-time coding for CQICH in accordance with an embodiment of the invention suitable for supporting STTD.

Another example is shown in FIG. 47 for the case where a receiver has two antennas. In this case, pilot symbols are sent in different locations for the two antennas, but identical feedback information is sent on the remaining eight sub-carriers' the same as in FIG. 46. For a given antenna, no pilots are inserted in the locations where the other antenna is transmitting its pilot symbols.

In yet another example, shown in FIG. 48, two different users are feeding back the two patterns indicated at 380,382 respectively. Similar to the two antenna case of FIG. 47, each of the two users transmits pilots in different locations within the tile so as to not interfere with the other users pilots. In this case, each user transmits eight sub-carrier locations containing the vector index. The data transmitted by the two users will be different, and the receiver of the feedback information will need to distinguish between the two. According to an embodiment of the invention STTD antenna assignment with power weighting may be used. This reduces inter-code interference and reduces the feedback bandwidth required.

FIGS. 49 and 50 shows a concatenation of STC/MIMO with a beam-former in accordance with an embodiment of the invention.

Each embodiment is generalizable to an arbitrary number of sub-carriers and/or an arbitrary number of transmit antennas/receive antennas as will be apparent to one skilled in the art. Embodiments provide transmitters adapted to generate signals containing the disclosed transmit code-sets/sub-carrier allocations, methods of transmitting such signals, receivers adapted to receive such transmissions, and methods of receiving and decoding such signals.

Numerous modifications and variations of the present invention are possible in light of the above teachings. It is therefore to be understood that within the scope of the appended claims, the invention may be practised otherwise than as specifically described herein.

The invention claimed is:

1. A multiple input multiple output (MIMO) system comprising:
    a receiver having at least one receive antenna, wherein the receiver is configured to:
        analyze one or more channel conditions of a communication with a transmitter having a plurality of transmit antennas;
        based on the one or more channel conditions, select a spatial-multiplexing (SM) format for transmission in the communication and one or more transmission layers for use in the transmission, wherein the SM format is a selection of one of the defined subset of available formats; and
    generate, for transmission to the transmitter, feedback information specifying the selected SM format and a number of selected transmission layers, wherein the number of selected transmission layers is included in a rank indication in the feedback information.

2. The system of claim 1, wherein the receiver is configured to:
    based on one or more channel conditions, select a space time transmit diversity (STTD) format for the transmission and a grouping of the plurality of antennas for use in the transmission; and
    generate, for transmission to the transmitter, feedback information specifying the selected STTD format and the grouping of the plurality of antennas.

3. The system of claim 1, wherein the transmitter comprises four antennas.

4. The system of claim 1, wherein the transmission layers are layer based water-filling is employed to provide additional gain to the system.

5. The system of claim 1, wherein the feedback information specifies beam-forming information usable by the transmitter.

6. The system of claim 1, wherein more power is transmitted to the transmission layer having better channel conditions.

7. A method for transmitting comprising:
    analyzing, by a receiver, one or more channel conditions of a communication with a transmitter having a plurality of transmit antennas;
    based on the one or more channel conditions, selecting, by the receiver, a spatial-multiplexing (SM) format for transmission in the communication and one or more transmission layers for use in the transmission, wherein the SM format is a selection of one of the defined subset of available formats; and
    generating, by the receiver, for transmission to the transmitter, feedback information specifying the selected SM format and a number of selected transmission layers, wherein the number of selected transmission layers is included in a rank indication in the feedback information.

8. The method of claim 7, wherein,
    based on one or more channel conditions, selecting, by the receiver, a space time transmit diversity (STTD) format for the transmission and a grouping of the plurality of antennas for use in the transmission; and generating, by the receiver, for transmission to the transmitter, feedback information specifying the selected STTD format and the grouping of the plurality of antennas.

9. The method of claim 7, wherein layer based water-filling is employed to provide additional gain to the transmitter.

10. The method of claim 7, wherein the transmitter comprises four antennas.

11. The method of claim 7, wherein the feedback information specifies beam-forming information usable by the transmitter.

12. The method of claim 7, wherein more power is transmitted to the transmission layer having better channel conditions.

13. A non-transitory computer-readable storage medium with an executable program stored thereon, wherein the program instructs a processor to perform operations comprising:
- analyzing one or more channel conditions of a communication with a transmitter having a plurality of transmit antennas;
- based on the one or more channel conditions, selecting a spatial-multiplexing (SM) format for transmission in the communication and one or more transmission layers for use in the transmission, wherein the SM format is a selection of one of the defined subset of available formats; and
- generating, for transmission to the transmitter, feedback information specifying the selected SM format and a number of selected transmission layers, wherein the number of selected transmission layers is included in a rank indication in the feedback information.

14. The non-transitory computer-readable storage medium of claim 13, wherein the operations further comprise:
- based on one or more channel conditions, selecting a space time transmit diversity (STTD) format for the transmission and a grouping of the plurality of antennas for use in the transmission; and
- generating, for transmission to the transmitter, feedback information specifying the selected STTD format and the grouping of the plurality of antennas.

15. The non-transitory computer-readable storage medium of claim 13, wherein layer based water-filling is employed to provide additional gain to the transmitter.

16. The non-transitory computer-readable storage medium of claim 13, wherein the transmitter comprises four antennas.

17. The non-transitory computer-readable storage medium of claim 13, wherein the feedback information specifies beam-forming information usable by the transmitter.

* * * * *

UNITED STATES PATENT AND TRADEMARK OFFICE
CERTIFICATE OF CORRECTION

PATENT NO. : 9,628,153 B2  
APPLICATION NO. : 15/000542  
DATED : April 18, 2017  
INVENTOR(S) : Tong et al.

Page 1 of 1

It is certified that error appears in the above-identified patent and that said Letters Patent is hereby corrected as shown below:

On the Title Page

Item (63) should be replaced with the following Line:
"Continuation of application No. 11/630,391, filed on Dec. 22, 2006, now Pat. No. 9,271,221, which is a national stage entry of application No. PCT/CA05/00958, filed on Jun. 22, 2005."

In the Claims

Claim 4, Column 52, Lines 38-40 should be replaced with the following Line:
"The system of claim 1, wherein layer based water-filling is employed to provide additional gain to the system."

Signed and Sealed this  
Eleventh Day of September, 2018

Andrei Iancu  
*Director of the United States Patent and Trademark Office*